(12) United States Patent
Eklöf et al.

(10) Patent No.: US 12,402,056 B2
(45) Date of Patent: Aug. 26, 2025

(54) SN-INITIATED CONDITIONAL PSCELL CHANGE (CPC) WITH SN CHANGE

(71) Applicant: Telefonaktiebolaget LM Ericsson (publ), Stockholm (SE)

(72) Inventors: Cecilia Eklöf, Täby (SE); Icaro Leonardo Da Silva, Solna (SE); Julien Muller, Rennes (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 18/019,864

(22) PCT Filed: Aug. 6, 2021

(86) PCT No.: PCT/IB2021/057290
§ 371 (c)(1),
(2) Date: Feb. 6, 2023

(87) PCT Pub. No.: WO2022/029727
PCT Pub. Date: Feb. 10, 2022

(65) Prior Publication Data
US 2023/0292192 A1 Sep. 14, 2023

Related U.S. Application Data

(60) Provisional application No. 63/062,171, filed on Aug. 6, 2020.

(51) Int. Cl.
*H04W 36/38* (2009.01)
*H04W 36/00* (2009.01)
(52) U.S. Cl.
CPC ... *H04W 36/385* (2013.01); *H04W 36/00698* (2023.05)

(58) Field of Classification Search
CPC ............... H04W 36/385; H04W 36/00698
See application file for complete search history.

(56) References Cited

U.S. PATENT DOCUMENTS

2017/0048108 A1* 2/2017 Yi ..................... H04W 24/08
2021/0099926 A1* 4/2021 Chen .................. H04W 36/362

OTHER PUBLICATIONS

CATT (Rapporteur), "Report on Email Discussion [107b#52][NR MobE] Open Issues Conditional PSCell Addition/Change (CATT)", R2-1916300, 3GPP TSG-RAN WG2 Meeting #108, Reno, USA, Nov. 18-22, 2019, pp. 1-46.

(Continued)

*Primary Examiner* — Hashim S Bhatti

(57) ABSTRACT

A UE method includes receiving an RRC reconfiguration message, RRCReconfiguration, from a master node. The RRCReconfiguration message includes a secondary cell group, SCG, measurement configuration comprising a configuration of at least one measurement identifier referred in an execution condition for a conditional primary secondary cell, PSCell, change, CPC. The SCG measurement configuration is included within another RRC reconfiguration message, RRCReconfiguration*, to be applied by the UE upon reception; and at least one conditional reconfiguration for CPC, the conditional reconfiguration comprising for a target candidate cell of a candidate target-secondary node: the SCG configuration; and the execution condition for CPC, where the UE is to apply the SCG configuration upon fulfillment of the execution condition for CPC. The UE applies the reconfiguration message and the SCG measurement configuration, within the RRCReconfiguration* message. The UE monitors the fulfillment of the execution conditions for the target candidate cell.

21 Claims, 20 Drawing Sheets

(56) References Cited

OTHER PUBLICATIONS

Huawei et al., "Discussion on conditional PScell change", R2-1915848, 3GPP TSG-RAN WG2 Meeting #108, Reno, Nevada, USA, Nov. 18-22, 2019, pp. 1-3.
NEC, "Expected signalling flows for SN-initiated PSCell change", R2-1915243, 3GPP TSG-RAN WG2 Meeting #108, Reno, USA, Nov. 18-22, 2019, pp. 1-6.
International Search Report and Written Opinion of the International Searching Authority for PCT International Application No. PCT/IB2021/057290 dated Nov. 18, 2021.

\* cited by examiner

1900

```
┌─────────────────────────────────────────────────────────────────────────────┐
│ Receiving, from a master node, a request message including conditional flag │
│ information to facilitate the conditional secondary cell change             │
│                                  1901                                        │
└─────────────────────────────────────────────────────────────────────────────┘
                                      │
                                      ▼
┌─────────────────────────────────────────────────────────────────────────────┐
│ Transmitting, based at least in part on receiving the request message, a    │
│ response message to the master node, the response message including a cell │
│ group configuration associated with the base station                        │
│                                  1902                                        │
└─────────────────────────────────────────────────────────────────────────────┘
                                      │
                                      ▼
┌─────────────────────────────────────────────────────────────────────────────┐
│ Receiving, from the master node, a reconfiguration complete message,        │
│ RRCReconfigurationComplete**, indicating fulfillment of a condition required│
│ for the conditional secondary cell change and indicating that the UE has    │
│ applied a Secondary Cell Group, SCG, reconfiguration                        │
│                                  1903                                        │
└─────────────────────────────────────────────────────────────────────────────┘
```

Receiving a reconfiguration message, RRCReconfiguration, from a master node, the RRCReconfiguration message including:
    a secondary cell group, SCG, measurement configuration including the configuration of at least one measurement identifier referred in an execution condition for a conditional primary secondary cell, PSCell, change, CPC, wherein the SCG measurement configuration is included within another SCG reconfiguration message, RRCReconfiguration*** to be applied by the UE upon reception; and
    at least one conditional reconfiguration for CPC, the conditional reconfiguration comprising for a target candidate cell of a candidate target-secondary node:
        the SCG configuration; and
        the execution condition for CPC, wherein the UE is to apply the SCG configuration upon fulfillment of the execution condition for CPC
2001

↓

Applying the reconfiguration message and the SCG measurement configuration, within the RRCReconfiguration*** message
2002

↓

Storing the SCG configuration
2003

↓

Monitoring the fulfillment of the execution conditions for the target candidate cell
2004

↓

Transmitting, to the master node, a reconfiguration complete message, RRCReconfigurationComplete, indicating that the UE has received and applied the RRCReconfiguration message, wherein the RRCReconfigurationComplete message comprises an embedded second reconfiguration complete message, RRCReconfigurationComplete*, indicating that the UE has received and applied the RRCReconfiguration* message
2005

Fig. 20

SN-INITIATED CONDITIONAL PSCELL CHANGE (CPC) WITH SN CHANGE

CROSS REFERENCE TO RELATED APPLICATIONS

This application is a 35 U.S.C. § 371 national stage application of PCT International Application No. PCT/IB2021/057290 filed on Aug. 6, 2021, which claims the benefit of U.S. Provisional Patent Application Ser. No. 63/062,171, filed on Aug. 6, 2020, the disclosures and content of which are incorporated by reference herein in their entireties.

TECHNICAL FIELD

The present disclosure relates generally to communications, and more particularly to communication methods and related devices and nodes supporting wireless communications.

BACKGROUND

Conditional Handover (CHO)

Two new work items for mobility enhancements in LTE and NR have started in 3GPP in release 16. The main objectives of the work items are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. This may result in the HO Command not reaching the UE in time if the message is segmented or there are retransmissions.

In LTE and NR, different solutions to increase mobility robustness have been discussed in the past. One solution discussed in NR is called "conditional handover" or "early handover command". In order to avoid the undesired dependence on the serving radio link upon the time (and radio conditions) where the UE should execute the handover, the possibility to provide RRC signalling for the handover to the UE earlier should be provided. To achieve this, it should be possible to associate the HO command with a condition e.g., based on radio conditions possibly similar to the ones associated to an A3 event, where a given neighbour becomes X db better than target. As soon as the condition is fulfilled, the UE executes the handover in accordance with the provided handover command.

Such a condition could e.g., be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

Consider an example with a serving and a target cell. In practice there may often be many cells or beams that the UE reported as possible candidates based on its preceding RRM measurements. The network should then have the freedom to issue conditional handover commands for several of those candidates. The RRCConnectionReconfiguration for each of those candidates may differ e.g., in terms of the HO execution condition (RS to measure and threshold to exceed) as well as in terms of the RA preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

Conditional handover is described in stage 2, TS 38.300 in chapter 9.2.3.4 and its subchapters (including FIGS. 9.2.3.4.2.1 and 10.5.1-2).

Conditional PSCell Change (CPC)

A solution for Conditional PSCell Change (CPC) procedure was standardized in Rel-16. Therein a UE operating in Multi-Radio Dual Connectivity (MR-DC) receives in a conditional reconfiguration one or multiple RRC Reconfiguration(s) (e.g. an RRCReconfiguration message) containing an SCG configuration (e.g. an secondaryCellGroup of IE CellGroupConfig) with a reconfigurationWithSync that is stored and associated to an execution condition (e.g. a condition like an A3/A5 event configuration), so that one of the stored messages is only applied upon the fulfilment of the execution condition e.g. associated with the serving PSCell, upon which the UE would perform PSCell change (in case it find a neighbour cell that is better than the current SpCell of the SCG).

In rel-16 CPC will be supported, but in rel-17 also PSCell Addition will be included, i.e., Conditional PSCell Addition/Change (CPAC). In rel-16 only intra-SN CPC without MN involvement is standardized. Inter SN PSCell CPC and CPC with MN involvement will be included in rel-17.

Several agreements related to one or more procedures associated with CPC were reached including, for example, Agreement RAN2 #109e, RAN2 #109bis-e, and related agreements.

SUMMARY

According to some embodiments, methods for facilitating a conditional secondary node change are provided. Such methods may be performed by one or more base stations (e.g., master node (MN), source secondary node (S-SN), and/or target secondary node (T-SN)) along with user equipment (UE).

According to certain embodiments a method by a base station operating as a Master Node (MN), for facilitating a conditional primary secondary cell, PSCell, change, CPC, for a user equipment, UE, includes receiving, from a source-secondary node, a change request for a change from the source-secondary node to a candidate target-secondary node, the change request including an indication that the change request is for CPC. The method further includes transmitting a request message to the candidate target-secondary node, the request message including the indication that the request message is for CPC. The method further includes receiving, from the candidate target-secondary node, a response message that includes a Secondary Cell Group, SCG, configuration, in an RRC reconfiguration message, RRCReconfiguration**, associated with at least one target candidate cell of the candidate target-secondary node. The method further includes transmitting another RRC reconfiguration message, RRCReconfiguration, to the UE, wherein the RRCReconfiguration message comprises:

an SCG measurement configuration comprising a configuration of at least one measurement identifier referred in an execution condition for CPC, wherein the SCG measurement configuration is included within another RRC reconfiguration message, RRCReconfiguration*, to be applied by the UE upon reception; and at least one conditional reconfiguration for CPC, the conditional reconfiguration comprising for the at least one target candidate cell of the candidate target-secondary node: the SCG configuration; and the execution condition for CPC, wherein the UE is to apply the SCG configuration upon fulfillment of the execution condition for CPC. The method further includes receiving, from the UE, a reconfiguration complete message, RRCReconfigurationComplete, indicating that the UE has received and applied the RRCReconfiguration message, wherein the RRCReconfigurationComplete message comprises an embedded second reconfiguration complete message, RRCReconfigurationComplete*, indicating that the UE has received and applied the RRCReconfiguration*** message.

According to certain embodiments a method by a base station operating as a source Secondary Node for a user equipment, UE, for facilitating a conditional secondary cell change includes transmitting, to a master node: a change request for a change from the base station to a candidate target-secondary node, the change request including an indication that the change request is for the conditional secondary cell change; a configuration of execution conditions for the conditional secondary cell change, the configuration of execution conditions comprising one or multiple measurement identifiers, MeasID(s), mapped to a target candidate cell of the candidate target-secondary node, and a Secondary Cell Group, SCG, measurement configuration comprising a configuration of at least one measurement identifier referred in an execution condition for conditional primary secondary cell, PSCell, change, CPC, wherein the SCG measurement configuration is included within an RRC reconfiguration message, RRCReconfiguration*, to be applied by the UE upon reception. The method further includes receiving, from the master node, a reconfiguration complete message, RRCReconfigurationComplete*, that indicates that the UE has received and applied the RRCReconfiguration*** message including the SCG measurement configuration. The method further includes receiving, from the master node, a confirmation message indicating a confirmation for the base station to release base station resources.

According to certain embodiments a method by a base station operating as a candidate target-secondary node for a user equipment, UE, for facilitating a conditional secondary cell change includes receiving, from a master node, a request message including conditional flag information to facilitate the conditional secondary cell change. The method further includes transmitting, based at least in part on receiving the request message, a response message to the master node, the response message including a cell group configuration associated with the base station. The method further includes receiving, from the master node, a reconfiguration complete message, RRCReconfigurationComplete**, indicating fulfillment of a condition required for the conditional secondary cell change and indicating that the UE has applied a Secondary Cell Group, SCG, SCG reconfiguration.

According to certain embodiments a method by a user equipment, UE, includes receiving an RRC reconfiguration message, RRCReconfiguration, from a master node, wherein the RRCReconfiguration message comprises: a secondary cell group, SCG, measurement configuration comprising a configuration of at least one measurement identifier referred in an execution condition for a conditional primary secondary cell, PSCell, change, CPC, wherein the SCG measurement configuration is included within another RRC reconfiguration message, RRCReconfiguration*, to be applied by the UE upon reception; and at least one conditional reconfiguration for CPC, the conditional reconfiguration comprising for a target candidate cell of a candidate target-secondary node: the SCG configuration; and the execution condition for CPC, wherein the UE is to apply the SCG configuration upon fulfillment of the execution condition for CPC. The method further includes applying the reconfiguration message and the SCG measurement configuration, within the RRCReconfiguration* message. The method further includes storing an SCG configuration. The method further includes monitoring the fulfillment of the execution conditions for the target candidate cell. The method further includes transmitting, to the master node, a reconfiguration complete message, RRCReconfigurationComplete, indicating that the UE has received and applied the RRCReconfiguration message, wherein the RRCReconfigurationComplete message comprises an embedded second reconfiguration complete message, RRCReconfigurationComplete*, indicating that the UE has received and applied the RRCReconfiguration* message.

According to other embodiments, a communication device, computer program, and/or computer program product is provided for performing the above methods.

BRIEF DESCRIPTION OF THE DRAWINGS

The accompanying drawings, which are included to provide a further understanding of the disclosure and are incorporated in and constitute a part of this application, illustrate certain non-limiting embodiments of the present disclosure. In the drawings:

FIG. 19 shows an example process according to various aspects of the present disclosure.

FIG. 20 shows an example process according to various aspects of the present disclosure.

Not all steps shown in the figures are necessary to be performed in the present disclosure. One or more steps shown in the figures may be optional and may be omitted while realizing the salient features of the present disclosure.

DETAILED DESCRIPTION

The present disclosure will now be described more fully hereinafter with reference to the accompanying drawings, in which examples of embodiments of the present disclosure are shown. The present disclosure may, however, be embodied in many different forms and should not be construed as limited to the embodiments set forth herein. Rather, these embodiments are provided so that this disclosure will be thorough and complete, and will fully convey the scope of present the present disclosure to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As described above, in rel-16 only the case intra-SN case without MN involvement for CPC is supported, i.e., where S-SN and T-SN are the same node in picture 10.5.1-2 from TS 37.340. That means that the cell is changed, but both the old and the new cell are in the same node.

Problems: There currently exist certain challenge(s). The problem that the present disclosure addresses relates to a new scenario to be supported in Rel-17 which is when a UE is operating in Multi-Radio Dual Connectivity (MR-DC), i.e. having a connection with a Master Node (MN) and a Secondary Node (SN) and, UE needs to be configured with an inter-SN, SN initiated Conditional PSCell Change (CPC) i.e. when at least one target candidate PSCell in CPC is associated to a target candidate SN (T-SN) that is not the same node as the source SN (S-SN) the UE is connected to. In existing solutions, both in the standards and known prior art, there is no signaling and associated procedures supporting inter-SN, SN initiated Conditional PSCell Change (CPC).

Figure 1:
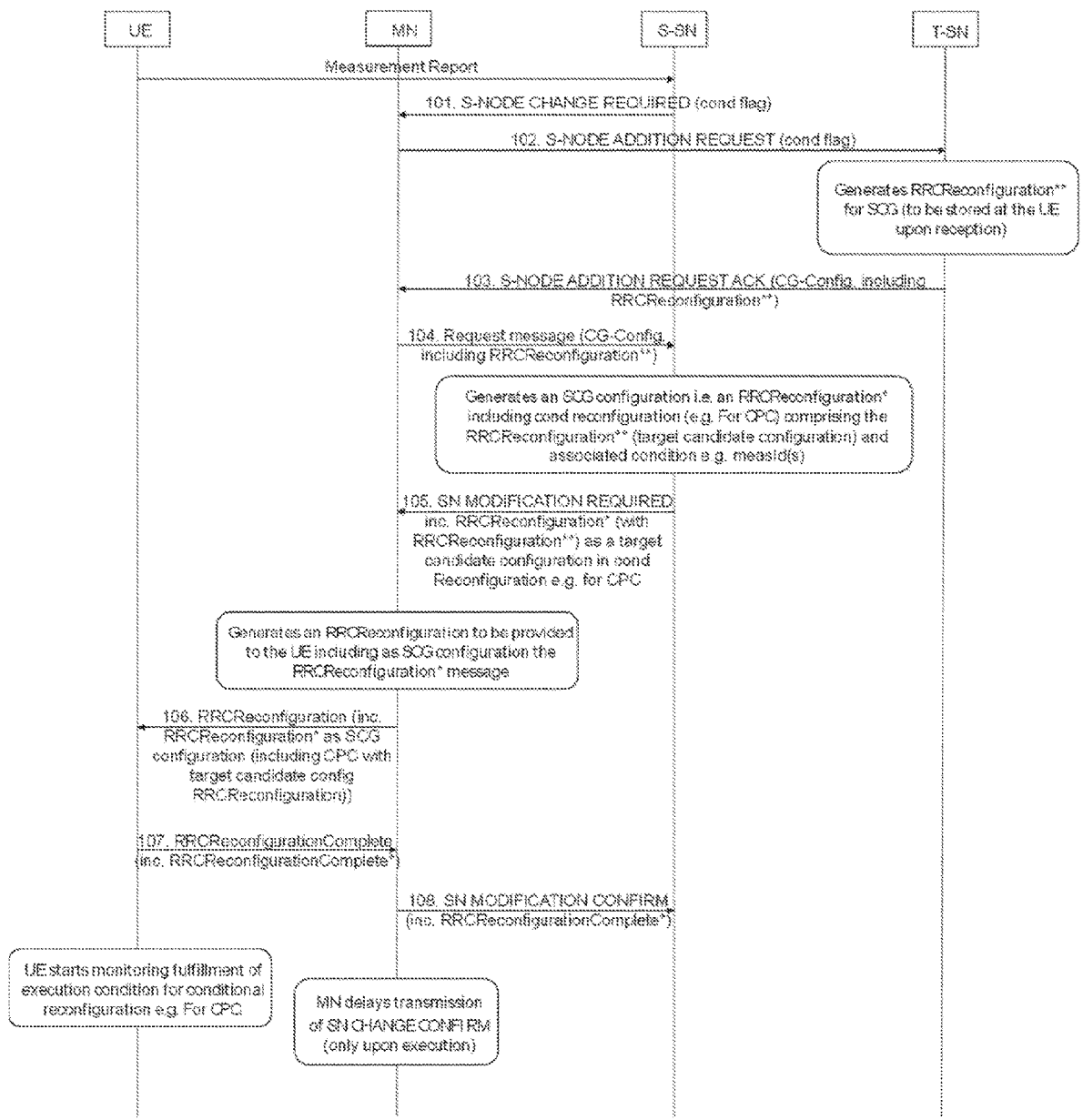
FIG. 1 shows an example preparation phase associated with an embodiment related to option 1a, according to various aspects of the present disclosure.

Assuming the existing signaling and procedures for SN-initiated PSCell Change, with reference to the Legacy procedure for inter-SN, SN initiated PSCell Change in Rel-15, the following problems would exist:

If the legacy procedure for SN-initiated inter-SN PSCell Change (as shown in FIG. 1 of Rel-15) would be reused for inter-SN SN initiated CPC, the source SN would initiate the SN change procedure by sending SgNB Change Required message which contains target SN ID information and may include the SCG configuration (to support delta configuration) and measurement results related to the target SN.

A first problem with that legacy step is that only a single target candidate is requested from the S-SN, which is fine for legacy but in the conditional procedure create issues as the S-SN has some uncertainty on the exact target candidate SN the UE may change to upon CPC execution.

A second problem with that legacy step is that S-SN is requiring the MN to perform a change to a target SN (T-SN), which will lead the MN to trigger the T-SN to prepare for a coming UE within a short time (when the UE receives the RRC Reconfiguration as generated by the T-SN, applies it and perform random access with the SpCell of the SCG associated to the T-SN. However, in CPC, the UE may come (i.e., access the PSCell) with a longer time, or may not even come (in case the UE accesses another prepared candidate). That may affect the way the T-SN prepare its resources for the preparation procedure and determines the acceptance of the UE, so that thinking that this is a legacy procedure and timers may be set to a low value and, when UE does not come, the T-SN declares a failure in the procedure while in reality the procedure has not really failed, but is simply a conditional procedure. Resource reservation may also be different in the T-SN if the addition is conditional (i.e., to avoid reserving resources that may never be used).

With reference to steps 2 and/or 3 of the legacy procedure, if the legacy procedure would be used, the MN would request the target SN to allocate resources for the UE by means of the SgNB Addition procedure, including the measurement results related to the target SN received from the source SN. If forwarding is needed, the target SN provides forwarding addresses to the MN. The target SN includes the indication of the full or delta RRC configuration.

A first problem with that legacy step is that the SgNB Addition procedure is used to request resources to be added within a short time, as described in the problems for step 1, while in CPC resources are allocated but only accessed if/when the UE accesses (i.e., upon fulfillment of a condition).

A second problem is that in the legacy procedure the MN includes the measurement results related to the target SN received from the source SN. However, as the UE may access that target SN after a longer time than in legacy (e.g., seconds or minutes later) in CPC, the situation of the cells reported in these measurements from MN to T-SN may have completely changed upon CPC execution. In other words, the Target SN (T-SN) may have added/changed/released SCG SCell(s) based on measurements that upon execution are not valid any longer, so the UE may end up with SCells that it shouldn't, or worse, the UE may release SCell(s) that are in very good conditions.

With reference to steps 4 and/or 5 of the legacy procedure, if the legacy procedure would be used, the MN would trigger the UE to apply the new configuration. The MN would then indicate the new configuration to the UE in the RRCConnectionReconfiguration message including the NR RRC configuration message generated by the target SN. The UE would apply the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

A first problem with that legacy step is that the T-SN has created a configuration to be applied upon reception. However, in CPC, there should be an execution condition (sometimes only called a condition in the document) associated to the RRC Reconfiguration message to be stored so that the RRC Reconfiguration message is only applied upon fulfilment of the condition. And, in CPC, it is not clear which node should define that condition (i.e., exact thresholds and/or exact events A3/A5 associated, quantities, etc.) and create the message with the condition associated to the target candidate SN. In Rel-16, this problem has been discussed and the following has been agreed for the intra-SN case:

Agreements
. . .
4 Both the execution condition and the configuration for the candidate PSCell (as a container) can be included in the RRCReconfiguration message generated by the SN for intra-SN conditional PSCell change initiated by the SN (without MN involvement).
. . .

However, as that is for intra-SN, it is not clear at all how that should be modified to the inter-SN CPC case, where there is one S-SN and one or multiple T-SN. In other words, even if Rel-16 solution is proposed for the inter-SN CPC case, it is still not clear whether the condition is set by the S-SN, or by each T-SN candidate (and depending which node sets the conditions, how they are set and conveyed between nodes and to the UE e.g., which node constructs the RRC Reconfiguration message that contains the conditions).

A second problem in the legacy procedure is that in legacy a single procedure/step is used to acknowledge the compliance of MN and target SN configurations, while in CPC this needs to be done in 2-steps: first acknowledge the preparation (to MN and each SN that prepared some configuration), and the CPC execution (e.g., the target candidate SN for which procedure is executed).

In legacy this single step is that the UE receives an RRCReconfiguration from MN, having an RRCReconfiguration for the SCG. Then, UE responds with an RRCReconfigurationComplete to MN (via the MCG) including an RRCReconfigurationComplete to acknowledge the successful compliance with the SCG configuration, wherein the complete message is to be forwarded from MN to SN (since the SN is the node that has prepared the SCG reconfiguration message). In other words, in a single step the UE sends complete messages to ACK all configurations from SN and MN.

In the CPC Rel-16 solution, the following has been agreed to address the 2-step issue: Agreements (RAN2 #109e)
. . .
6) If SRB3 is not configured, the UE first informs the MN that the message has been received. Then the UE needs to provide the CPC complete message to the SN via the MN upon CPC execution.
. . .
S1_2: As in legacy PSCell change, the UE sends RRCReconfigurationComplete to the MN at execution of CPC when no SRB3 is configured and the MN informs the SN. i.e., the complete message to MN includes an embedded complete message to the SN.

S1_3: The UE sends RRCReconfigurationComplete to the MN at configuration of CPC when no SRB3 is configured and the MN informs the SN. i.e., the complete message to the MN includes an embedded complete message to the SN.

In Rel-16, S-SN and T-SN are the same node, hence, when the agreement refers to the SN there is no ambiguity. However, in Rel-17, for CPC with SN change the S-SN may be different from the one or more T-SN candidates. Hence, it is not clear to which node which complete message is forwarded. It is particularly unclear, how the MN is aware of which target candidate SN the complete message is associated to, in case multiple target candidate cells associated to multiple target candidate SN(s) were configured.

With reference to step 6 of the legacy procedure, in case the legacy step would have been used, if the allocation of target SN resource would have been successful, the MN would confirm the release of the source SN resources. If data forwarding is needed the MN provides data forwarding addresses to the source SN. If direct data forwarding is used for SN terminated bearers, the MN provides data forwarding addresses as received from the target SN to source SN. Reception of the SgNB Change Confirm message triggers the source SN to stop providing user data to the UE and, if applicable, to start data forwarding.

A first problem with that legacy step is that if the MN confirms the release of S-SN resources upon receiving the complete message from the UE, S-SN resources would be released even though UE is still monitoring CPC conditions for a possible target candidate SN, i.e., the UE would stop operating in MR-DC, which is not desired in this scenario of inter-SN CPC during preparation.

A second problem relates to data forwarding. In legacy procedure data forwarding can be done when the UE is configured to perform PSCell change. However, in CPC, there may be early or late data forwarding i.e., it is not clear when that step is to be performed or, even if it should be performed. For late data forwarding, the S-SN does not know when to send SN STATUS TRANSFER and freeze PDCP before starting data forwarding.

With reference to step 7 of the legacy procedure, if the RRC connection reconfiguration procedure was successful, the MN informs the target SN via SgNB Reconfiguration Complete message with the encoded NR RRC response message for the target SN, if received from the UE.

As described above, it is not clear to which node the complete message is to be forwarded in the inter-SN CPC case, to be standardized in Rel-17.

With reference to step 8 of the legacy procedure, the UE synchronizes to the target SN.

With reference to step 9 of the legacy procedure, for SN terminated bearers using RLC AM, the source SN sends the SN Status Transfer, which the MN sends then to the target SN, if needed.

With reference to step 10 of the legacy procedure, if applicable, data forwarding from the source SN takes place. It may be initiated as early as the source SN receives the SgNB Change Confirm message from the MN.

With reference to step 11 of the legacy procedure, the source SN sends the Secondary RAT Data Usage Report message to the MN and includes the data volumes delivered to and received from the UE over the NR radio for the related E-RABs.

NOTE 4: The order the source SN sends the Secondary RAT Data Usage Report message and performs data forwarding with MN/target SN is not defined. The SgNB may send the report when the transmission of the related bearer is stopped.

With reference to steps 12-16 of the legacy procedure, if applicable, a path update is triggered by the MN.

With reference to step 17 of the legacy procedure, upon reception of the UE Context Release message, the source SN releases radio and C-plane related resources associated to the UE context. Any ongoing data forwarding may continue.

Brief Summary: Certain aspects of the present disclosure and their embodiments may provide solutions to these or other challenges. The method describes different alternatives for Conditional PSCell Change (CPC) configuration and execution with SN change, comprising methods on a wireless terminal (also called a User Equipment—UE) capable of operating in Multi-Radio Dual Connectivity (MR-DC) User Equipment (UE) and on network nodes. The alternatives are based upon which node creates the final message sent to the UE. Option 1 contains different variants, but all variants with the source SN creating the final message. These alternatives later detailed are the following:

Option 1) The source SN creates/generates the final message based on input from the target SN, signalled via the MN In the first option the S-SN is the network node generating the final CPC configuration (included in the SCG RRC Reconfiguration, e.g., RRCReconfiguration*) that is to be provided to the UE.

In option 1a there are parallel network procedures for the same UE signaling connection.

In option 1b there are no parallel network procedures and a new PSCell Change Success message.

Option 1c is similar to option 1b, but with a new message for transfer of the target configuration to the source SN, in order to keep the current S-NODE CHANGE CONFIRM procedure unchanged.

Option 1d is an alternative embodiment.

Option 2) The MN could build the final message based on input from the SNs

In this option the MN is the network node generating the final CPC configuration, included as an MN configuration, while the SCG measConfig is provided to the UE as an SCG RRC Reconfiguration, e.g., RRCReconfiguration***. In this alternative the S-SN sends to the MN the execution conditions (e.g., in the form of measId(s)) and the mappings to the target candidate PSCell(s).

Option 3) The target SN builds the final message. The conditions are transferred to the target SN via the MN.

In this option the candidate T-SN is the network node generating the final CPC configuration, included as an SCG/SN configuration, together with the SCG measConfig in e.g., RRCReconfiguration*. In this alternative the S-SN sends to the MN the execution conditions (e.g., in the form of measId(s)) and the mappings to the target candidate PSCell(s), that are then provided to the T-SN in the S-NODE ADDITION REQUEST message (or equivalent message).

Option 4) The MN builds the final message. The source SN obtains the CG-Config from each target candidate directly, builds the conditionalReconfiguration and forwards to the MN.

In this option the S-SN is the network node generating the final CPC configuration (included in the SCG RRC Reconfiguration, e.g., RRCReconfiguration*) that is to be provided to the UE, as in Option 1 i.e., option 4 shares some of the advantages of Option 1. For example, one advantage is that from the UE's perspective, a CPC configuration with SN change and without SN change remains similar. Another advantage is that the MN does not need to understand the configurations created by the S-SN or T-SN candidate(s), which may be even more beneficial in the case MN and S-SN/T-SN candidates belong to different RATs, like in NE-DC and/or EN-DC.

Option 5) The MN builds the final message. The source SN obtains the CG-Config from each target candidate directly, builds the conditionalReconfiguration and forwards to the MN.

In this option, as in Option 4, the S-SN communicates with the T-SN to obtain the configuration(s) of target candidate PSCell(s) e.g., RRCReconfiguration*. However, differently from Option 4, the S-SN provides these target candidate PSCell(s) e.g., RRCReconfiguration* to the MN, together with conditional configuration(s) and SCG related measConfig for CPC, so the MN generates the final CPC configuration to be included in an RRCReconfiguration* (and possibly includes the SCG measConfig as an SCG configuration). As the generation of the CPC message is done by the MN, from that perspective Option 5 is similar to Option 3 (where the message in step 1 from the S-SN to the MN includes condition configurations and SCG measConfig for CPC).

Even in the steps in each alternative are described as embodiments, the method also comprises combinations of steps from the different alternatives.

There are, proposed herein, various embodiments which address one or more of the issues disclosed herein.

Advantages: Certain embodiments may provide one or more of the following technical advantage(s). The present disclosure makes it possible for a source SN to initiate the configuration of inter-SN conditional PSCell change. Below we list the advantages of each alternative in a high level:

Option 1) In the first option the S-SN is the network node generating the final CPC configuration (included in the SCG RRC Reconfiguration, e.g., RRCReconfiguration*) that is to be provided to the UE. The advantage is that from the UE's perspective, a CPC configuration with SN change and without SN change remains similar. Another advantage is that the MN does not need to understand the configurations created by the S-SN or T-SN candidate(s), which may be even more beneficial in the case MN and S-SN/T-SN candidates belong to different RATs, like in NE-DC and/or EN-DC; The longer RTT is acceptable as it is in the configuration phase of the conditional reconfiguration, which is not a time critical procedure.

Option 2) The MN could build the final message based on input from the SNs. In this option the MN is the network node generating the final CPC configuration, included as an MN configuration, while the SCG measConfig is provided to the UE as an SCG RRC Reconfiguration, e.g., RRCReconfiguration***. In this alternative the S-SN sends to the MN the execution conditions (e.g., in the form of measId(s)) and the mappings to the target candidate PSCell(s). Main advantage is that the CPC preparation phase is faster preparation (1 RTT faster) compared to option 1 and requires more signalling. A first consequence is that from the UE's perspective, a CPC configuration with SN change and without SN change will be slightly different, in the sense that CPC in this case is configured as if it would be a Conditional Handover (i.e., as an MN configuration), except that the UE may get in the same message an SCG measConfig including CHO condition configurations. Another consequence is that the MN would need to build the CPC configuration, not needed in option 1 (wherein the MN does not need to understand the configurations created by the S-SN or T-SN candidate(s)).

Option 3) The target SN builds the final message. The conditions are transferred to the target SN via the MN. In this option the candidate T-SN is the network node generating the final CPC configuration, included as an SCG/SN configuration, together with the SCG measConfig in e.g., RRCReconfiguration*. In this alternative the S-SN sends to the MN the execution conditions (e.g., in the form of measId(s)) and the mappings to the target candidate PSCell(s), that are then provided to the T-SN in the S-NODE ADDITION REQUEST message (or equivalent message). Main advantage is that the CPC preparation phase is faster preparation (1 RTT faster) compared to option 1 and requires more signaling. Compared to option 2, one advantage is that the burden to prepare CPC is on the T-SN, which might be more beneficial in the case where MN and SN are from different RATs e.g., if this is applied for a UE operating in EN-DC. In other words, the MN would not need to understand how to generate a message in SN's format. From the UE's perspective, another benefit is that CPC with or without SN change is configured in a similar manner i.e., as an SN/SG configuration.

Option 4) The MN builds the final message. The source SN obtains the CG-Config from each target candidate directly, builds the conditionalReconfiguration and forwards to the MN. In this option the S-SN is the network node generating the final CPC configuration (included in the SCG RRC Reconfiguration, e.g., RRCReconfiguration*) that is to be provided to the UE, as in Option 1 i.e., option 4 shares some of the advantages of Option 1. For example, one advantage is that from the UE's perspective, a CPC configuration with SN change and without SN change remains similar. Another advantage is that the MN does not need to understand the configurations created by the S-SN or T-SN candidate(s), which may be even more beneficial in the case MN and S-SN/T-SN candidates belong to different RATs, like in NE-DC and/or EN-DC. In addition to these advantages, Option 4 requires less signalling than Option 1 e.g., during preparation phase. In addition, from the MN's perspective, a CPC implementation with or without SN change can benefit from each other i.e., CPC configuration is an SN Modification procedure. In order to make that possible, a consequence of option 4 is the need to define a new procedure and signalling between S-SN and T-SN. Although that is not usual, this could be interpreted as a special case since in a Handover with DC (or CHO with DC), the target MN may also contact a Target SN.

Option 5) The MN builds the final message. The source SN obtains the CG-Config from each target candidate directly, builds the conditionalReconfiguration and forwards to the MN. In this option, as in Option 4, the S-SN communicates with the T-SN to obtain the configuration(s) of target candidate PSCell(s) e.g., RRCReconfiguration*. However, differently from Option 4, the S-SN provides these target candidate PSCell(s) e.g., RRCReconfiguration* to the MN, together with conditional configuration(s) and SCG related measConfig for CPC, so the MN generates the final CPC configuration to be included in an RRCReconfiguration* (and possibly includes the SCG measConfig as an SCG configuration). As the generation of the CPC message is done by the MN, from that perspective Option 5 is similar to Option 3 (where the message in step 1 from the S-SN to the MN includes condition configurations and SCG measConfig for CPC). Main advantage is that the CPC preparation phase is faster (1 RTT faster) compared to option 1 and requires less signalling. Compared to Option 4, Option 5 requires the MN to generate the CPC configuration, which may be an advantage from the S-SN's perspective (S-SN requires simpler implementation).

Below we show a table summarizing the benefits and main characteristics of the different options:

| | Node generating CPC | RTTs for CPC preparation | Complexity at S-SN | Complexity at T-SN | Complexity at MN | Spec impact |
|---|---|---|---|---|---|---|
| Opt.1 | S-SN (as R16) | 2.5 | Low | low | Low/Medium (e.g., new message) | One new message from MN and S-SN |
| Opt.2 | MN | 1.5 | low | low | high: MN is required to generate CPC | New IEs in existing messages, CPC by MN not as in R16 |
| Opt.3 | T-SN | 1.5 | low | high | Low | New IEs in existing messages, CPC by T-SN not as in R16 |
| Opt.4 | S-SN (as R16) | 1.5 | high | high | Low | New principle i.e., S-SN talks to T-SN |
| Opt.5 | MN | 1.5 | low | low | High: MN is required to generate CPC | New principle i.e., S-SN talks to T-SN, CPC by MN not as in R16 |

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The document refers to a UE operating in Multi-Radio Dual Connectivity (MR-DC) according to the NR specifications e.g., TS 37.340, TS 38.331, etc. The present disclosure refers to a first network node operating as a Master Node (MN), e.g., having a Master Cell Group (MCG) configured to the UE and/or an MN-terminated bearer; that MN can be a gNodeB, or a Central Unit gNodeB (CU-gNB) or an eNodeB, or a Central Unit eNodeB (CU-gNB), or any network node and/or network function. The present disclosure also refers to a second network node operating as a Secondary Node (SN), or Source Secondary Node (S-SN) e.g., having a Secondary Cell Group (SCG) configured to the UE and/or an SN-terminated bearer; that SN can be a gNodeB, or a Central Unit gNodeB (CU-gNB) or an eNodeB, or a Central Unit eNodeB (CU-gNB), or any network node and/or network function. Notice that MN, S-SN and T-SN may be from the same or different Radio Access Technologies (and possibly be associated to different Core Network nodes).

The document refers to a target candidate SN, or target SN (T-SN) candidate, as the network node (e.g., gNodeB) that is prepared during the CPC procedure and that creates an RRC Reconfiguration message with an SCG configuration to be provided to the UE and stored, with an execution condition, wherein the UE only applies the message upon the fulfilment of the execution condition. That target candidate SN is associated to one or multiple target candidate cell(s) that the UE can be configured with. The UE then can execute the condition and accesses one of these target candidate cells, associated to a target candidate SN that becomes the target SN after execution (i.e., upon fulfilment of the execution condition).

The document refers to a Conditional PSCell Change (CPC) and/or Conditional PSCell Addition (CPA) and/or Conditional PSCell Change/Addition (CPAC) configuration and procedures (like CPAC execution). Other terms may be considered as synonyms such as conditional reconfiguration, or Conditional Configuration (since the message that is stored and applied upon fulfilment of a condition is an RRCReconfiguration or RRCConnectionReconfiguration). Terminology wise, one could also interpret conditional handover (CHO) in a broader sense, also covering CPC (Conditional PSCell Change) or CPAC (Conditional PSCell Addition/Change) procedures.

The configuration of CPC can be done using the same IEs as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs from TS 38.331:

```
ConditionalReconfiguration
    The IE ConditionalReconfiguration is used to add, modify and release the configuration of
conditional configuration.
    ConditionalReconfiguration information element:
-- ASN1START
-- TAG-CONDITIONALRECONFIGURATION-START
ConditionalReconfiguration-r16 :: =          SEQUENCE {
    attemptCcondReconfig-r16                 ENUMERATED {true}              OPTIONAL, -- Need N
    condConfigToRemoveList-r16               CondConfigToRemoveList-r16     OPTIONAL, -- Need N
    condConfigToAddModList-r16               CondConfigToAddModList-r16     OPTIONAL, -- Need N
    ...
}
CondConfigToRemoveList-r16 ::=       SEQUENCE (SIZE (1..maxNrofCondCells)) OF CondConfigId-r16
-- TAG-CONDITIONALRECONFIGURATION-STOP
-- ASN1STOP
```

ConditionalReconfiguration field descriptions condConfigToAddModList
List of the configuration of candidate SpCells to be added or modified for CHO or CPC.
condConfigToRemoveList
List of the configuration of candidate SpCells to be removed. When the network removes the stored conditional configuration for a candidate cell, the network releases the measIDs associated to the condExecutionCond if it is not used by the condExecutionCond of other candidate cells

```
    CondConfigId
        The IE CondConfigId is used to identify a CHO or CPC configuration.
        CondConfigId information element:
-- ASN1START
-- TAG-CONDCONFIGID-START
CondConfigId-r16 ::=              INTEGER (1..maxNrofCond-Cells)
-- TAG-CONDCONFIGID-STOP
-- ASN1STOP
    CondConfigToAddModList
        The IE CHO-ConfigToAddModList concerns a list of conditional configurations to add or modify, with
for each entry the cho-ConfigId and the associated condExecutionCond and condRRCReconfig.
        CondConfigToAddModList information element:
-- ASN1START
-- TAG-CONDCONFIGTOADDMODLIST-START
CondConfigToAddModList-r16 ::=           SEQUENCE (SIZE (1..maxNrofCondCells)) OF
CondConfigToAddMod-r16
CondConfigToAddMod-r16 ::=       SEQUENCE {
    condConfigId-r16                 CondConfigId-r16,
    condExecutionCond-r16                    SEQUENCE (SIZE (1..2)) OF MeasId OPTIONAL, -- Need S
    condRRCReconfig-r16                      OCTET STRING (CONTAINING RRCReconfiguration)
OPTIONAL, -- Need S
    ...
}
-- TAG-CONDCONFIGTOADDMODLIST-STOP
-- ASN1STOP
```

CondConfigToAddMod field descriptions condExecutionCond
The execution condition that needs to be fulfilled in order to trigger the execution of a conditional configuration.
The field is mandatory present when a condConfigId is being added. Otherwise, when the condRRCReconfig
associated to a condConfigId is being modified it is optionally present and the UE uses the stored value if the
field is absent.
condRRCReconfig
The RRCReconfiguration message to be applied when the condition(s) are fulfilled. The field is mandatory
present when a condConfigId is being added. Otherwise, when the condExecutionCond associated to a
condConfigId is being modified it is optionally present and the UE uses the stored value if the field is absent.

In this disclosure, the terms handover, reconfiguration-WithSync, PSCell change are used in the same context.

The method comprises different embodiments in terms of inter-node signaling and inter-node procedures to configure inter-SN SN-initiated conditional PSCell Change (CPC).

In one set of embodiments, a second network node operating as Source Secondary Node (S-SN) determines to configure Conditional PSCell Change (CPC) for a UE operating in MD-DC. That determination may be based on measurements reports received from the UE, either via SRB3 or SRB1 (via MN). Upon determining to configure CPC, the S-SN transmits an indication to the first network node operating as Master Node (MN) indicating that CPC is to be configured for a given UE.

Option 1a: The source SN creates/generates the final message based on input from the target SN, signalled via the MN. Parallel network procedures over the same UE-associated signalling connection. FIG. 1 shows an example preparation phase associated with the embodiment related to option 1a.

(Step 1, 101) In one embodiment, the node operating as Source Secondary Node (S-SN) for a UE operating in MR-DC determines to configure Conditional PSCell Change (CPC) for the UE, for example, based on measurements reports received from the UE either via SRB3 or SRB1 (via MN). Upon determining to configure CPC, the S-SN sends to the Master Node (MN) an S-NODE CHANGE REQUIRED message including an indication that the request is for CPC (i.e., it is not for a PSCell Change to be performed immediately as in legacy). In FIG. 1, the term "cond flag" has been used as the indication, but this should be seen as an example. The message also contains target SN candidate ID(s) information e.g., as a list and may include the current UE's SCG configuration (to support delta configuration) and measurement results related to the target SN candidate. An alternative for the case where the S-SN determine multiple target candidate cell(s) associated to multiple target candidate SN(s) is the following: the S-SN sends to the MN one message (e.g., S-NODE CHANGE REQUIRED) for each target candidate node (further details are given later).

The node operating as Master Node (MN) receives from the S-SN the S-NODE CHANGE REQUIRED message including an indication that the request is for CPC, and target SN candidate ID(s) information enabling the MN to communication with target candidate SN(s) e.g., as a list and possibly the current UE's SCG configuration (to support delta configuration) and measurement results related to the target SN candidate. Thanks to the CPC indication the MN is aware that it shall not initiate a legacy S-NODE ADDITION procedure, but an S-NODE ADDITION procedure for CPC. Using the target candidate SN ID(s) information the MN knows which target SN candidate to contact.

Below we show an example of an enhanced version of the S-NODE CHANGE REQUIRED according to the method. In this example, a single message is used by the S-SN to indicate multiple target candidate SN(s) to the MN:
(TS 38.423)
9.1.2.11 S-NODE CHANGE REQUIRED This message is sent by the S-NG-RAN node to the M-NG-RAN node to trigger the change of the S-NG-RAN node. Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Target S-NG-RAN node ID | M | | Global NG-RAN Node ID 9.2.2.3 | | YES | reject |
| Cause | M | | 9.2.3.2 | | YES | ignore |
| PDU Session SN Change Required List | | 0 . . . 1 | | | YES | ignore |
| >PDU Session SN Change Required Item | | 1 . . . <maxnoofPDUsessions> | | NOTE: If the PDU Session Resource Change Required Info - SN terminated IE is not present in a | — | |

| | | | | | | |
|---|---|---|---|---|---|---|
| | | | | PDU Session SN Change Required Item IE, abnormal conditions as specified in clause 8.3.5.4 apply. | | |
| >>PDU Session ID | M | | 9.2.3.18 | | — | |
| >>PDU Session Resource Change Required Info - SN terminated | O | | 9.2.1.18 | | — | |
| S-NG-RAN node to M-NG-RAN node Container | M | | OCTET STRING | Includes the CG-Config message as defined in subclause 11.2.2 of TS 38.331 [10]. | YES | reject |
| Conditional SN Change information | O | | ENUMERATED (cpc, . . .) | | YES | ignore |
| Additional candidate Target S-NG-RAN node ID list | | 0 . . . \<maxnoofCPCtargetPerNode\> | | | ALL | ignore |
| >Additional candidate Target S-NG-RAN node ID Iitem | M | | Global NG-RAN Node ID 9.2.2.3 | | — | — |

| Range bound | Explanation |
|---|---|
| maxnoofPDUsessions | Maximum no. of PDU sessions. Value is 256 |
| maxnoofCPCtargetPerNode | Maximum number of Conditional PSCell targets per SN. Value is 8 |

In an alternative example, instead of a list being considered as an indication of that being for CPC there is a separated indication.

Note: The embodiment describes the usage of the S-NODE CHANGE REQUIRED but that should be considered as an example i.e., any other message for the purpose described in Step 1 could be used.

(Step 2, 102) Hence, upon that reception, the node operating as Master Node (MN) sends an S-NODE ADDITION REQUEST message including a CPC indication to a target candidate SN (as indicated in the message from the S-SN via the candidate target SN ID information). The message to the target candidate SN may also include the latest UE's current SCG configuration so that the target candidate can generate an RRC Reconfiguration message for the SCG that is a delta signalling to be possibly applied on top of the UE's current SCG configuration (upon fulfilment of the condition).

In one alternative, the message contains an indication of conditional reconfiguration (as that may be used for other purposes than CPC, e.g., Conditional PSCell Addition). There may also be some distinction between these cases, as the target candidate SN may want to know whether it is being a candidate for PSCell Addition or PSCell Change.

The node operating as candidate Target SN (candidate T-SN) receives the S-NODE ADDITION REQUEST message including a CPC indication from the MN. The Target candidate SN may set the DC timer at a larger value to take into account that the reconfiguration may take more time than in legacy. If the message includes the latest UE's current SCG configuration, the target candidate SN determines to generate an RRC Reconfiguration message for the SCG that is a delta signalling to be possibly applied on top of the UE's current SCG configuration (upon fulfilment of the condition(s)). If the message includes measurements associated to frequencies that are candidates to be SCells of the SCG for that candidate target SN, the candidate T-SN determines to configure SCells in the SCG configuration to be provided to the UE e.g., SCells whose measurements are the strongest according to a quantity like RSRP and/or RSRQ and/or SINR.

Below we show an example of an enhanced version of the S-NODE ADDITION REQUEST according to the method. In this example, the indicator distinguishes SN Addition for the Conditional PSCell Change from the Conditional PSCell Addition:

9.1.2.1 S-NODE ADDITION REQUEST

This message is sent by the M-NG-RAN node to the S-NG-RAN node to request the preparation of resources for dual connectivity operation for a specific UE.

Direction: M-NG-RAN node→S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| UE Security Capabilities | M | | 9.2.3.49 | |
| S-NG-RAN node Security Key | M | | 9.2.3.51 | |
| S-NG-RAN node UE Aggregate Maximum Bit | M | | UE Aggregate | The UE Aggregate Maximum Bit Rate is split into M-NG-RAN node UE Aggregate |

-continued

| | | | | |
|---|---|---|---|---|
| Rate | | | Maximum Bit Rate 9.2.3.17 | Maximum Bit Rate and S-NG-RAN node UE Aggregate Maximum Bit Rate which are enforced by M-NG-RAN node and S-NG-RAN node respectively. |
| Selected PLMN | O | | PLMN Identity 9.2.2.4 | The selected PLMN of the SCG in the S-NG-RAN node. |
| Mobility Restriction List | O | | 9.2.3.53 | |
| Index to RAT/Frequency Selection Priority | O | | 9.2.3.23 | |
| PDU Session Resources To Be Added List | | 1 | | |
| >PDU Session Resources To Be Added Item | | 1 ... <maxnoof PDUSessions> | | NOTE: If neither the PDU Session Resource Setup Info - SN terminated IE nor the PDU Session Resource Setup Info - MN terminated IE is present in a PDU Session Resources To Be Added Item IE, abnormal conditions as specified in clause 8.3.1.4 apply |
| >>PDU Session ID | M | | 9.2.3.18 | |
| >>S-NSSAI | M | | 9.2.3.21 | |
| >>S-NG-RAN node PDU Session Aggregate Maximum Bit Rate | O | | PDU Session Aggregate Maximum Bit Rate 9.2.3.69 | |
| >>PDU Session Resource Setup Info - SN terminated | O | | 9.2.1.5 | |
| >>PDU Session Resource Setup Info - MN terminated | O | | 9.2.1.7 | |
| M-NG-RAN node to S-NG-RAN node Container | M | | OCTET STRING | Includes the CG-ConfigInfo message as defined in subclause 11.2.2 of TS 38.331 [10] |
| S-NG-RAN node UE XnAP ID | O | | NG-RAN node UE XnAP ID 9.2.3.16 | Allocated at the S-NG-RAN node |
| Expected UE Behaviour | O | | 9.2.3.81 | |
| Requested Split SRBs | O | | ENUMERATED (srb1, srb2, srb1&2, ...) | Indicates that resources for Split SRBs are requested. |
| PCell ID | O | | Global NG-RAN Cell Identity 9.2.2.27 | |
| Desired Activity Notification Level | O | | 9.2.3.77 | |
| Available DRB IDs | C-ifSNterminated | | DRB List 9.2.1.29 | Indicates the list of DRB IDs that the S-NG-RAN node may use for SN-terminated bearers. |
| S-NG-RAN node Maximum Integrity Protected Data Rate Uplink | O | | Bit Rate 9.2.3.4 | The S-NG-RAN node Maximum Integrity Protected Data Rate Uplink is a portion of the UE's Maximum Integrity Protected Data Rate in the Uplink, which is enforced by the S-NG-RAN node for the UE's SN terminated PDU sessions. If the S-NG-RAN node Maximum Integrity Protected Data Rate Downlink IE is not present, this IE applies to both UL and DL. |
| S-NG-RAN node Maximum Integrity Protected Data Rate Downlink | O | | Bit Rate 9.2.3.4 | The S-NG-RAN node Maximum Integrity Protected Data Rate Downlink is a portion of the UE's Maximum Integrity Protected Data Rate in the Downlink, which is enforced by the S-NG-RAN node for the UE's SN terminated PDU sessions. |
| Location Information at S-NODE reporting | O | | ENUMERATED (pscell, ...) | Indicates that the user's Location Information at S-NODE is to be provided. |
| MR-DC Resource Coordination Information | O | | 9.2.2.33 | Information used to coordinate resource utilisation between M-NG-RAN node and S-NG-RAN node. |
| Masked IMEISV | O | | 9.2.3.32 | |
| NE-DC TDM Pattern | O | | 9.2.2.38 | |
| SN Addition Trigger Indication | O | | ENUMERATED (SN change, | This IE indicates the trigger for S-NG-RAN node Addition Preparation |

-continued

| | | | | | |
|---|---|---|---|---|---|
| Trace Activation | O | | inter-MN HO, intra-MN HO, . . .) 9.2.3.55 | procedure | |
| Requested Fast MCG recovery via SRB3 | O | | ENUMERATED (true, . . .) | Indicates that the resources for fast MCG recovery via SRB3 are requested. | |
| UE Radio Capability ID | O | | 9.2.3.138 | | |
| CPC Information | O | | ENUMERATED (cpc, . . .) | Indicates that the procedure is triggered for a Conditional PSCell Change | |

| Range bound | Explanation |
|---|---|
| maxnoofPDUSessions | Maximum no. of PDU sessions. Value is 256 |

| Condition | Explanation |
|---|---|
| ifSNterminated | This IE shall be present if there is at least one PDU Session Resource Setup Info - SN terminated in the PDU Session Resources To Be Added List IE. |

(Step 3, 103) The node operating as candidate Target SN (candidate T-SN) sends to the MN an S-NODE ADDITION REQUEST ACKNOWLEDGE message, including an RRC Reconfiguration message (e.g., RRCReconfiguration created/generated by that target candidate SN) associated to at least one Secondary Cell Group, wherein the SpCell and SCells of the SCG are associated to the target candidate SN. That RRC Reconfiguration (RRCReconfiguration) can be, e.g., included in an RRC container like the CG-Config. Below we show an example:

S-NODE ADDITION REQUEST ACKNOWLEDGE

This message is sent by the S-NG-RAN node to confirm the M-NG-RAN node about the S-NG-RAN node addition preparation (or S-NG-RAN node addition preparation for Conditional reconfiguration).

Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| . . . | . . . | | . . . | | . . . | |
| S-NG-RAN node to M-NG-RAN node Container | M | | OCTET STRING | Includes the CG-Config message as defined in subclause 11.2.2 of TS 38.331 [10]. Note: in the example above this is includes the RRCReconfiguration** generated by the target candidate SN. | YES | reject |
| Location Information at S-NODE | O | | Target Cell Global ID 9.2.3.25 | Contains information to support localisation of the UE | YES | ignore |
| MR-DC Resource Coordination Information | O | | 9.2.2.33 | Information used to coordinate resource utilisation between M-NG-RAN node and S-NG-RAN node. | YES | ignore |

```
. . .
(TS 38.331)
    CG-Config message
-- ASN1START
-- TAG-CG-CONFIG-START
. . .
CG-Config-IEs ::=        SEQUENCE {
    scg-CellGroupConfig          OCTET STRING (CONTAINING RRCReconfiguration)          OPTIONAL,
    scg-RB-Config                OCTET STRING (CONTAINING RadioBearerConfig)           OPTIONAL,
    configRestrictModReq             ConfigRestrictModReqSCG                           OPTIONAL,
    drx-InfoSCG              DRX-Info                                                  OPTIONAL,
    candidateCellInfoListSN          OCTET STRING (CONTAINING MeasResultList2NR)       OPTIONAL,
```

```
                                                                                                           -continued measConfigSN                   MeasConfigSN                                OPTIONAL,
    selectedBandCombination            BandCombinationInfoSN                       OPTIONAL,
    fr-InfoListSCG                 FR-InfoList                                 OPTIONAL,
    candidateServingFreqListNR         CandidateServingFreqListNR                  OPTIONAL,
    nonCriticalExtension           CG-Config-v1540-IEs                         OPTIONAL
}
MeasConfigSN ::=                   SEQUENCE {
    measuredFrequenciesSN                  SEQUENCE (SIZE (1..maxMeasFreqsSN)) OF NR-FreqInfo OPTIONAL,
    ...
}
...
-- TAG-CG-CONFIG-STOP
-- ASN1STOP
```

```
...
scg-CellGroupConfig
Contains the RRCReconfiguration message (containing only secondaryCellGroup and/or measConfig):
    -          to be sent to the UE, used upon SCG establishment, modification or conditional reconfiguration for a
               target candidate SCG (e.g. CPC), as generated (entirely) by the (target) SgNB (or target candidate
               SgNB in case of conditional reconfiguration for CPC). In this case, the SN sets the
               RRCReconfiguration message in accordance with clause 6 e.g. regarding the "Need" or "Cond"
               statements.
        or
    -          including the current SCG configuration of the UE, when provided in response to a query from MN, or in
               SN triggered SN change in order to enable delta signaling by the target SN. In this case, the SN sets the
               RRCReconfiguration message in accordance with clause 11.2.3.
The field is absent if neither SCG (re)configuration nor SCG configuration query nor SN triggered SN change is
performed, e.g. at inter-node capability/configuration coordination which does not result in SCG (re)configuration
towards the UE. This field is not applicable in NE-DC.
```

Hence, according to this step, the field scg-CellGroup-Config of CG-Config (included in the S-NODE ADDITION REQUEST ACKNOWLEDGE message sent from the candidate T-SN to the MN) is set to the RRCReconfiguration** i.e., the reconfiguration of the target candidate SCG (to be stored upon reception at the UE, but only applied upon fulfilment of the execution condition).

Procedure for requesting an SCG configuration (for a UE already in MR-DC)

(Step 4, 104) Upon reception of the S-NODE ADDITION REQUEST ACKNOWLEDGE message, the MN sends a request message (S-NODE xxx REQUEST) to the source SN (S-SN) requesting a configuration that is to be provided to the UE e.g., a conditional reconfiguration for CPC. That request message includes the RRC Reconfiguration(s) generated by the target candidate(s) SN (e.g., RRCReconfiguration** received within CG-Config as described in the previous step). In one alternative, the MN includes in the request message the CG-Config received in the from the candidate Target SN (T-SN) in the S-NODE ADDITION REQUEST ACKNOWLEDGE i.e., the request message contains a container for an RRC configuration which in this case, comprises the RRC Reconfiguration from a Target SN candidate. Below we show an example of such message:

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| S-NG-RAN node UE XnAP ID | M | | NG-RAN node UE XnAP ID 9.2.3.16 | Allocated at the S-NG-RAN node |
| Candidate PSCells List | | 1 | | |
| >Candidate PSCells Item | | 1 ... <maxnoof CPCtarget> | | |
| >>Candidate PSCell ID | M | | Global NG-RAN Cell Identity 9.2.2.27 | |
| >>S-NG-RAN node to M-NG-RAN node Container | M | | OCTET STRING | RRCReconfiguration message as defined in TS 36.331 |

| Range bound | Explanation |
|---|---|
| maxnoofPDUsessions | Maximum no. of PDU sessions. Value is 256 |
| maxnoofCPCtarget | Maximum number of Conditional PSCell targets per SN. Value is 8 |

Upon reception of the request message (S-NODE xxx REQUEST) from the MN, the S-SN generates a new RRC Reconfiguration message (e.g., RRCReconfiguration* generated by the S-SN) to be provided to the UE (via the MN as an SCG configuration, wherein that new RRC Reconfiguration message (RRCReconfiguration* created by the S-SN) contains at least a conditional reconfiguration (e.g., field conditionalReconfiguration and/or IE ConditionalReconfiguration for CPC). The conditional reconfiguration comprises at least one of the following:
- The RRC Reconfiguration generated by the target candidate SN (e.g., RRCReconfiguration**), provided to the S-SN by the MN in the request message;
- An execution condition associated to it e.g., pointing to one or multiple MeasId(s);

In addition, that new RRC Reconfiguration message (RRCReconfiguration* created by the S-SN) may contain a measurement configuration associated to the measId(s) for conditional reconfiguration i.e., having conditional reconfiguration as report Type.

When generating of the new RRC message to be an SCG configuration to be applied by the UE upon reception, the S-SN generates the field conditionalReconfiguration of IE ConditionalReconfiguration, as follows:

```
        RRCReconfiguration message
-- ASN1START
-- TAG-RRCRECONFIGURATION-START
...
RRCReconfiguration-IEs ::=          SEQUENCE {
    radioBearerConfig               RadioBearerConfig                               OPTIONAL, -- Need M
    secondaryCellGroup              OCTET STRING (CONTAINING CellGroupConfig)
OPTIONAL, -- Need M
    measConfig                      MeasConfig                                      OPTIONAL, -- Need M
    lateNonCriticalExtension        OCTET STRING                                    OPTIONAL,
    nonCriticalExtension            RRCReconfiguration-v1530-IEs                    OPTIONAL
}
RRCReconfiguration-v16xy-IEs ::=    SEQUENCE {
    otherConfig-v16xy               OtherConfig-v16xy                               OPTIONAL, -- Need M
    bap-Config-r16                  SetupRelease { BAP-Config-r16 }                 OPTIONAL, -- Need M
    conditionalReconfiguration-r16  ConditionalReconfiguration-r16                  OPTIONAL, -- Need M
    daps-SourceRelease-r16          ENUMERATED{true}                                OPTIONAL, -- Need N
    sl-ConfigDedicatedNR-r16        SetupRelease {SL-ConfigDedicatedNR-r16}         OPTIONAL, -- Need M
    sl-ConfigDedicatedEUTRA-r16       SetupRelease {SL-ConfigDedicatedEUTRA-r16} OPTIONAL, -- Need M
    nonCriticalExtension            SEQUENCE { }                                    OPTIONAL
}
-- TAG-RRCRECONFIGURATION-STOP
-- ASN1STOP
``` conditionalReconfiguration
Configuration of candidate target SpCell(s) and execution condition(s) for conditional handover or conditional PSCell change. For conditional PSCell change, this field may be present in an RRCReconfiguration message for intra-SN PSCell change or inter-SN PSCell change. The network does not configure a UE with both conditional PCell change and conditional PSCell change simultaneously. The field is absent if any DAPS bearer is configured or if the masterCellGroup includes ReconfigurationWithSync. For conditional PSCell change, the field is absent if the secondaryCellGroup includes ReconfigurationWithSync.
...

```
        ConditionalReconfiguration information element
-- ASN1START
-- TAG-CONDITIONALRECONFIGURATION-START
ConditionalReconfiguration-r16 ::=      SEQUENCE {
    attemptCondReconfig-r16             ENUMERATED {true}                   OPTIONAL, -- Cond PCell
    condReconfigToRemoveList-r16            CondReconfigToRemoveList-r16        OPTIONAL, -- Need N
    condReconfigToAddModList-r16            CondReconfigToAddModList-r16        OPTIONAL, -- Need N
    ...
}
CondReconfigToRemoveList-r16 ::=        SEQUENCE (SIZE (1..maxNrofCondCells-r16)) OF CondReconfigId-r16
-- TAG-CONDITIONALRECONFIGURATION-STOP
-- ASN1STOP
```

ConditionalReconfiguration field descriptions

...
condReconfigToAddModList
List of the configuration of candidate SpCells to be added or modified for CHO or CPC.
...

```
...
        CondReconfigToAddModList information element
-- ASN1START
-- TAG-CONDRECONFIGTOADDMODLIST-START
CondReconfigToAddModList-r16 ::=            SEQUENCE (SIZE (1..maxNrofCondCells-r16)) OF
CondReconfigToAddMod-r16
CondReconfigToAddMod-r16 ::=                SEQUENCE {
    condReconfigId-r16                      CondReconfigId-r16,
    condExecutionCond-r16                   SEQUENCE (SIZE (1..2)) OF MeasId OPTIONAL, -- Cond
condReconfigAdd
    condRRCReconfig-r16                     OCTET STRING (CONTAINING RRCReconfiguration) OPTIONAL, -- Cond
condReconfigAdd
    ...
```

}
-- TAG-CONDRECONFIGTOADDMODLIST-STOP
-- ASN1STOP

CondReconfigToAddMod field descriptions condExecutionCond
The execution condition that needs to be fulfilled in order to trigger the execution of a conditional reconfiguration.
When configuring 2 triggering events (MeasId's) for a candidate cell, network ensures that both refer to the same measObject.
condRRCReconfig
The RRCReconfiguration message to be applied when the condition(s) are fulfilled. The RRCReconfiguration message contained in condRRCReconfig cannot contain the field conditionalReconfiguration.

In one example, the S-SN sets the condRRCReconfig field (or equivalent) to be included in CondReconfigToAddMod-List (for the target candidate cell associated to the target SN candidate for CPC) to the RRCReconfiguration**, originally generated by the candidate T-SN. If there have been multiple target candidate cells (from the same or different SN(s)), that step is repeated for each candidate cell.

In one example, the S-SN sets the condExecutionCond (one or multiple MeasId(s)) based on an SCG measurement configuration is either already configured to the UE. Or, alternatively, that measurement configuration can be a measConfig field of IE MeasConfig included in the same SCG RRC Reconfiguration (e.g., RRCReconfiguration*) including the conditional reconfiguration e.g., for CPC. That measConfig contains the measId(s) later referred in the execution condition, which are associated to a measurement object (in the frequency of the target candidate SCG) and whose reportType in reportCon fig of IE ReportConfigNR is set to condTriggerConfig of IE CondTriggerConfig, as follows:

tion for CPC. However, an alternative is to define that message as the end message of the procedure where the S-SN requests the MN to obtain RRC Reconfiguration(s) for an SN-initiated inter-SN change for CPC from target candidate SN(s). In that sense, what has been called a request message could have instead be considered a final acknowledgement message or a transfer of configuration (optional and to be used in case the S-NODE CHANGE REQUIRED message for SN-initiated inter-SN change is actually for CPC), rather than a request.

(Step 5, 105) The Source SN (S-SN), after having generated the SCG RRC reconfiguration to be provided to the UE (e.g., RRCReconfiguration* in the example and FIG. 1) including the conditional reconfiguration and possibly measurement configuration associated to the conditional reconfiguration, sends that in a message to the MN (to be provided to the UE).

In one alternative solution, the message to the MN is a new message defined to be a response to the previously described request message (S-NODE xxx REQUEST).

```
ReportConfigNR ::=              SEQUENCE {
  reportType                      CHOICE {
    periodical                      PeriodicalReportConfig,
    eventTriggered                    EventTriggerConfig,
    ...,
    reportCG                        ReportCGI,
    reportSFTD                      ReportSFTD-NR,
    condTriggerConfig-r16             CondTriggerConfig-r16,
    cli-Periodical-r16              CLI-PeriodicalReportConfig-r16,
    cli-EventTriggered-r16             CLI-EventTriggerConfig-r16
  }
}
CondTriggerConfig-r16 ::=       SEQUENCE {
  condEventId                     CHOICE {
    condEventA3                     SEQUENCE {
      a3-Offset                       MeasTriggerQuantityOffset,
      hysteresis                      Hysteresis,
      timeToTrigger                     TimeToTrigger
    },
    condEventA5                     SEQUENCE {
      a5-Threshold1                     MeasTriggerQuantity,
      a5-Threshold2                     MeasTriggerQuantity,
      hysteresis                      Hysteresis,
      timeToTrigger                     TimeToTrigger
    },
    ...
  },
  rsType-r16          NR-RS-Type,
  ...
}
```

In the description of Step 4 (104), the term "request message" was used for the S-NODE xxx REQUEST to be sent to the source SN (S-SN) requesting a configuration that is to be provided to the UE e.g., a conditional reconfigura- In another alternative solution, the message is an S-NODE MODIFICATION REQUIRED. The difference from legacy SN-initiated CPC defined in Rel-16 would be that there have been previous steps enabling the S-SN to acquire configurations from the target candidate SN(s), thanks to the support of the MN (that requested the target candidate configurations from the candidate T-SN(s)). These previous steps could have been defined as a set of procedures separated from this one, wherein the request message described in step 5 (105) is actually the final message of the previous procedure whose main purpose was to provide to the S-SN the target candidate configuration(s). Then, once they are finished the S-SN can continue the procedure as in legacy CPC R16, which is one of the advantages of overall Option 1. The S-NODE MODIFICATION REQUIRED can also contain an indicator signaling that the procedure is linked to step 1 for CPC, in order to distinguish from legacy S-NODE MODIFICATION REQUIRED. Below we show an example of how the S-NODE MODIFICATION REQUIRED could be used:

S-NODE MODIFICATION REQUIRED

This message is sent by the S-NG-RAN node to the M-NG-RAN node to request the modification of S-NG-RAN node resources for a specific UE.

Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Cause | M | | 9.2.3.2 | | YES | ignore |
| ... | ... | ... | ... | | ... | ... |
| S-NG-RAN node to M-NG-RAN node Container | O | | OCTET STRING | Includes the CG-Config message as defined in subclause 11.2.2 of TS 38.331 [10]. Note: in the example above this is includes the RRCReconfiguration* | YES | ignore |
| ... | ... | ... | ... | | ... | ... |
| Conditional SN Change information | O | | ENUMERATED (cpc, ... ) | | YES | reject |

The message can also be enhanced with a new cause in 9.2.3.2, indicating that a CPC procedure is to be configured. The MN, upon receiving from the S-SN the SCG RRC reconfiguration (including the conditional reconfiguration), generates an RRC Reconfiguration (e.g., RRCReconfiguration in MN format) to be finally provided to the UE. When generating that RRC message (RRCReconfiguration) to include the SCG configuration to be applied by the UE upon reception (i.e., RRCReconfiguration*), the MN sets the nr-SCG field in the IE MRDC-SecondaryCellGroupConfig to the SCG RRC Reconfiguration (e.g., RRCReconfiguration*) received from the S-SN.

```
    RRCReconfiguration message
-- ASN1START
-- TAG-RRCRECONFIGURATION-START
...
RRCReconfiguration-v1560-IEs ::=           SEQUENCE {
    mrdc-SecondaryCellGroupConfig              SetupRelease { MRDC-SecondaryCellGroupConfig }
OPTIONAL, -- Need M
    radioBearerConfig2                         OCTET STRING (CONTAINING RadioBearerConfig)
OPTIONAL, -- Need M
    sk-Counter                             SK-Counter                         OPTIONAL, -- Need N
    nonCriticalExtension                   RRCReconfiguration-v16xy-IEs       OPTIONAL
}
MRDC-SecondaryCellGroupConfig ::=          SEQUENCE {
    mrdc-ReleaseAndAdd                         ENUMERATED {true}                  OPTIONAL, --
Need N
    mrdc-SecondaryCellGroup                    CHOICE {
        nr-SCG                             OCTET STRING (CONTAINING RRCReconfiguration),
        eutra-SCG                          OCTET STRING
}
```

```
}
}
-- TAG-RRCRECONFIGURATION-STOP
``` mrdc-SecondaryCellGroup
Includes an RRC message for SCG configuration in NR-DC or NE-DC.
For NR-DC (nr-SCG), mrdc-SecondaryCellGroup contains the RRCReconfiguration message as generated
(entirely) by SN gNB, except in the case of conditional reconfiguration (e.g. CPC) where part of the message may
have been generated by a target candidate SN, gNB. In this version of the specification, the RRC message can only
include fields secondaryCellGroup and measConfig (and in case conditional reconfiguration, e.g., CPC, is
configured, measConfig may contain reportConfig whose reportType is set to condTriggerConfig).
For NE-DC (eutra-SCG), mrdc-SecondaryCellGroup includes the E-UTRA RRCConnectionReconfiguration
message as specified in TS 36.331 [10]. In this version of the specification, the E-UTRA RRC message can only
include the field scg-Configuration.

(Step 6, 106) After generating the RRC Reconfiguration message (RRCReconfiguration including an nr-SCG field set to the RRCReconfiguration*), the MN sends the RRC Reconfiguration message to the UE.

(Step 7, 107) Upon reception of the message, the UE applies the received RRCReconfiguration and applies the nr-SCG configuration (including the conditional reconfiguration, e.g., for CPC). Upon applying the nr-SCG configuration the UE configures the conditional reconfiguration (i.e., start the monitoring of execution condition(s) and store the RRC Reconfiguration for each target candidate PSCell, e.g., RRCReconfiguration**).

In response to the configuration, the UE generates two complete messages: a first associated to the SCG RRC Reconfiguration (e.g., a complete message RRCReconfigurationComplete* message in response to RRCReconfiguration*) and acknowledging the reception of the conditional reconfiguration, to be included inside another RRCReconfigurationComplete in response to the RRC Reconfiguration from the MN. One reason for having two complete messages is that CPC is generated by the SN.

```
                        RRCReconfigurationComplete message
-- ASN1START
-- TAG-RRCRECONFIGURATIONCOMPLETE-START
...
RRCReconfigurationComplete-v1560-IEs ::=    SEQUENCE {
    scg-Response                                CHOICE {
        nr-SCG-Response                             OCTET STRING (CONTAINING RRCReconfigurationComplete),
        eutra-SCG-Response                          OCTET STRING
    }                                               OPTIONAL,
    nonCriticalExtension                        RRCReconfigurationComplete-v16xy-IEs
OPTIONAL
}
...
-- TAG-RRCRECONFIGURATIONCOMPLETE-STOP
-- ASN1STOP
```

RRCReconfigurationComplete-IEs field descriptions scg-Response
In case of NR-DC (nr-SCG-Response), this field includes the RRCReconfigurationComplete message. In case
of NE-DC (eutra-SCG-Response), this field includes the E-UTRA RRCConnectionReconfigurationComplete
message as specified in TS 36.331 [10]. During the configuration of conditional reconfiguration with an SCG
configuration (e.g. CPC), this field includes the RRCReconfigurationComplete message to be transferred to the
Source SN that has generated the SCG configuration including conditional reconfiguration.

...

5.3.5.3 Reception of an RRCReconfiguration by the UE
The UE shall perform the following actions upon reception of the RRCReconfiguration, or upon execution of the
conditional reconfiguration (CHO or CPC):
   ...
   1>    set the content of the RRCReconfigurationComplete message as follows:
            ...
            2>    if the RRCReconfiguration message includes the mrdc-SecondaryCellGroupConfig with mrdc-
                  SecondaryCellGroup set to eutra-SCG:
                    3>    include in the eutra-SCG-Response the E-UTRA RRCConnectionReconfigurationComplete
                          message in accordance with TS 36.331 [10] clause 5.3.5.3;
            2>    if the RRCReconfiguration message includes the mrdc-SecondaryCellGroupConfig with mrdc-
                  SecondaryCellGroup set to nr-SCG:
                    3>    include in the nr-SCG-Response the RRCReconfigurationComplete message;
   ...

Considering our example, the UE sets the nr-SCG-Response to the RRCReconfigurationComplete*, to be included in the RRCReconfigurationComplete message transmitted to the MN.

(Step 8, 108) The MN, upon reception of the RRCReconfigurationComplete including the SCG RRC Reconfiguration Complete (i.e., including nr-SCG-Response set to e.g. RRCReconfigurationComplete*), sends the RRCReconfigurationComplete* to the Source SN (which was the node that has generate the RRCReconfiguration* message i.e. the SCG configuration containing the conditional reconfiguration, and possibly a measurement configuration associated).

In one alternative, the MN sends to the S-SN an SgNB Modification Confirm message, confirming that the SCG configuration at the UE has been modified i.e., that CPC has been configured. That should not trigger the S-SN to release resources. This conditional reconfiguration configuration step (preparation) can indeed be seen as an S-SN modification, as CPC is something configured by the S-SN.

S-NODE MODIFICATION CONFIRM

This message is sent by the M-NG-RAN node to inform the S-NG-RAN node about the successful modification.

Direction: M-NG-RAN node→S-NG-RAN node.

tion, the S-SN does not release resources for the UE, as the communication continues as before until the condition is fulfilled and the UE executes the conditional reconfiguration e.g., CPC. It can be said that the release of resources is delayed i.e., the step to send an S-NODE CHANGE CONFIRM is delayed, compared to the legacy procedure of SN Change.

At this point one can consider that conditional reconfiguration is configured (preparation phase): the UE is monitoring the execution conditions, candidate target SN (T-SN) is/are prepared, and S-SN has been acknowledged that the UE has successfully applied conditional reconfiguration.

Figure 2:
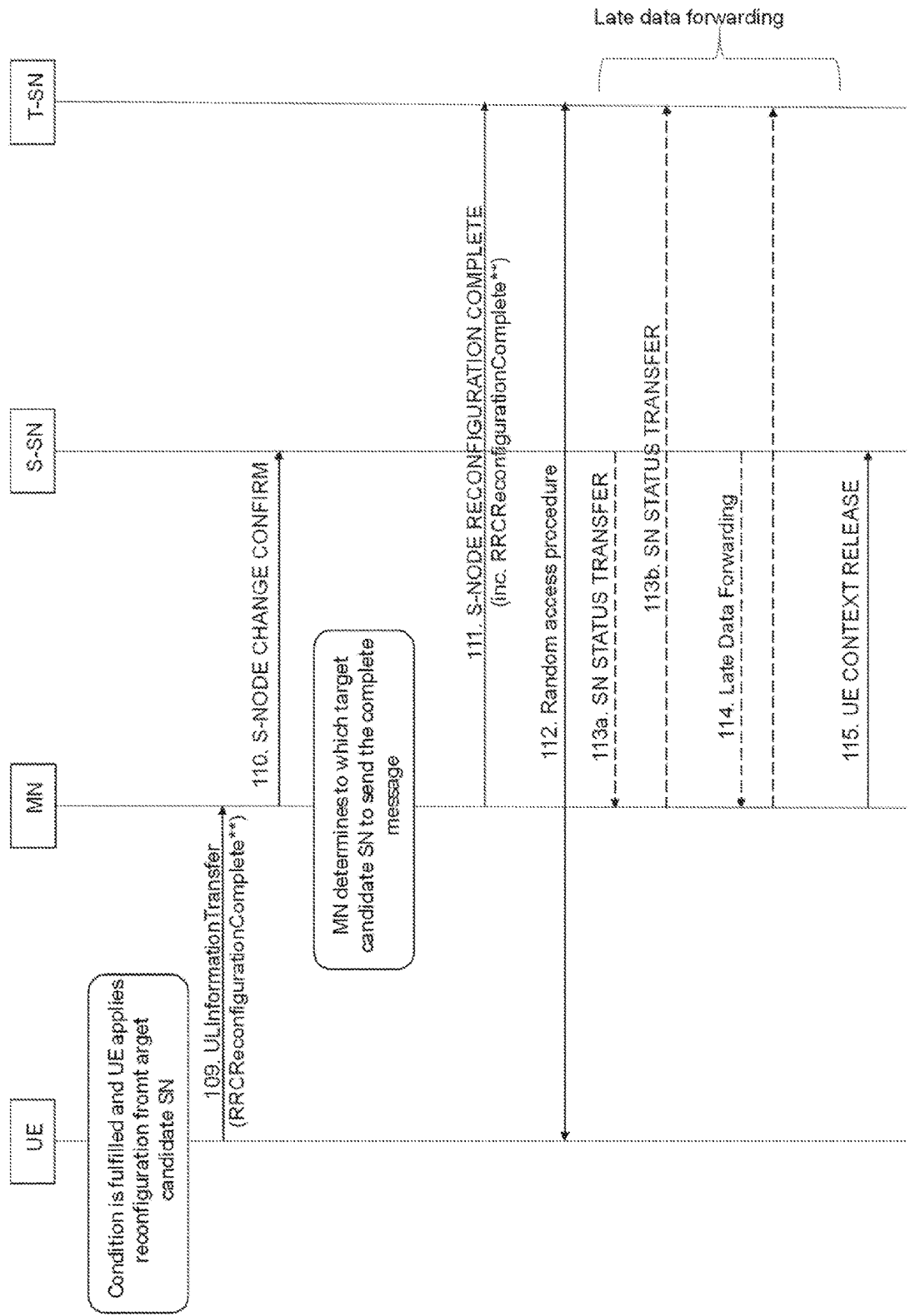
FIG. 2 shows an example execution phase associated with an embodiment related to option 1a, according to various aspects of the present disclosure.

Execution Phase:

After the UE is configured with conditional reconfiguration the UE starts to monitor the execution condition(s) associated to the target candidate's RRC Reconfiguration (e.g., RRCReconfiguration**). FIG. 2 shows an example execution phase associated with the embodiment related to option 1a, according to various aspects of the present disclosure.

(Step 9, 109) Upon fulfilment of the condition, the UE applies the associated target candidate's RRC Reconfiguration (e.g., RRCReconfiguration**). As part of that, the UE

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | ignore |
| S-NG-RAN node UE XnAP ID | M | | NG-RAN node UE XnAP ID 9.2.3.16 | Allocated at the S-NG-RAN node | YES | ignore |
| PDU sessions Admitted To Be Modified List | | 0 . . . 1 | | | YES | ignore |
| M-NG-RAN node to S-NG-RAN node Container | O | | OCTET STRING | Includes the RRCReconfigurationComplete message as defined in subclause 6.2.2 of TS 38.331 [10] or the RRCConnectionReconfigurationComplete message as defined in subclause 6.2.2 of TS 36.331 [14]. In the case conditional reconfiguration e.g., CPC is being configured, the complete message is sent to the S-SN during configuration. | YES | ignore |

In the legacy SN-initiated SN change (see TS 37.340), the message from the MN to S-SN is an S-NODE CHANGE CONFIRM, which confirms to the S-SN that UE has applied the T-SN configuration. That leads the S-SN to release its resources and perform further actions. However, according to the method, e.g., according to this embodiment, upon reception of that message containing the SCG complete message from the UE (or equivalent indication that the UE has successfully applied the SCG configuration including conditional reconfiguration e.g., CPC) during CPC preparagenerates a complete message e.g., RRCReconfigurationComplete, to acknowledge the target candidate SN (T-SN) that the UE has successfully applied the target candidate's RRC Reconfiguration (e.g., RRCReconfiguration). In one alternative that complete message is included in an UL Information Transfer message (e.g., ULInformationTransferMRDC) and submitted to lower layers for transmission via the MN, as shown below (e.g., according to the rules/ IF-else clauses defined):

```
. . .
1>  else if the RRCReconfiguration message was received via SRB1 within the nr-SCG within mrdc-
    SecondaryCellGroup (UE in NR-DC, mrdc-SecondaryCellGroup was received in RRCReconfiguration via
    SRB1):
    2>  if the RRCReconfiguration is applied due to a conditional reconfiguration execution:
        3>  submit the RRCReconfigurationComplete message via the NR MCG embedded in NR RRC
            message ULInformationTransferMRDC as specified in clause 5.7.2a.3.
    2>  if reconfigurationWithSync was included in spCellConfig in nr-SCG:
        3>  initiate the Random Access procedure on the PSCell, as specified in TS 38.321 [3];
```

```
        2>  else
            3>  the procedure ends;
...
5.7.2a      UL information transfer for MR-DC
5.7.2a.1    General
UL information transfer MR-DC is discussed in further detail below.
The purpose of this procedure is to transfer MR-DC dedicated information from the UE to the network e.g., the
NR or E-UTRA RRC MeasurementReport, FailureInformation, RRCReconfigurationComplete or
MCGFailure Information message.
5.7.2a.2 Initiation
A UE in RRC_CONNECTED initiates the UL information transfer for MR-DC procedure whenever there is a need
to transfer MR-DC dedicated information, i.e., the procedure is not used during an RRC connection
reconfiguration involving NR or E-UTRA connection reconfiguration, in which case the MR DC information is
piggybacked to the RRCReconfigurationComplete message.
5.7.2a.3 Actions related to transmission of ULInformation TransferMRDC message
The UE shall set the contents of the ULInformationTransferMRDC message as follows:
    1>  if there is a need to transfer MR-DC dedicated information related to NR:
        2>  set the ul-DCCH-MessageNR to include the NR MR-DC dedicated information to be transferred (e.g.,
            NR RRC MeasurementReport, FailureInformation, RRCReconfigurationComplete or
            MCGFailureInformation message);
    1>  else if there is a need to tranfer MR-DC dedicated information related to E-UTRA:
        2>  set the ul-DCCH-MessageEUTRA to include the E-UTRA MR-DC dedicated information to be
            transferred (e.g., E-UTRA RRC MeasurementReport, FailureInformation, or MCGFailureInformation
            message);
    1>           submit the ULInformationTransferMRDC message to lower layers for transmission, upon which the
        procedure ends.
```

(Step 10, 110) The MN, upon reception of the message from the UE including the complete message acknowledging the successful configuration with the target candidate SN message, sends a message to the Source SN (e.g., S-NODE CHANGE CONFIRM) to confirm the release of the source SN resources.

Notice that in the legacy SN-initiated SN change, MN sends a message to the Source SN (e.g., S-NODE CHANGE CONFIRM) to confirm the release of the source SN resources upon reception of the message from the UE in response to the configuration from MN to the UE. However, according to the method, what triggers the MN to send the message to the Source SN (e.g., S-NODE CHANGE CONFIRM) to confirm the release of the source SN resources is the indication from the UE that the UE has executed conditional reconfiguration e.g., reception of the ULInformationTransferMRDC message.

(Step 11, 111) Upon receiving the complete message from the UE the MN determines to which target candidate SN node is to send the complete message (e.g., RRCReconfigurationComplete**).

One alternative is to use an indication that the UE includes in the complete message e.g., a cell identity for the cell for which conditional reconfiguration has been executed, or a conditional reconfiguration identity, wherein the MN maintains a mapping between a reported identifier and the target candidate SN ID that should receive the complete message.

In one alternative, the MN informs the target SN via SgNB Reconfiguration Complete message with the encoded NR RRC response message for the target SN, if received from the UE.

(Step 12, 112) The UE perform random access procedure with the target candidate cell that has been selected during conditional reconfiguration execution.

(Step 13, 113a-113b) The source SN freezes PDCP and sends the uplink PDCP SN and HFN receiver status and the downlink PDCP SN and HFN transmitter status to the MN in a SN STATUS TRANSFER message (113a). The MN forwards these statuses to one of the target candidate SNs (i.e., the one the UE has accessed) in a SN STATUS TRANSFER message (113b).

(Step 14, 114) The source SN starts data forwarding for the SN-terminated bearers towards the MN, which will forward these packets to the T-SN.

(Step 115) The UE Context is released from the S-SN. In some aspects, Step X may occur any number of steps (including zero (0)) after step 14 (114).

Case with Multiple Target SN Candidates

In one embodiment, the message transmitted from the S-SN to the MN for CPC configuration (e.g., the S-NODE CHANGE REQUIRED) contains information/configuration on one target candidate cell that is a target candidate cell to be the SpCell of the SCG.

In one embodiment, there are multiple messages from the S-SN to the MN for CPC configuration (e.g., multiple instances of the S-NODE CHANGE REQUIRED message), each of them containing information/configuration on one target candidate cell that is a target candidate cell to be the SpCell of the SCG.

In one embodiment, there are multiple messages from the S-SN to the MN for CPC configuration (e.g., multiple instances of the S-NODE CHANGE REQUIRED message), each of them containing information/configuration on a plurality of target candidate cells that are target candidate cells of the same S-SN, wherein one of them may be the SpCell of the SCG.

In another embodiment, the message transmitted from the S-SN to the MN for CPC configuration (e.g., the S-NODE CHANGE REQUIRED) contains information on a plurality of target candidate cells that are target candidate cells, wherein one of them may be the SpCell of the SCG.

Advantages of this Option (1a)

In this option the S-SN is the network node generating the final CPC configuration (included in the SCG RRC Reconfiguration, e.g., RRCReconfiguration*) that is to be provided to the UE. The advantage is that from the UE's perspective, a CPC configuration with SN change and without SN change remains similar. Another advantage is that the MN does not need to understand the configurations created by the S-SN or T-SN candidate(s), which may be even more beneficial in the case MN and S-SN/T-SN candidates belong to different RATs, like in NE-DC and/or EN-DC.

Option 1b: The source SN creates/generates the final message based on input from the target SN, signalled via the MN. No parallel network procedures and a new PSCell Change Success message.

Preparation Phase

Figure 3:
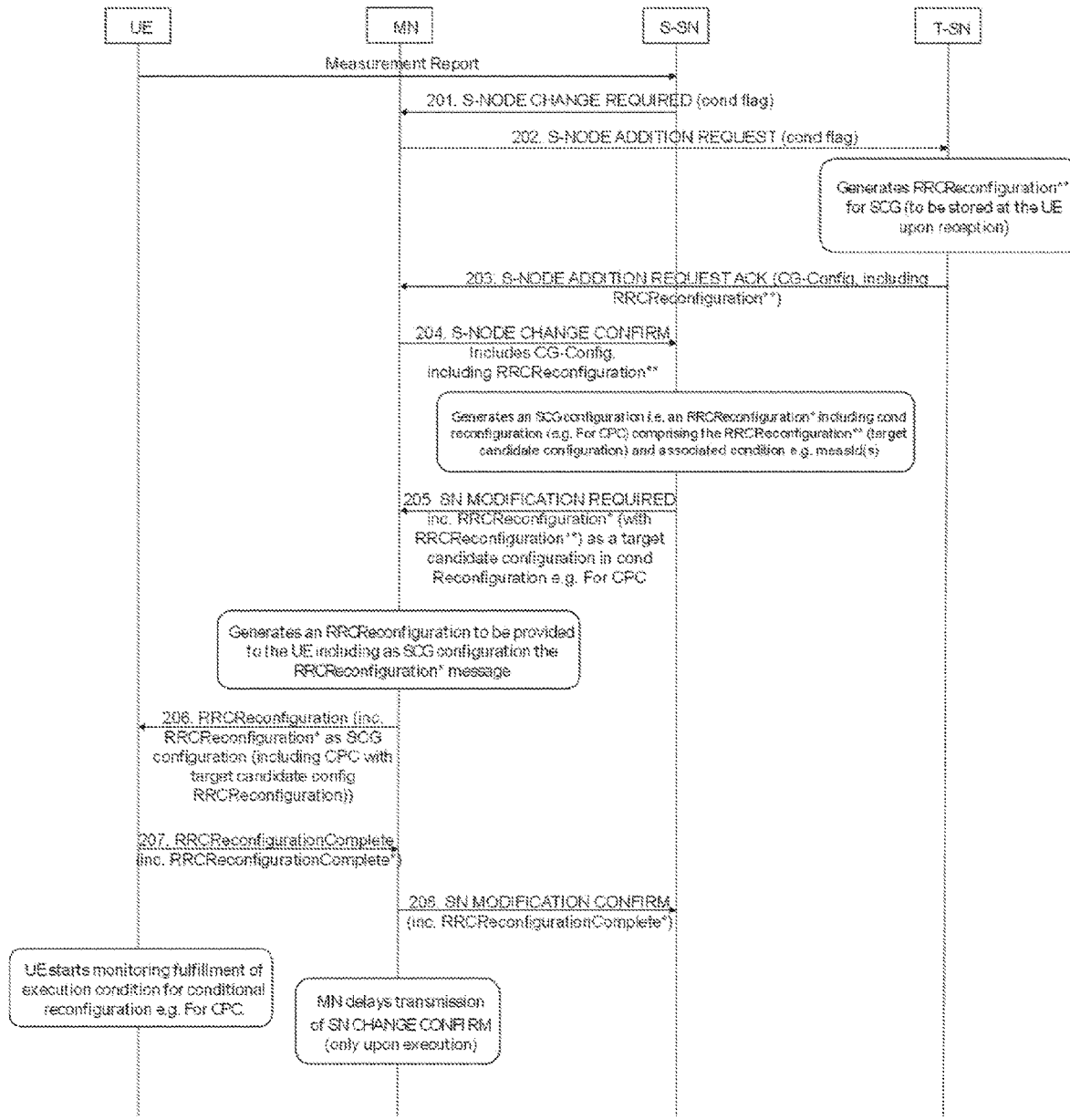
FIG. 3 shows an example preparation phase associated with an embodiment related to option 1b, according to various aspects of the present disclosure.
Figure 4:
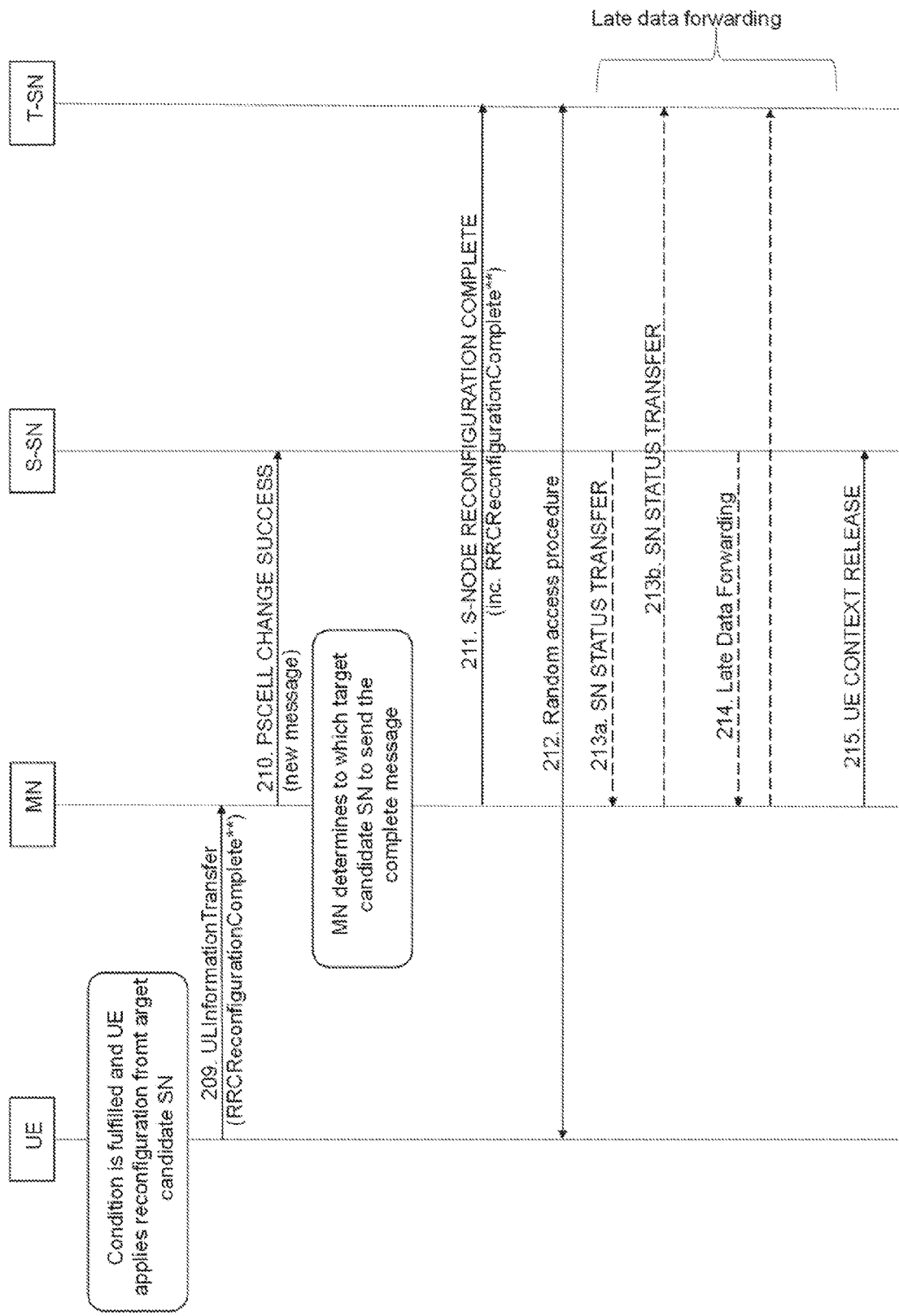
FIG. 4 shows an example execution phase associated with an embodiment related to option 1b, according to various aspects of the present disclosure.

FIG. 3 shows an example preparation phase associated with an embodiment related to option 1b, according to various aspects of the present disclosure.

(Step 1, 201) In one embodiment, the node operating as Source Secondary Node (S-SN) for a UE operating in MR-DC determines to configure Conditional PSCell Change (CPC) for the UE, for example, based on measurements reports received from the UE either via SRB3 or SRB1 (via MN). Upon determining to configure CPC, the S-SN sends to the Master Node (MN) an S-NODE CHANGE REQUIRED message including an indication that the request is for CPC (i.e., it is not for a PSCell Change to be performed immediately as in legacy). In FIG. 3, the term "cond flag" has been used as the indication, but this should be seen as an example. The message also contains target SN candidate ID(s) information e.g., as a list and may include the current UE's SCG configuration (to support delta configuration) and measurement results related to the target SN candidate. An alternative for the case where the S-SN determine multiple target candidate cell(s) associated to multiple target candidate SN(s) is the following: the S-SN sends to the MN one message (e.g., S-NODE CHANGE REQUIRED) for each target candidate node (further details are given later).

The node operating as Master Node (MN) receives from the S-SN the S-NODE CHANGE REQUIRED message including an indication that the request is for CPC, and target SN candidate ID(s) information enabling the MN to communication with target candidate SN(s) e.g., as a list and possibly the current UE's SCG configuration (to support delta configuration) and measurement results related to the target SN candidate. Thanks to the CPC indication the MN is aware that it shall not initiate a legacy S-NODE ADDITION procedure, but an S-NODE ADDITION procedure for CPC. Using the target candidate SN ID(s) information the MN knows which target SN candidate to contact.

Below we show an example of an enhanced version of the S-NODE CHANGE REQUIRED according to the method. In this example, a single message is used by the S-SN to indicate multiple target candidate SN(s) to the MN:
(TS 38.423)
9.1.2.11 S-NODE CHANGE REQUIRED This message is sent by the S-NG-RAN node to the M-NG-RAN node to trigger the change of the S-NG-RAN node. Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| Target S-NG-RAN node ID | M | | Global NG-RAN Node ID 9.2.2.3 | | YES | reject |
| Cause | M | | 9.2.3.2 | | YES | ignore |
| PDU Session SN Change Required List | | 0 . . . 1 | | | YES | ignore |
| >PDU Session SN Change Required Item | | 1 . . . <maxnoofPDUsessions> | | NOTE: If the PDU Session Resource Change Required Info - SN terminated IE is not present in a PDU Session SN Change Required Item IE, abnormal conditions as specified in clause 8.3.5.4 apply. | — | |
| >>PDU Session ID | M | | 9.2.3.18 | | — | |
| >>PDU Session Resource Change Required Info - SN terminated | O | | 9.2.1.18 | | — | |
| S-NG-RAN node to M-NG-RAN node Container | M | | OCTET STRING | Includes the CG-Config message as defined in subclause 11.2.2 of TS 38.331 [10]. | YES | reject |
| Conditional SN Change information | O | | ENUMERATED (cpc, . . . ) | | YES | ignore |
| Additional candidate Target S-NG-RAN node ID list | | 0 . . . <maxnoofCPCtargetPerNode> | | | ALL | ignore |
| >Additional candidate Target S-NG-RAN node ID Iitem | M | | Global NG-RAN Node ID 9.2.2.3 | | — | — |

| Range bound | Explanation |
|---|---|
| maxnoofCPCtargetPerNode | Maximum number of Conditional PSCell targets per SN. Value is 8 |

Note: The embodiment describes the usage of the S-NODE CHANGE REQUIRED but that should be considered as an example i.e., any other message for the purpose described in Step 1 (201) could be used. As an example, a new message e.g., called CONDITIONAL S-NODE CHANGE REQUIRED may be defined instead with similar content as S-NODE CHANGE REQUIRED, but used at conditional reconfigurations.

(Step 2, 202) Hence, upon that reception, the node operating as Master Node (MN) sends an S-NODE ADDITION REQUEST message including a CPC indication to a target candidate SN (as indicated in the message from the S-SN via the candidate target SN ID information). The message to the target candidate SN may also include the latest UE's current SCG configuration so that the target candidate can generate an RRC Reconfiguration message for the SCG that is a delta signalling to be possibly applied on top of the UE's current SCG configuration (upon fulfilment of the condition).

In one alternative, the message contains an indication of conditional reconfiguration (as that may be used for other purposes than CPC, e.g., Conditional PSCell Addition). There may also be some distinction between these cases, as the target candidate SN may want to know whether it is being a candidate for PSCell Addition or PSCell Change.

The node operating as candidate Target SN (candidate T-SN) receives the S-NODE ADDITION REQUEST message including a CPC indication from the MN. The Target candidate SN may set the DC timer at a larger value to take into account that the reconfiguration may take more time than in legacy. If the message includes the latest UE's current SCG configuration, the target candidate SN determines to generate an RRC Reconfiguration message for the SCG that is a delta signalling to be possibly applied on top of the UE's current SCG configuration (upon fulfilment of the condition(s)). If the message includes measurements associated to frequencies that are candidates to be SCells of the SCG for that candidate target SN, the candidate T-SN determines to configure SCells in the SCG configuration to be provided to the UE e.g., SCells whose measurements are the strongest according to a quantity like RSRP and/or RSRQ and/or SINR.

Below we show an example of an enhanced version of the S-NODE ADDITION REQUEST according to the method. In this example, the indicator distinguishes SN Addition for the Conditional PSCell Change from the Conditional PSCell Addition:

(TS 38.423)

9.1.2.1 S-NODE ADDITION REQUEST

This message is sent by the M-NG-RAN node to the S-NG-RAN node to request the preparation of resources for dual connectivity operation for a specific UE.

Direction: M-NG-RAN node→S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| UE Security Capabilities | M | | 9.2.3.49 | |
| S-NG-RAN node Security Key | M | | 9.2.3.51 | |
| S-NG-RAN node UE Aggregate Maximum Bit Rate | M | | UE Aggregate Maximum Bit Rate 9.2.3.17 | The UE Aggregate Maximum Bit Rate is split into M-NG-RAN node UE Aggregate Maximum Bit Rate and S-NG-RAN node UE Aggregate Maximum Bit Rate which are enforced by M-NG-RAN node and S-NG-RAN node respectively. |
| Selected PLMN | O | | PLMN Identity 9.2.2.4 | The selected PLMN of the SCG in the S-NG-RAN node. |
| Mobility Restriction List | O | | 9.2.3.53 | |
| Index to RAT/Frequency Selection Priority | O | | 9.2.3.23 | |
| PDU Session Resources To Be Added List | | 1 | | |
| >PDU Session Resources To Be Added Item | | 1 ... <maxnoof PDUSessions> | | NOTE: If neither the PDU Session Resource Setup Info - SN terminated IE nor the PDU Session Resource Setup Info - MN terminated IE is present in a PDU Session Resources To Be Added Item IE, abnormal conditions as specified in clause 8.3.1.4 apply. |
| >>PDU Session ID | M | | 9.2.3.18 | |
| >>S-NSSAI | M | | 9.2.3.21 | |
| >>S-NG-RAN node PDU Session Aggregate Maximum Bit Rate | O | | PDU Session Aggregate Maximum Bit Rate 9.2.3.69 | |
| >>PDU Session Resource Setup Info - SN terminated | O | | 9.2.1.5 | |
| >>PDU Session Resource Setup Info - MN terminated | O | | 9.2.1.7 | |

| | | | |
|---|---|---|---|
| M-NG-RAN node to S-NG-RAN node Container | M | OCTET STRING | Includes the CG-ConfigInfo message as defined in subclause 11.2.2 of TS 38.331 [10] |
| S-NG-RAN node UE XnAP ID | O | NG-RAN node UE XnAP ID 9.2.3.16 | Allocated at the S-NG-RAN node |
| Expected UE Behaviour | O | 9.2.3.81 | |
| Requested Split SRBs | O | ENUMERATED (srb1, srb2, srb1&2, . . .) | Indicates that resources for Split SRBs are requested. |
| PCell ID | O | Global NG-RAN Cell Identity 9.2.2.27 | |
| Desired Activity Notification Level | O | 9.2.3.77 | |
| Available DRB IDs | C-ifSNterminated | DRB List 9.2.1.29 | Indicates the list of DRB IDs that the S-NG-RAN node may use for SN-terminated bearers. |
| S-NG-RAN node Maximum Integrity Protected Data Rate Uplink | O | Bit Rate 9.2.3.4 | The S-NG-RAN node Maximum Integrity Protected Data Rate Uplink is a portion of the UE's Maximum Integrity Protected Data Rate in the Uplink, which is enforced by the S-NG-RAN node for the UE's SN terminated PDU sessions. If the S-NG-RAN node Maximum Integrity Protected Data Rate Downlink IE is not present, this IE applies to both UL and DL. |
| S-NG-RAN node Maximum Integrity Protected Data Rate Downlink | O | Bit Rate 9.2.3.4 | The S-NG-RAN node Maximum Integrity Protected Data Rate Downlink is a portion of the UE's Maximum Integrity Protected Data Rate in the Downlink, which is enforced by the S-NG-RAN node for the UE's SN terminated PDU sessions. |
| Location Information at S-NODE reporting | O | ENUMERATED (pscell, . . .) | Indicates that the user's Location Information at S-NODE is to be provided. |
| MR-DC Resource Coordination Information | O | 9.2.2.33 | Information used to coordinate resource utilisation between M-NG-RAN node and S-NG-RAN node. |
| Masked IMEISV | O | 9.2.3.32 | |
| NE-DC TDM Pattern | O | 9.2.3.38 | |
| SN Addition Trigger Indication | O | ENUMERATED (SN change, inter-MN HO, intra-MN HO, . . .) | This IE indicates the trigger for S-NG-RAN node Addition Preparation procedure |
| Trace Activation | O | 9.2.3.55 | |
| Requested Fast MCG recovery via SRB3 | O | ENUMERATED (true, . . .) | Indicates that the resources for fast MCG recovery via SRB3 are requested. |
| UE Radio Capability ID | O | 9.2.3.138 | |
| CPC Information | O | ENUMERATED (cpc, . . .) | Indicates that the procedure is triggered for a Conditional PSCell Change |

| Range bound | Explanation |
|---|---|
| maxnoofPDUSessions | Maximum no. of PDU sessions. Value is 256 |

| Condition | Explanation |
|---|---|
| ifSNterminated | This IE shall be present if there is at least one PDU Session Resource Setup Info - SN terminated in the PDU Session Resources To Be Added List IE. |

(Step 3, 203) The node operating as candidate Target SN (candidate T-SN) sends to the MN an S-NODE ADDITION REQUEST ACKNOWLEDGE message, including an RRC Reconfiguration message (e.g., RRCReconfiguration created/generated by that target candidate SN) associated to at least one Secondary Cell Group, wherein the SpCell and SCells of the SCG are associated to the target candidate SN. That RRC Reconfiguration (RRCReconfiguration) can be, e.g., included in an RRC container like the CG-Config. Below we show an example:

S-NODE ADDITION REQUEST ACKNOWLEDGE

This message is sent by the S-NG-RAN node to confirm the M-NG-RAN node about the S-NG-RAN node addition preparation (or S-NG-RAN node addition preparation for Conditional reconfiguration).

Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| ... | ... | | ... | | ... | |
| S-NG-RAN node to M-NG-RAN node Container | M | | OCTET STRING | Includes the CG-Config message as defined in subclause 11.2.2 of TS 38.331 [10]. Note: in the example above this is includes the RRCReconfiguration** generated by the target candidate SN. | YES | reject |
| Location Information at S-NODE | O | | Target Cell Global ID 9.2.3.25 | Contains information to support localisation of the UE | YES | ignore |
| MR-DC Resource Coordination Information | O | | 9.2.2.33 | Information used to coordinate resource utilisation between M-NG-RAN node and S-NG-RAN node. | YES | ignore |
| ... | | | | | | |

In case the T-SN can prepare multiple target candidate cells, the IE within the message may contain multiple configurations for multiple candidate cells. Alternatively, that contains a list of containers for additional CG-config messages related to the additional candidate cells.

```
TS 38.331
    CG-Config message
-- ASN1START
-- TAG-CG-CONFIG-START
CG-Config-IEs ::=           SEQUENCE {
    scg-CellGroupConfig             OCTET STRING (CONTAINING RRCReconfiguration)              OPTIONAL,
    scg-RB-Config              OCTET STRING (CONTAINING RadioBearerConfig)                    OPTIONAL,
    configRestrictModReq            ConfigRestrictModReqSCG                             OPTIONAL,
    drx-InfoSCG             DRX-Info                                    OPTIONAL,
    candidateCellInfoListSN             OCTET STRING (CONTAINING MeasResultList2NR)                OPTIONAL,
    measConfigSN            MeasConfigSN                                    OPTIONAL,
    selectedBandCombination             BandCombinationInfoSN                           OPTIONAL,
    fr-InfoListSCG          FR-InfoList                                 OPTIONAL,
    candidateServingFreqListNR              CandidateServingFreqListNR                          OPTIONAL,
    nonCriticalExtension            CG-Config-v1540-IEs                             OPTIONAL
}
MeasConfigSN ::=        SEQUENCE {
    measuredFrequenciesSN               SEQUENCE (SIZE (1..maxMeasFreqsSN)) OF NR-FreqInfo OPTIONAL,
    ...
}
...
-- TAG-CG-CONFIG-STOP
-- ASN1STOP
```

...
scg-CellGroupConfig
Contains the RRCReconfiguration message (containing only secondaryCellGroup and/or measConfig):
- to be sent to the UE, used upon SCG establishment, modification or conditional reconfiguration for a target candidate SCG (e.g. CPC), as generated (entirely) by the (target) SgNB (or taget candidate SgNB in case of conditional reconfiguration for CPC). In this case, the SN sets the RRCReconfiguration message in accordance with clause 6 e.g. regarding the "Need" or "Cond" statements.
    or
- including the current SCG configuration of the UE, when provided in response to a query from MN, or in SN triggered SN change in order to enable delta signaling by the target SN. In this case, the SN sets the RRCReconfiguration message in accordance with clause 11.2.3.
The field is absent if neither SCG (re)configuration nor SCG configuration query nor SN triggered SN change is performed, e.g. at inter-node capability/configuration coordination which does not result in SCG (re)configuration towards the UE. This field is not applicable in NE-DC.

Hence, according to this step, the field scg-CellGroupConfig of CG-Config (included in the S-NODE ADDITION REQUEST ACKNOWLEDGE message sent from the candidate T-SN to the MN) is set to the RRCReconfiguration**

This message is sent by the M-NG-RAN node to inform the S-NG-RAN node that the preparation of the S-NG-RAN node initiated S-NG-RAN node change was successful.

Direction: M-NG-RAN node→S-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | ignore |
| S-NG-RAN node UE XnAP ID | M | | NG-RAN node UE XnAP ID 9.2.3.16 | Allocated at the S-NG-RAN node | YES | ignore |
| PDU Session SN Change Confirm List | | 0 . . . 1 | | | YES | ignore |
| >PDU Session SN Change Confirm Item | | 1 . . . <maxnoofPDUsessions> | | NOTE: If the PDU Session Resource Change Confirm Info - SN terminated IE is not present in a PDU Session SN Change Confirm Item IE, abnormal conditions as specified in clause 8.3.5.4 apply. | — | |
| >>PDU Session ID | M | | 9.2.3.18 | | — | |
| >>PDU Session Resource Change Confirm Info - SN terminated | O | | 9.2.1.19 | | — | |
| Criticality Diagnostics | O | | 9.2.3.3 | | YES | ignore |
| Candidate PSCells List | | 0 . . . 1 | | | | |
| >Candidate PSCells Item | | 1 . . . <maxnoofCPCtarget> | | | | |
| >>Candidate PSCell ID | M | | Global NG-RAN Cell Identity 9.2.2.27 | | | |
| >>S-NG-RAN node to M-NG-RAN node Container | M | | OCTET STRING | | | |

Note:
The embodiment describes the usage of the S-NODE CHANGE CONFIRM but that should be considered as an example i.e., any other message for the purpose described in Step 1 could be used. As an example, a new message e.g., called CONDITIONAL S-NODE CHANGE CONFIRM may be defined instead with similar content as S-NODE CHANGE CONFIRM, but used at conditional reconfigurations.

i.e., the reconfiguration of the target candidate SCG (to be stored upon reception at the UE, but only applied upon fulfilment of the execution condition).

Procedure for Requesting an SCG Configuration (for a UE Already in MR-DC)

(Step 4, 204) Upon reception of the S-NODE ADDITION REQUEST ACKNOWLEDGE message, the MN sends a S-NODE CHANGE CONFIRM message to the source SN (S-SN) requesting a configuration that is to be provided to the UE e.g., a conditional reconfiguration for CPC. That message includes the RRC Reconfiguration(s) generated by the target candidate(s) SN (e.g., RRCReconfiguration** received within CG-Config as described in the previous step). In one alternative, the MN includes in the message the CG-Config received in the from the candidate Target SN (T-SN) in the S-NODE ADDITION REQUEST ACKNOWLEDGE i.e., the request message contains a container for an RRC configuration which in this case, comprises the RRC Reconfiguration from a Target SN candidate. One possible advantage of using the S-NODE CHANGE CONFIRM message is that the inter-node procedure may be considered as finalized; in other words, the network nodes don't have to maintain parallel procedures for the same UE associated signalling connection.

Below we show an example of such message:
9.1.2.12 S-NODE CHANGE CONFIRM

Upon reception of the S-NODE CHANGE CONFIRM message from the MN, the S-SN generates a new RRC Reconfiguration message (e.g., RRCReconfiguration* generated by the S-SN) to be provided to the UE (via the MN) as an SCG configuration, wherein that new RRC Reconfiguration message (RRCReconfiguration* created by the S-SN) contains at least a conditional reconfiguration (e.g., field conditionalReconfiguration and/or IE ConditionalReconfiguration for CPC). The conditional reconfiguration comprises at least one of the following:

The RRC Reconfiguration generated by the target candidate SN (e.g., RRCReconfiguration**), provided to the S-SN by the MN in the request message;

An execution condition associated to it e.g., pointing to one or multiple MeasId(s);

In addition, that new RRC Reconfiguration message (RRCReconfiguration* created by the S-SN) may contain a measurement configuration associated to the measId(s) for conditional reconfiguration i.e., having conditional reconfiguration as report Type.

When generating of the new RRC message to be an SCG configuration to be applied by the UE upon reception, the S-SN generates the field conditionalReconfiguration of IE ConditionalReconfiguration, as follows:

| RRCReconfiguration message |
|---|

```
-- ASN1START
-- TAG-RRCRECONFIGURATION-START
...
RRCReconfiguration-IEs ::=       SEQUENCE {
    radioBearerConfig            RadioBearerConfig                              OPTIONAL, -- Need M
    secondaryCellGroup           OCTET STRING (CONTAINING CellGroupConfig)
                                                                                OPTIONAL, -- Need M
    measConfig                   MeasConfig                                     OPTIONAL, -- Need M
    lateNonCriticalExtension     OCTET STRING                                   OPTIONAL,
    nonCriticalExtension         RRCReconfiguration-v1530-IEs                   OPTIONAL
}
RRCReconfiguration-v16xy-IEs ::=     SEQUENCE {
    otherConfig-v16xy            OtherConfig-v16xy                              OPTIONAL, -- Need M
    bap-Config-r16               SetupRelease { BAP-Config-r16 }                OPTIONAL, -- Need M
    conditionalReconfiguration-r16   ConditionalReconfiguration-r16             OPTIONAL, -- Need M
    daps-SourceRelease-r16       ENUMERATED{true}                               OPTIONAL, -- Need N
    sl-ConfigDedicatedNR-r16     SetupRelease {SL-ConfigDedicatedNR-r16}   OPTIONAL, -- Need M
    sl-ConfigDedicatedEUTRA-r16      SetupRelease {SL-ConfigDedicatedEUTRA-r16} OPTIONAL, -- Need M
    nonCriticalExtension         SEQUENCE { }                                   OPTIONAL
}
-- TAG-RRCRECONFIGURATION-STOP
-- ASN1STOP
``` conditionalReconfiguration
Configuration of candidate target SpCell(s) and execution condition(s) for conditional handover or conditional PSCell change. For conditional PSCell change, this field may be present in an RRCReconfiguration message for intra-SN PSCell change or inter-SN PSCell change. The network does not configure a UE with both conditional PCell change and conditional PSCell change simultaneously. The field is absent if any DAPS bearer is configured or if the masterCellGroup includes ReconfigurationWith Sync. For conditional PSCell change, the field is absent if the secondaryCellGroup includes ReconfigurationWithSync.
...

| ConditionalReconfiguration information element |
|---|

```
-- ASN1START
-- TAG-CONDITIONALRECONFIGURATION-START
ConditionalReconfiguration-r16 ::=   SEQUENCE {
    attemptCondReconfig-r16      ENUMERATED {true}      OPTIONAL,   -- Cond PCell
    condReconfigToRemoveList-r16     CondReconfigToRemoveList-r16       OPTIONAL,   -- Need N
    condReconfigToAddModList-r16     CondReconfigToAddModList-r16       OPTIONAL,   -- Need N
    ...
}
CondReconfigToRemoveList-r16 ::=    SEQUENCE (SIZE (1.. maxNrofCondCells-r16)) OF CondReconfigId-r16
-- TAG-CONDITIONALRECONFIGURATION-STOP
-- ASN1STOP
```

| ConditionalReconfiguration field descriptions |
|---|

...
    condReconfigToAddModList
    List of the configuration of candidate SpCells to be added or modified for CHO or CPC.
    ...
    ...

| CondReconfigToAddModList information element |
|---|

```
-- ASN1START
-- TAG-CONDRECONFIGTOADDMODLIST-START
CondReconfigToAddModList-r16 ::=   SEQUENCE (SIZE (1.. maxNrofCondCells-r16)) OF
CondReconfigToAddMod-r16
CondReconfigToAddMod-r16 ::=    SEQUENCE {
    condReconfigId-r16           CondReconfigId-r16,
    condExecutionCond-r16        SEQUENCE (SIZE (1..2)) OF MeasId OPTIONAL,   -- Cond
condReconfigAdd
    condRRCReconfig-r16          OCTET STRING (CONTAINING RRCReconfiguration) OPTIONAL,   -- Cond
condReconfigAdd
    ...
}
-- TAG-CONDRECONFIGTOADDMODLIST-STOP
-- ASN1STOP
```

| CondReconfigToAddMod field descriptions |
|---| condExecutionCond
The execution condition that needs to be fulfilled in order to trigger the execution of a conditional reconfiguration. When configuring 2 triggering events (MeasId's) for a candidate cell, network ensures that both refer to the same measObject.
condRRCReconfig

| RRCReconfiguration message |
|---|
| The RRCReconfiguration message to be applied when the condition(s) are fulfilled. The RRCReconfiguration message contained in condRRCReconfig cannot contain the field conditionalReconfiguration. |

In one example, the S-SN sets the condRRCReconfig field (or equivalent) to be included in CondReconfigToAddModList (for the target candidate cell associated to the target SN candidate for CPC) to the RRCReconfiguration**, originally generated by the candidate T-SN. If there have been multiple target candidate cells (from the same or different SN(s)), that step is repeated for each candidate cell.

In one example, the S-SN sets the condExecutionCond (one or multiple MeasId(s)) based on an SCG measurement configuration is either already configured to the UE. Or, alternatively, that measurement configuration can be a measConfig field of IE MeasConfig included in the same SCG RRC Reconfiguration (e.g., RRCReconfiguration*) including the conditional reconfiguration e.g., for CPC. That measConfig contains the measId(s) later referred in the execution condition, which are associated to a measurement object (in the frequency of the target candidate SCG) and whose reportType in reportConfig of IE ReportConfigNR is set to condTriggerConfig of IE CondTriggerConfig, as follows:

```
ReportConfigNR ::=           SEQUENCE {
  reportType                 CHOICE {
    periodical               PeriodicalReportConfig,
    eventTriggered             EventTriggerConfig,
    ...,
    reportCGI                ReportCGI,
    reportSFTD                 ReportSFTD-NR,
    condTriggerConfig-r16      CondTriggerConfig-r16,
    cli-Periodical-r16         CLI-PeriodicalReportConfig-r16,
    cli-EventTriggered-r16     CLI-EventTriggerConfig-r16
  }
}
CondTriggerConfig-r16 ::=    SEQUENCE {
  condEventId                CHOICE {
    condEventA3                SEQUENCE {
      a3-Offset                  MeasTriggerQuantityOffset,
      hysteresis                 Hysteresis,
      timeToTrigger              TimeToTrigger
    },
    condEventA5                SEQUENCE {
      a5-Threshold1              MeasTriggerQuantity,
      a5-Threshold2              MeasTriggerQuantity,
      hysteresis                 Hysteresis,
      timeToTrigger              TimeToTrigger
    },
    ...
  },
  rsType-r16                 NR-RS-Type,
  ...
}
```

(Step 5, 205) The Source SN (S-SN), after having generated the SCG RRC reconfiguration to be provided to the UE (e.g., RRCReconfiguration* in the example and FIG. 1) including the conditional reconfiguration and possibly measurement configuration associated to the conditional reconfiguration, sends that in a message to the MN (to be provided to the UE).

The message is an S-NODE MODIFICATION REQUIRED. The difference from legacy SN-initiated CPC defined in Rel-16 would be that there have been previous steps enabling the S-SN to acquire configurations from the target candidate SN(s), thanks to the support of the MN (that requested the target candidate configurations from the candidate T-SN(s)). These previous steps could have been defined as a set of procedures separated from this one, wherein the request message described in step 5 is actually the final message of the previous procedure whose main purpose was to provide to the S-SN the target candidate configuration(s). Then, once they are finished the S-SN can continue the procedure as in legacy CPC R16, which is one of the advantages of overall Option 1. The S-NODE MODIFICATION REQUIRED can also contain an indicator signaling that the procedure is linked to step 1 for CPC, in order to distinguish from legacy S-NODE MODIFICATION REQUIRED. Below we show an example of how the S-NODE MODIFICATION REQUIRED could be used:

S-NODE MODIFICATION REQUIRED

This message is sent by the S-NG-RAN node to the M-NG-RAN node to request the modification of S-NG-RAN node resources for a specific UE.

Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node XnAP ID | M | | NG-RAN node UE XnAP ID 9.2.3.16 | Allocated at the S-NG-RAN node | YES | reject |
| Cause | M | | 9.2.3.2 | | YES | ignore |
| . . . | . . . | | . . . | | . . . | . . . |
| S-NG-RAN node to M-NG-RAN node Container | O | | OCTET STRING | Includes the CG-Config message as defined in subclause 11.2.2 of TS 38.331 [10]. Note: in the example above this is includes the RRCReconfiguration* | YES | ignore |

| IE/Group Name | Presence | Range | IE type and reference | Semantics description | Criticality | Assigned Criticality |
|---|---|---|---|---|---|---|
| ... | ... | | ... | | ... | ... |
| Conditional SN Change information | O | | ENUMERATED (cpc, . . .) | | YES | reject |

The message can also be enhanced with a new cause in 9.2.3.2, indicating that a CPC procedure is to be configured.

The MN, upon receiving from the S-SN the SCG RRC reconfiguration (including the conditional reconfiguration), generates an RRC Reconfiguration (e.g., RRCReconfiguration in MN format) to be finally provided to the UE. When generating that RRC message (RRCReconfiguration) to include the SCG configuration to be applied by the UE upon reception (i.e., RRCReconfiguration*), the MN sets the nr-SCG field in the IE MRDC-SecondaryCellGroupConfig to the SCG RRC Reconfiguration (e.g., RRCReconfiguration*) received from the S-SN.

| RRCReconfiguration message |
|---|
| -- ASN1START<br>-- TAG-RRCRECONFIGURATION-START<br>...<br>RRCReconfiguration-v1560-IEs ::=          SEQUENCE {<br>   mrdc-SecondaryCellGroupConfig              SetupRelease { MRDC-SecondaryCellGroupConfig }<br>OPTIONAL,   -- Need M<br>   radioBearerConfig2                                   OCTET STRING (CONTAINING RadioBearerConfig)<br>OPTIONAL,   -- Need M<br>   sk-Counter                                                  SK-Counter                                   OPTIONAL,   -- Need N<br>   nonCriticalExtension                               RRCReconfiguration-v16xy-IEs         OPTIONAL<br>}<br>MRDC-SecondaryCellGroupConfig ::=       SEQUENCE {<br>   mrdc-ReleaseAndAdd                             ENUMERATED {true}                    OPTIONAL, -- Need N<br>   mrdc-SecondaryCellGroup                       CHOICE {<br>     nr-SCG                                                 OCTET STRING (CONTAINING RRCReconfiguration),<br>     eutra-SCG                                            OCTET STRING<br>   }<br>}<br>}<br>-- TAG-RRCRECONFIGURATION-STOP | mrdc-SecondaryCellGroup

Includes an RRC message for SCG configuration in NR-DC or NE-DC.

For NR-DC (nr-SCG), mrdc-SecondaryCellGroup contains the RRCReconfiguration message as generated (entirely) by SN gNB, except in the case of conditional reconfiguration (e.g. CPC) where part of the message may have been generated by a target candidate SN, qNB. In this version of the specification, the RRC message can only include fields secondaryCellGroup and measConfig (and in case conditional reconfiguration, e.g., CPC, is configured, measConfig may contain reportConfig whose reportType is set to condTriggerConfig).

For NE-DC (eutra-SCG), mrdc-SecondaryCellGroup includes the E-UTRA RRCConnectionReconfiguration message as specified in TS 36.331 [10]. In this version of the specification, the E-UTRA RRC message can only include the field scg-Configuration.

(Step 6, 206) After generating the RRC Reconfiguration message (RRCReconfiguration including an nr-SCG field set to the RRCReconfiguration*), the MN sends the RRC Reconfiguration message to the UE.

(Step 7, 207) Upon reception of the message, the UE applies the received RRCReconfiguration and applies the nr-SCG configuration (including the conditional reconfiguration, e.g., for CPC). Upon applying the nr-SCG configuration the UE configures the conditional reconfiguration (i.e., start the monitoring of execution condition(s) and store the RRC Reconfiguration for each target candidate PSCell, e.g., RRCReconfiguration**).

In response to the configuration, the UE generates two complete messages: a first associated to the SCG RRC Reconfiguration (e.g., a complete message RRCReconfigurationComplete* message in response to RRCReconfiguration*) and acknowledging the reception of the conditional reconfiguration, to be included inside another RRCReconfigurationComplete in response to the RRC Reconfiguration from the MN. One reason for having two complete messages is that CPC is generated by the SN.

rationComplete* to the Source SN (which was the node that has generate the RRCReconfiguration* message i.e., the SCG configuration containing the conditional reconfiguration, and possibly a measurement configuration associated).

In one alternative, the MN sends to the S-SN an SgNB Modification Confirm message, confirming that the SCG configuration at the UE has been modified i.e., that CPC has been configured. That should not trigger the S-SN to release resources. This conditional reconfiguration configuration

| RRCReconfigurationComplete message |
|---|
| -- ASN1START |
| -- TAG-RRCRECONFIGURATIONCOMPLETE-START |
| ... |
| RRCReconfigurationComplete-v1560-IEs ::=   SEQUENCE { |
|    scg-Response                        CHOICE { |
|       nr-SCG-Response                 OCTET STRING (CONTAINING RRCReconfigurationComplete), |
|       eutra-SCG-Response              OCTET STRING |
|    }                                                                               OPTIONAL, |
|    nonCriticalExtension              RRCReconfigurationComplete-v16xy-IEs                      OPTIONAL |
| } |
| ... |
| -- TAG-RRCRECONFIGURATIONCOMPLETE-STOP |
| -- ASN1STOP |

| RRCReconfigurationComplete-IEs field descriptions |
|---|
| scg-Response |
| In case of NR-DC (nr-SCG-Response), this field includes the RRCReconfigurationComplete message. In case of NE-DC (eutra-SCG-Response), this field includes the E-UTRA RRCConnectionReconfigurationComplete message as specified in TS 36.331 [10]. During the configuration of conditional reconfiguration with an SCG configuration (e.g. CPC), this field includes the RRCReconfigurationComplete message to be transferred to the Source SN that has generated the SCG configuration including conditional reconfiguration. |
| ... |
| 5.3.5.3   Reception of an RRCReconfiguration by the UE |
| The UE shall perform the following actions upon reception of the RRCReconfiguration, or upon execution of the conditional reconfiguration (CHO or CPC): |
| ... |
|    1>      set the content of the RRCReconfigurationComplete message as follows: |
|          ... |
|          2>  if the RRCReconfiguration message includes the mrdc-SecondaryCellGroupConfig with mrdc-SecondaryCellGroup set to eutra-SCG: |
|             3>  include in the eutra-SCG-Response the E-UTRA RRCConnectionReconfigurationComplete message in accordance with TS 36.331 [10] clause 5.3.5.3; |
|          2>  if the RRCReconfiguration message includes the mrdc-SecondaryCellGroupConfig with mrdc-SecondaryCellGroup set to nr-SCG: |
|             3>  include in the nr-SCG-Response the RRCReconfigurationComplete message; |
| ... |

Considering our example, the UE sets the nr-SCG-Response to the RRCReconfigurationComplete*, to be included in the RRCReconfigurationComplete message transmitted to the MN.

(Step 8, 208) The MN, upon reception of the RRCReconfigurationComplete including the SCG RRC Reconfiguration Complete (i.e., including nr-SCG-Response set to e.g., RRCReconfigurationComplete*), sends the RRCReconfigustep (preparation) can indeed be seen as an S-SN modification, as CPC is something configured by the S-SN.

S-Node Modification Confirm

This message is sent by the M-NG-RAN node to inform the S-NG-RAN node about the successful modification.

Direction: M-NG-RAN node→S-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | ignore |
| S-NG-RAN node UE XnAP ID | M | | NG-RAN node UE XnAP ID 9.2.3.16 | Allocated at the S-NG-RAN node | YES | ignore |

| IE/Group Name | Presence | Range | IE type and reference | Semantics description | Criticality | Assigned Criticality |
|---|---|---|---|---|---|---|
| PDU sessions Admitted To Be Modified List | | 0 . . . 1 | | | YES | ignore |
| M-NG-RAN node to S-NG-RAN node Container | O | | OCTET STRING | Includes the RRCReconfigurationComplete message as defined in subclause 6.2.2 of TS 38.331 [10] or the RRCConnectionReconfigurationComplete message as defined in subclause 6.2.2 of TS36.331 [14]. In the case conditional reconfiguration e.g. CPC is being configured, the complete message is sent to the S-SN during configuration. | YES | ignore |

In the legacy SN-initiated SN change (see TS 37.340), the message from the MN to S-SN is an S-NODE CHANGE CONFIRM, which confirms to the S-SN that UE has applied the T-SN configuration. That leads the S-SN to release its resources and perform further actions. However, according to the method, e.g., according to this embodiment, upon reception of that message containing the SCG complete message from the UE (or equivalent indication that the UE has successfully applied the SCG configuration including conditional reconfiguration e.g., CPC) during CPC preparation, the S-SN does not release resources for the UE, as the communication continues as before until the condition is fulfilled and the UE executes the conditional reconfiguration e.g., CPC. It can be said that the release of resources is delayed i.e., the step to send an S-NODE CHANGE CONFIRM is delayed, compared to the legacy procedure of SN Change.

At this point one can consider that conditional reconfiguration is configured (preparation phase): the UE is monitoring the execution conditions, candidate target SN (T-SN) is/are prepared, and S-SN has been acknowledged that the UE has successfully applied conditional reconfiguration.
Execution Phase After the UE is configured with conditional reconfiguration the UE starts to monitor the execution condition(s) associated to the target candidate's RRC Reconfiguration (e.g., RRCReconfiguration**).

(Step 9, 209) Upon fulfilment of the condition, the UE applies the associated target candidate's RRC Reconfiguration (e.g., RRCReconfiguration). As part of that, the UE generates a complete message e.g., RRCReconfigurationComplete, to acknowledge the target candidate SN (T-SN) that the UE has successfully applied the target candidate's RRC Reconfiguration (e.g., RRCReconfiguration**). In one alternative that complete message is included in an UL Information Transfer message (e.g., ULInformationTransferMRDC) and submitted to lower layers for transmission via the MN, as shown below (e.g., according to the rules/ IF-else clauses defined):
. . .
    1> else if the RRCReconfiguration message was received via SRB1 within the nr-SCG within mrdc-SecondaryCellGroup (UE in NR-DC, mrdc-SecondaryCellGroup was received in RRCReconfiguration via SRB1):
        2> if the RRCReconfiguration is applied due to a conditional reconfiguration execution:
            3> submit the RRCReconfigurationComplete message via the NR MCG embedded in NR RRC message ULInformationTransferMRDC as specified in clause 5.7.2a.3.
        2> if reconfigurationWithSync was included in spCellConfig in nr-SCG:
            3> initiate the Random Access procedure on the PSCell, as specified in TS 38.321 [3];
        2> else
            3> the procedure ends;
. . .

5.7.2a UL information transfer for MR-DC
5.7.2a.1 General
. . .
5.7.2a.2 Initiation
A UE in RRC_CONNECTED initiates the UL information transfer for MR-DC procedure whenever there is a need to transfer MR-DC dedicated information i.e., the procedure is not used during an RRC connection reconfiguration involving NR or E-UTRA connection reconfiguration, in which case the MR DC information is piggybacked to the RRCReconfigurationComplete message.
5.7.2a.3 Actions related to transmission of ULInformationTransferMRDC message
The UE shall set the contents of the ULInformationTransferMRDC message as follows:
    1> if there is a need to transfer MR-DC dedicated information related to NR:
        2> set the ul-DCCH-MessageNR to include the NR MR-DC dedicated information to be transferred (e.g., NR RRC MeasurementReport, FailureInformation, RRCReconfigurationComplete or MCGFailureInformation message);
    1> else if there is a need to transfer MR-DC dedicated information related to E-UTRA:
        2> set the ul-DCCH-MessageEUTRA to include the E-UTRA MR-DC dedicated information to be transferred (e.g., E-UTRA RRC MeasurementReport, FailureInformation, or MCGFailureInformation message);
    1> submit the ULInformationTransferMRDC message to lower layers for transmission, upon which the procedure ends;
(Step 10, 210) The MN, upon reception of the message from the UE including the complete message acknowledging the successful configuration with the target candidate SN message, sends a message to the Source SN (e.g., a new PSCell Change Success message) to confirm the release of the source SN resources.

Notice that in the legacy SN-initiated SN change, the MN sends a message to the Source SN (e.g., S-NODE CHANGE CONFIRM) to confirm the release of the source SN resources upon reception of the message from the UE in response to the configuration from MN to the UE. However, according to the method, what triggers the MN to send the message to the Source SN to confirm the release of the source SN resources is the indication from the UE that the UE has executed conditional reconfiguration e.g., reception of the ULInformationTransferMRDC message. An example of such message is given below:

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | ignore |
| S-NG-RAN node UE XnAP ID | M | | NG-RAN node UE XnAP ID 9.2.3.16 | Allocated at the S-NG-RAN node | YES | ignore |
| Candidate PSCell ID | M | | Global NG-RAN Cell Identity 9.2.2.27 | Indicates the target PSCell ID the UE succesfully connected to | YES | reject |

(Step 11, 211) Upon receiving the success message from the UE the MN determines to which target candidate SN node is to send the complete message (e.g., RRCReconfigurationComplete**).

One alternative is to use an indication that the UE includes in the success message e.g., a cell identity for the cell for which conditional reconfiguration has been executed, or a conditional reconfiguration identity, wherein the MN maintains a mapping between a reported identifier and the target candidate SN ID that should receive the complete message.

In one alternative, the MN informs the target SN via SgNB Reconfiguration Complete message with the encoded NR RRC response message for the target SN, if received from the UE.

(Step 12, 212) The UE perform random access procedure with the target candidate cell that has been selected during conditional reconfiguration execution.

(Step 13, 213a-213b) The source SN freezes PDCP and sends the uplink PDCP SN and HFN receiver status and the downlink PDCP SN and HFN transmitter status to the MN in a SN STATUS TRANSFER message (213a). The MN forwards these status to one of the target candidate SNs (i.e., the one the UE has accessed) in a SN STATUS TRANSFER message (213b).

(Step 14, 214) The source SN starts data forwarding for the SN-terminated bearers towards the MN, which will forward these packets to the T-SN.

(Step 215) The UE Context is released from the S-SN. This step may occur any number of steps (including zero (0)) after step 14 (214).

Case with Multiple Target SN Candidates

In one embodiment, the message transmitted from the S-SN to the MN for CPC configuration (e.g., the S-NODE CHANGE REQUIRED) contains information/configuration on one target candidate cell that is a target candidate cell to be the SpCell of the SCG.

In one embodiment, there are multiple messages from the S-SN to the MN for CPC configuration (e.g., multiple instances of the S-NODE CHANGE REQUIRED message), each of them containing information/configuration on one target candidate cell that is a target candidate cell to be the SpCell of the SCG.

In one embodiment, there are multiple messages from the S-SN to the MN for CPC configuration (e.g., multiple instances of the S-NODE CHANGE REQUIRED message), each of them containing information/configuration on a plurality of target candidate cells that are target candidate cells of the same S-SN, wherein one of them may be the SpCell of the SCG.

In another embodiment, the message transmitted from the S-SN to the MN for CPC configuration (e.g., the S-NODE CHANGE REQUIRED) contains information on a plurality of target candidate cells that are target candidate cells, wherein one of them may be the SpCell of the SCG.

Advantages of this Option

In this option the S-SN is the network node generating the final CPC configuration (included in the SCG RRC Reconfiguration, e.g., RRCReconfiguration*) that is to be provided to the UE. The advantage is that from the UE's perspective, a CPC configuration with SN change and without SN change remains similar. Another advantage is that the MN does not need to understand the configurations created by the S-SN or T-SN candidate(s), which may be even more beneficial in the case MN and S-SN/T-SN candidates belong to different RATs, like in NE-DC and/or EN-DC. Compared to 1a the benefit of 1b is that it might make the implementations in MN and S-SN simpler, as it may not require them to have parallel procedures with the same UE-associated signalling connection.

Figure 5:
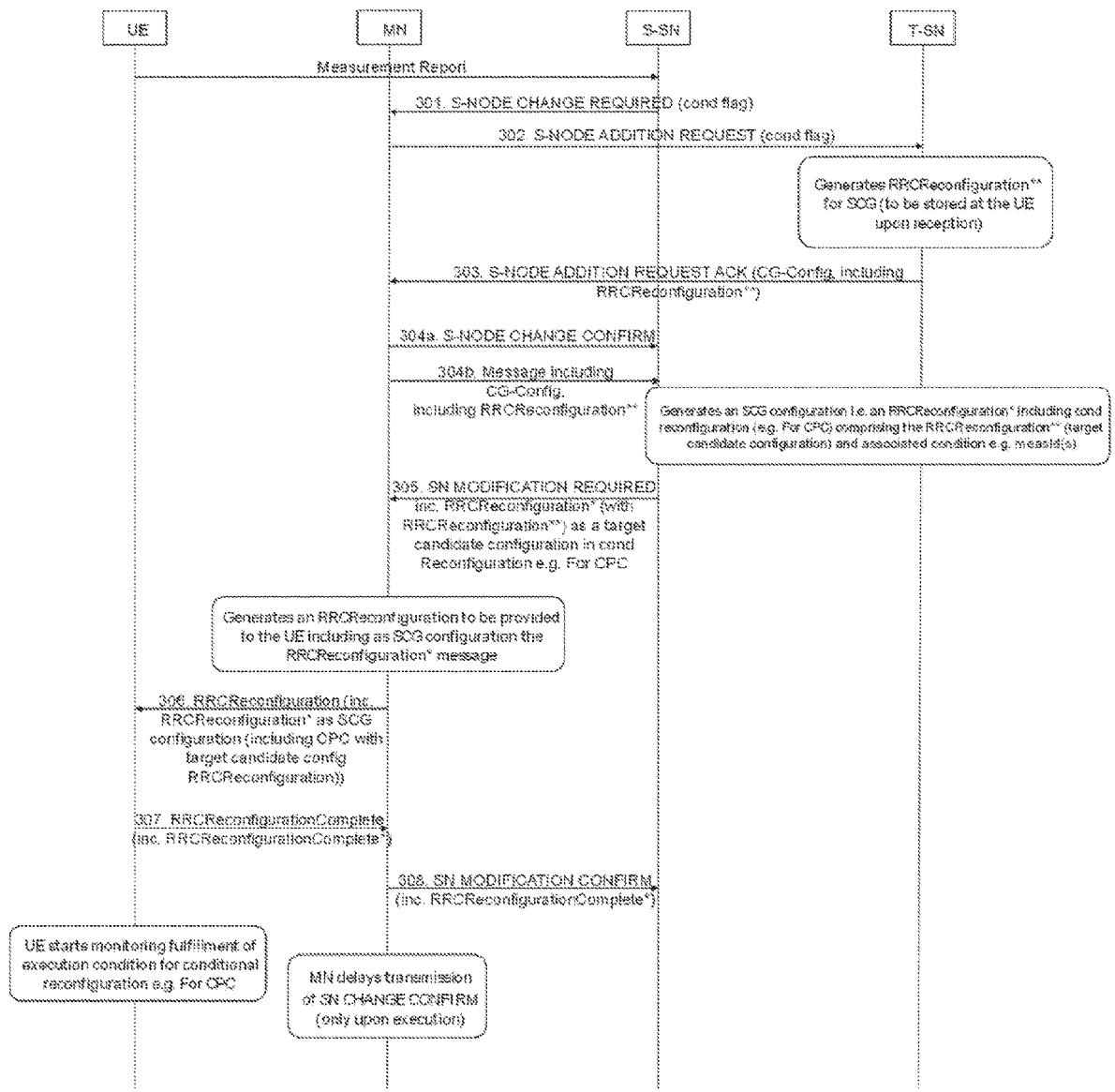
FIG. 5 shows an example preparation phase associated with an embodiment related to option 1c, according to various aspects of the present disclosure.

Option 1c: The source SN creates/generates the final message based on input from the target SN, signalled via the MN. No parallel network procedures, new message for transfer of target configuration to source SN and a new PSCell Change Success message. FIG. 5 shows an example preparation phase associated with an embodiment related to option 1c, according to various aspects of the present disclosure.

Preparation Phase (Step 1-3, 301, 302, 303) As described in option 1b.

Procedure for Requesting an SCG Configuration (for a UE Already in MR-DC)

(Step 4, 304a-304b) Upon reception of the S-NODE ADDITION REQUEST ACKNOWLEDGE message, the MN sends a S-NODE CHANGE CONFIRM message to the source SN (S-SN) (304a). The S-NODE CHANGE CON- FIRM contains a confirmation to the source SN that the requested preparation was done successfully.

In addition, a new message is sent to the source SN node requesting a configuration that is to be provided to the UE e.g., a conditional reconfiguration for CPC (304b). That message includes the RRC Reconfiguration(s) generated by the target candidate(s) SN (e.g., RRCReconfiguration** received within CG-Config). Below an example implementation of a new message in TS 38.423 is shown with the example name S-NODE CONFIGURATION TRANSFER.

9.1.2.12 S-NODE CONFIGURATION TRANSFER

This message is sent by the M-NG-RAN node to inform the S-NG-RAN node of the prepared target configuration of the S-NG-RAN node initiated S-NG-RAN node change.

Direction: M-NG-RAN node→S-NG-RAN node.

MR-DC determines to configure Conditional PSCell Change (CPC) for the UE, for example, based on measurements reports received from the UE either via SRB3 or SRB1 (via MN). Upon determining to configure CPC, the S-SN sends to the Master Node (MN) an S-NODE CHANGE REQUIRED message including an indication that the request is for CPC (i.e., it is not for a PSCell Change to be performed immediately as in legacy). The message also contains target SN candidate ID information and may include the current UE's SCG configuration (to support delta configuration) and measurement results related to the target SN candidate.

In option 2, in addition to the information above, the message may also contain at least one of the following (or combination):

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | ignore |
| S-NG-RAN node UE XnAP ID | M | | NG-RAN node UE XnAP ID 9.2.3.16 | Allocated at the S-NG-RAN node | YES | ignore |
| Candidate PSCells List | | 0 . . . 1 | | | | |
| >Candidate PSCells Item | | 1 . . . <maxnoofCPCtarget> | | | | |
| >>Candidate PSCell ID | M | | Global NG-RAN Cell Identity 9.2.2.27 | | | |
| >>S-NG-RAN node to M-NG-RAN node Container | M | | OCTET STRING | | | |

| Range bound | Explanation |
|---|---|
| maxnoofPDUsessions | Maximum no. of PDU sessions. Value is 256 |
| maxnoofCPCtarget | Maximum number of Conditional PSCell targets per SN. Value is 8 |

Upon reception of the S-NODE CHANGE CONFIRM and the new message (e.g. called S-NODE CONFIGURATION TRANSFER) from the MN, the S-SN generates a new RRC Reconfiguration message (e.g. RRCReconfiguration* generated by the S-SN) to be provided to the UE (via the MN) as an SCG configuration, wherein that new RRC Reconfiguration message (RRCReconfiguration* created by the S-SN) contains at least a conditional reconfiguration (e.g. field conditionalReconfiguration and/or IE ConditionalReconfiguration for CPC). See option 1 b for more details. (Steps 5-8, 305, 306, 307, 308) As described in option 1b.

Figure 6:
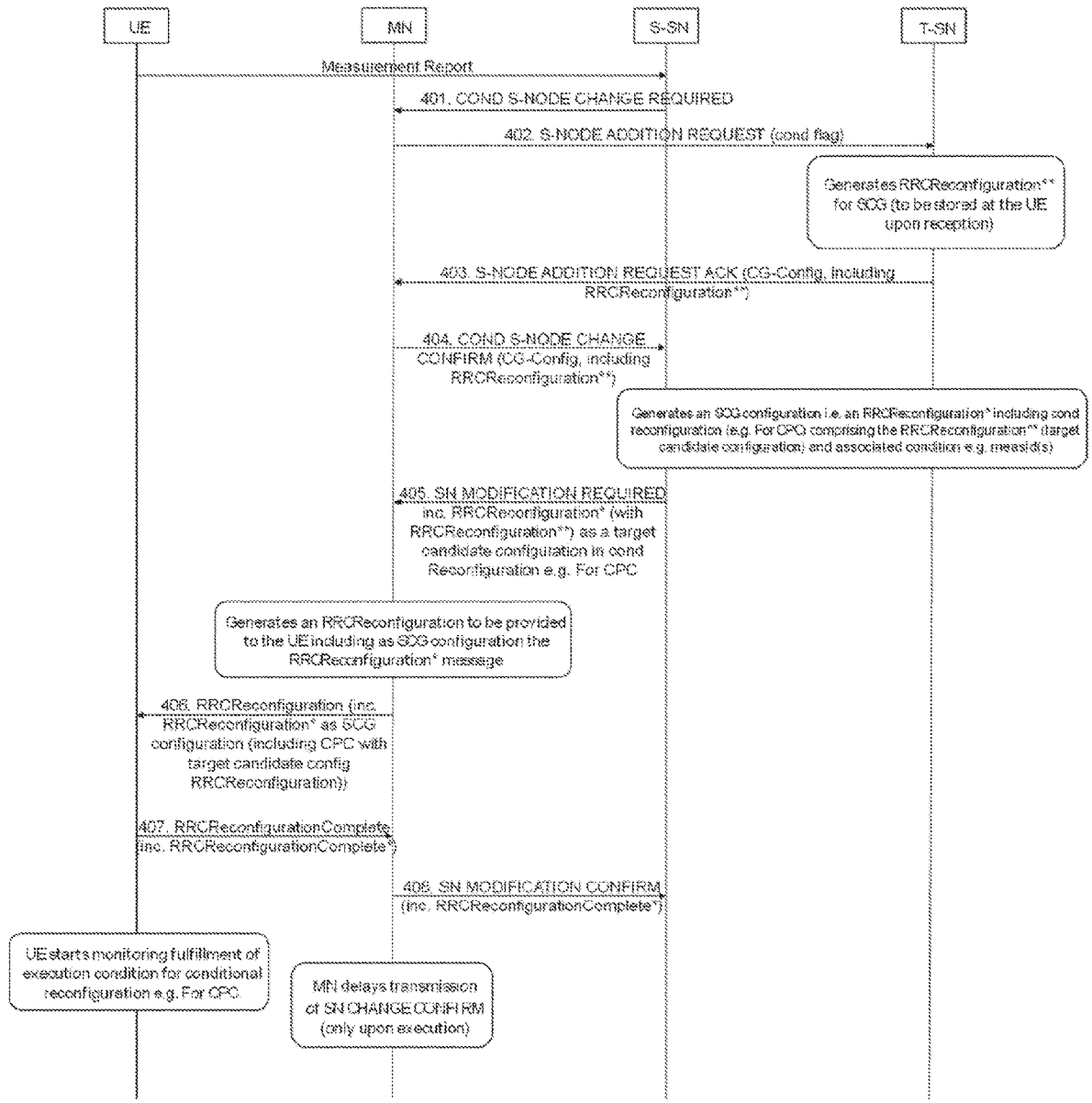
FIG. 6 shows an example preparation phase associated with an embodiment related to option 1d, according to various aspects of the present disclosure.
Figure 7:
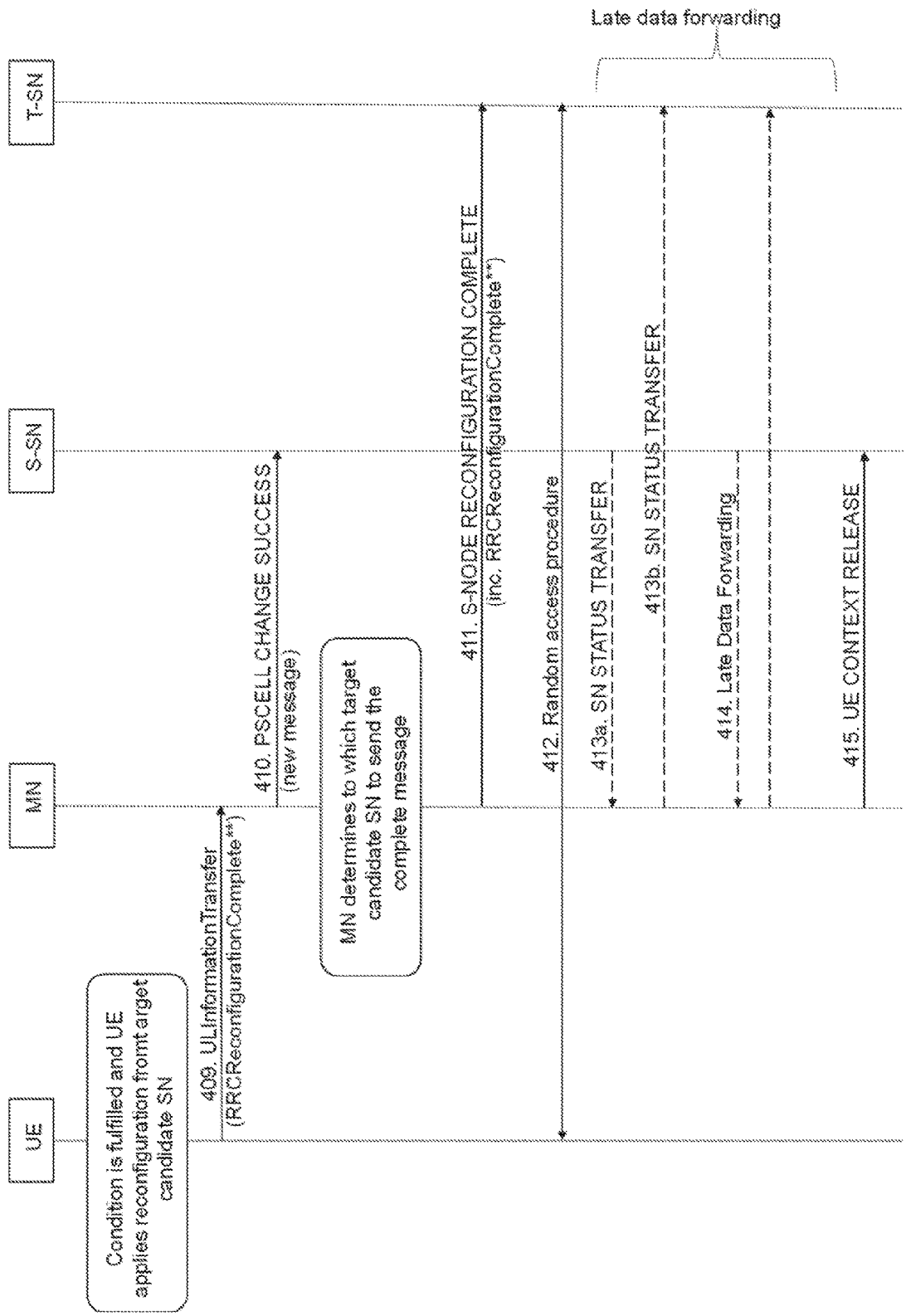
FIG. 7 shows an example execution phase associated with an embodiment related to option 1d, according to various aspects of the present disclosure.
Figure 8:
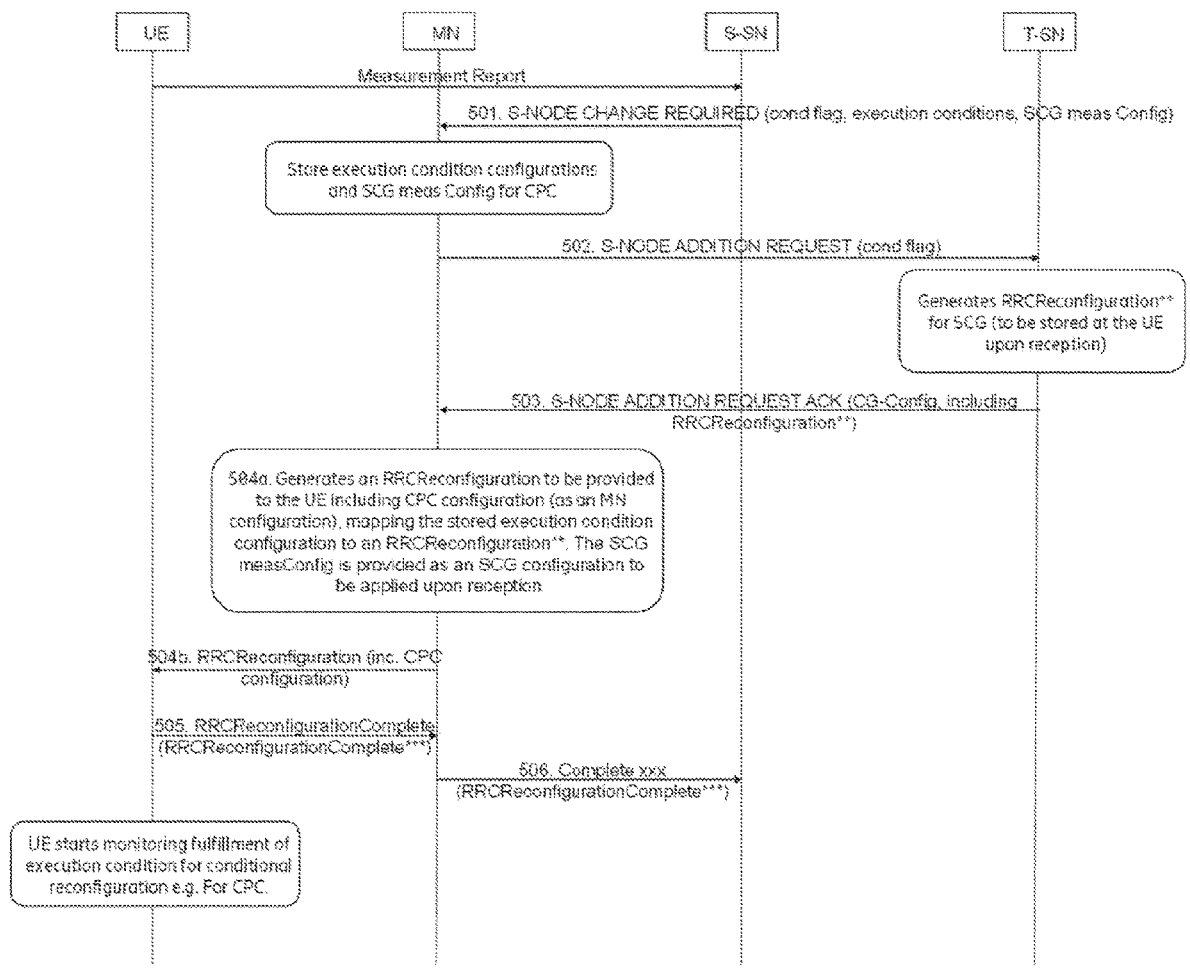
FIG. 8 shows an example preparation phase associated with an embodiment related to option 2, according to various aspects of the present disclosure.

Execution Phase
  As described in option 1b.
  Option 1d: Another alternative embodiment is shown in option 1d. FIG. 6 shows an example preparation phase associated with an embodiment related to option 1d (401-408), according to various aspects of the present disclosure. FIG. 7 shows an example execution phase associated with an embodiment related to option 1d (409-415), according to various aspects of the present disclosure.
  Option 2: The MN could build the final message based on input from the SNs. FIG. 8 shows an example preparation phase associated with an embodiment related to option 2, according to various aspects of the present disclosure.
  (Step 1, 501) In one embodiment, the node operating as Source Secondary Node (S-SN) for a UE operating in Configurations of Execution Conditions for CPC;
  In one option, each execution condition corresponds one or multiple MeasID(s); Each execution condition is mapped to a target candidate PSCell for CPC (wherein the mapping is also provided in the message);
  For example, the message could include information as follows
  Target candidate PSCell-13→measId(1)=1;
  Target candidate PSCell-25→measId(1)=2;
  Target candidate PSCell-4→measId(1)=3 AND measId (2)=4;
  The configuration of the execution conditions may be provided as part of an XnAP and/or X2AP message i.e., in the format of an inter-node message instead of within an RRC container. The reasoning is that this cannot be provided to the UE as it is, as it needs to be included in another IE and associated to a target candidate PSCell reconfiguration;

SCG Measurement Configuration
  In one option this could be an RRCReconfiguration in SN format (e.g., an SCG RRCReconfiguration***) including a measConfig field of IE MeasConfig having the measurement identifiers list to be added, wherein the measurement identifiers to be added are associated to reporting configuration whose reportType is set to a conditional reconfiguration condition. The RRCReconfiguration in SN format could be applied to the UE before CPC is configured, as an SCG configuration.

In option 2, the MN stores the additional information upon reception of the message. In one alternative, the inclusion of these elements may work as an implicit indication that the S-NODE CHANGE REQUIRED message is for CPC, and not for legacy (wherein it would not make sense to include these information).

The node operating as Master Node (MN) receives from the S-SN the S-NODE CHANGE REQUIRED message including an indication that the request is for CPC, and information target SN candidate ID information and possibly the current UE's SCG configuration (to support delta configuration), measurement results related to the target SN candidate, and possibly configurations of execution conditions for CPC and SCG measurement configuration. Thanks to the CPC indication (implicit or explicit) the MN is aware that it shall not initiate a legacy S-NODE ADDITION procedure, but an S-NODE ADDITION procedure for CPC. Using the target candidate SN ID information, the MN knows which target SN candidate to contact.

(Step 2, 502) may be similar to (Step 2) of Option 1. Hence, upon that reception, the node operating as Master Node (MN) sends an S-NODE ADDITION REQUEST message including a CPC indication to the target candidate SN (as indicated in the message from the S-SN via the candidate target SN ID information). The message to the target candidate SN may also include the latest UE's current SCG configuration so that the target candidate can generate an RRC Reconfiguration message for the SCG that is a delta signalling to be possibly applied on top of the UE's current SCG configuration (upon fulfilment of the condition).

The node operating as candidate Target SN (candidate T-SN) receives the S-NODE ADDITION REQUEST message including a CPC indication from the MN. If the message includes the latest UE's current SCG configuration, the target candidate SN determines to generate an RRC Reconfiguration message for the SCG that is a delta signalling to be possibly applied on top of the UE's current SCG configuration (upon fulfilment of the condition). If the message includes measurements associated to frequencies that are candidates to be SCells of the SCG for that candidate target SN, the candidate T-SN determines to configure SCells in the SCG configuration to be provided to the UE e.g., SCells whose measurements are the strongest according to a quantity like RSRP and/or RSRQ and/or SINR.

(Step 3, 503) may be similar to (Step 3) of Option 1. The node operating as candidate Target SN (candidate T-SN) sends to the MN an S-NODE ADDITION REQUEST ACKNOWLEDGE message, including an RRC Reconfiguration message (e.g., RRCReconfiguration created by target candidate SN) associated to at least one Secondary Cell Group, wherein the SpCell and SCells of the SCG are associated to the target candidate SN. That RRC Reconfiguration (RRCReconfiguration) can be, e.g., included in the CG-Config.

Hence, according to this step, the field scg-CellGroupConfig of CG-Config (included in the S-NODE ADDITION REQUEST ACKNOWLEDGE message sent from the candidate T-SN to the MN) is set to the RRCReconfiguration** i.e., the reconfiguration of the target candidate SCG (to be stored upon reception at the UE, but only applied upon fulfilment of the execution condition).

(Step 4a, 504a) The MN, upon receiving an RRCReconfiguration for each target candidate PSCell (e.g., in the S-NODE ADDITION REQUEST ACKNOWLEDGE message) generates/provides an RRC Reconfiguration to be provided to the UE including a CPC configuration (as an MN configuration), mapping the stored execution condition configuration to an RRCReconfiguration. The SCG measConfig is provided as an SCG configuration to be applied upon reception.

Taking as an example a single target candidate PSCell, the MN sets the condRRCReconfig to the RRCReconfiguration (e.g., received from a target candidate SN in the S-NODE ADDITION REQUEST ACKNOWLEDGE message), and sets the condExecutionCond to the values received by the S-SN (which herein is the node determining the conditions). For example, if RRCReconfiguration is associated to PSCell-4, the MN set the condExecutionCond to MeasID(1)=3 and MeasID(2)=4, assuming that the MN received from the S-SN the following mapping between conditions and target candidate cells:

- Target candidate PSCell-13 → measId(1)=1;
- Target candidate PSCell-25 → measId(1)=2;
- Target candidate PSCell-4 → measId(1)=3 AND measId(2)=4;

```
CondReconfigToAddModList information element
-- ASN1START
-- TAG-CONDRECONFIGTOADDMODLIST-START
CondReconfigToAddModList-r16 ::=   SEQUENCE (SIZE (1.. maxNrofCondCells-r16)) OF
CondReconfigToAddMod-r16
CondReconfigToAddMod-r16 ::=       SEQUENCE {
    condReconfigId-r16      CondReconfigId-r16,
    condExecutionCond-r16   SEQUENCE (SIZE (1..2)) OF MeasId OPTIONAL,   -- Cond
condReconfigAdd
    condRRCReconfig-r16     OCTET STRING (CONTAINING RRCReconfiguration) OPTIONAL,
-- Cond condReconfigAdd
    ...
}
-- TAG-CONDRECONFIGTOADDMODLIST-STOP
-- ASN1STOP
```

The CondReconfigToAddModList for one or various target candidate PSCell(s) is included within a ConditionalReconfiguration IE to be included in the RRCReconfiguration message generated by the MN and to be sent to the UE.

| ConditionalReconfiguration information element |
|---|
| -- ASN1START<br>-- TAG-CONDITIONALRECONFIGURATION-START<br>ConditionalReconfiguration-r16 ::=  SEQUENCE {<br>    attemptCondReconfig-r16      ENUMERATED {true}      OPTIONAL,  -- Cond PCell<br>    condReconfigToRemoveList-r16   CondReconfigToRemoveList-r16   OPTIONAL,  -- Need N<br>    condReconfigToAddModList-r16   CondReconfigToAddModList-r16   OPTIONAL,  -- Need N<br>    ...<br>}<br>CondReconfigToRemoveList-r16 ::=   SEQUENCE (SIZE (1.. maxNrofCondCells-r16)) OF<br>CondReconfigId-r16<br>-- TAG-CONDITIONALRECONFIGURATION-STOP<br>-- ASN1STOP |

The MN also needs to transmit to the UE the SCG measConfig containing the configuration for the measID(s) associated to the CPC execution conditions to be monitored e.g. measId(1)=3 AND measId(2)=4.

In one option, the MN includes in that RRCReconfiguration message the SCG measConfig, which includes the configuration(s) e.g. measId(1)=3 AND measId(2)=4. That SCG measConfig may be coded as an SCG RRCReconfiguration* (e.g., possibly provided by the S-SN) that is included as an SCG configuration to be applied by the UE upon reception. The MN then includes in the RRCReconfiguration an mrdc-SecondaryCellGroupConfig of IE SetupRelease {MRDC-SecondaryCellGroupConfig}, whose nr-SCG is set to the RRCReconfiguration* i.e., the SCG configuration within the RRCReconfiguration contains the SCG measConfig that configures the details of the execution condition for CPC.

After being configured, the UE generates two complete messages: a first associated to the SCG RRC Reconfiguration (e.g., a complete message RRCReconfigurationComplete* message in response to RRCReconfiguration* that had the SCG measConfig for CPC) and acknowledging the reception of the SCG measConfig, to be included inside another RRCReconfigurationComplete in response to the RRC Reconfiguration from the MN.

(Step 6, 506) Upon reception of the RRCReconfigurationComplete including the SCG RRC Reconfiguration Complete (i.e., including nr-SCG-Response set to e.g., RRCReconfigurationComplete*), the MN sends the RRCReconfigurationComplete* to the Source SN (which was the node that has generate the RRCReconfiguration*** message i.e., the SCG configuration containing the SCG measConfig for CPC).

| RRCReconfiguration message |
|---|
| -- ASN1START<br>-- TAG-RRCRECONFIGURATION-START<br>...<br>RRCReconfiguration-v1560-IEs ::=      SEQUENCE {<br>   mrdc-SecondaryCellGroupConfig         SetupRelease { MRDC-SecondaryCellGroupConfig }<br>OPTIONAL,  -- Need M<br>   radioBearerConfig2      OCTET STRING (CONTAINING RadioBearerConfig)<br>OPTIONAL,  -- Need M<br>   sk-Counter            SK-Counter              OPTIONAL,  -- Need N<br>   nonCriticalExtension   RRCReconfiguration-v16xy-IEs   OPTIONAL<br>}<br>MRDC-SecondaryCellGroupConfig ::=    SEQUENCE {<br>   mrdc-ReleaseAndAdd     ENUMERATED {true}         OPTIONAL,  --<br>Need N<br>   mrdc-SecondaryCellGroup   CHOICE {<br>     nr-SCG      OCTET STRING (CONTAINING RRCReconfiguration),<br>     eutra-SCG   OCTET STRING<br>   }<br>}<br>}<br>-- TAG-RRCRECONFIGURATION-STOP |

(Step 4b, 504b) After generating the RRC Reconfiguration message (RRCReconfiguration including an nr-SCG field set to the RRCReconfiguration*** for the SCG's measConfig and the CPC configuration generated by the MN with information provided by the SN), the MN sends the RRC Reconfiguration message to the UE.

(Step 5, 505) Upon reception of the message(s), the UE applies the received RRCReconfiguration and applies the nr-SCG configuration (including the conditional reconfiguration, e.g., for CPC). After applying the conditional reconfiguration fields/IEs the UE starts the monitoring of execution condition(s) and store the RRC Reconfiguration for each target candidate, e.g., RRCReconfiguration**.

In one alternative, the MN sends to the S-SN an SgNB Modification Confirm message (or an SgNB Change Confirm message). That should not trigger the S-SN to release resources.

Execution Phase

Figure 9:
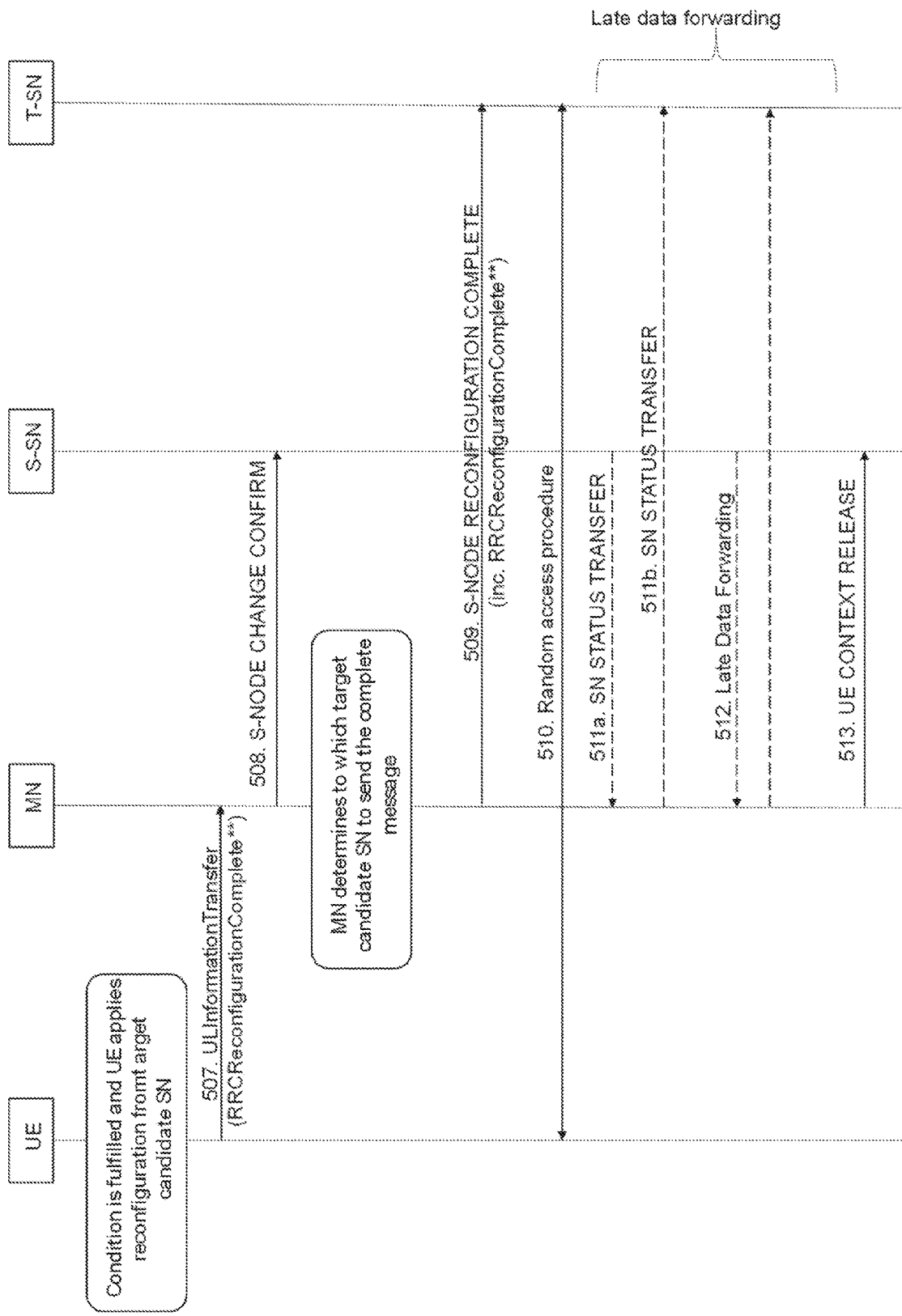
FIG. 9 shows an example execution phase associated with an embodiment related to option 2, according to various aspects of the present disclosure.

After the UE is configured with conditional reconfiguration the UE starts to monitor the execution condition(s) associated to the target candidate's RRC Reconfiguration (e.g., RRCReconfiguration). FIG. 9** shows an example execution phase associated with an embodiment related to option 2, according to various aspects of the present disclosure.

(Step 7, 507) Upon fulfilment of the condition, the UE applies the associated target candidate's RRC Reconfiguration (e.g., RRCReconfiguration). As part of that, the UE generates a complete message e.g., RRCReconfigurationComplete, to acknowledge the target candidate SN (T-SN) that the UE has successfully applied the target candidate's RRC Reconfiguration (e.g., RRCReconfiguration**). In one alternative that complete message is included in an UL Information Transfer message (e.g., ULInformationTransferMRDC) and submitted to lower layers for transmission via the MN.

(Step 8, 508) may be similar to Step 10 of Option 1, see 5.2.1.2.

(Step 9, 509) may be similar to Step 11 of Option 1, see 5.2.1.2.

(Step 10, 510) may be similar to Step 12 of Option 1, see 5.2.1.2.

(Step 11, 511a-511b) may be similar to Step 13 of Option 1, see 5.2.1.2.

(Step 12, 512) may be similar to Step 14 of Option 1, see 5.2.1.2.

(Step 513) may be similar to, for example, Step 115 or Step 215 of Option 1, see 5.2.1.2.

Advantages of this Option (2)

In this option the MN is the network node generating the final CPC configuration, included as an MN configuration, while the SCG measConfig is provided to the UE as an SCG RRC Reconfiguration, e.g., RRCReconfiguration***. In this alternative the S-SN sends to the MN the execution conditions (e.g., in the form of measId(s)) and the mappings to the target candidate PSCell(s).

Main advantage is that the CPC preparation phase is faster preparation (1 RTT faster) compared to option 1 and requires less signaling.

A first consequence is that from the UE's perspective, a CPC configuration with SN change and without SN change will be slightly different, in the sense that CPC in this case is configured as if it would be a Conditional Handover (i.e., as an MN configuration), except that the UE may get in the same message an SCG measConfig including CHO condition configurations. Another consequence is that the MN would need to build the CPC configuration, not needed in option 1 (wherein the MN does not need to understand the configurations created by the S-SN or T-SN candidate(s)).

Figure 10:
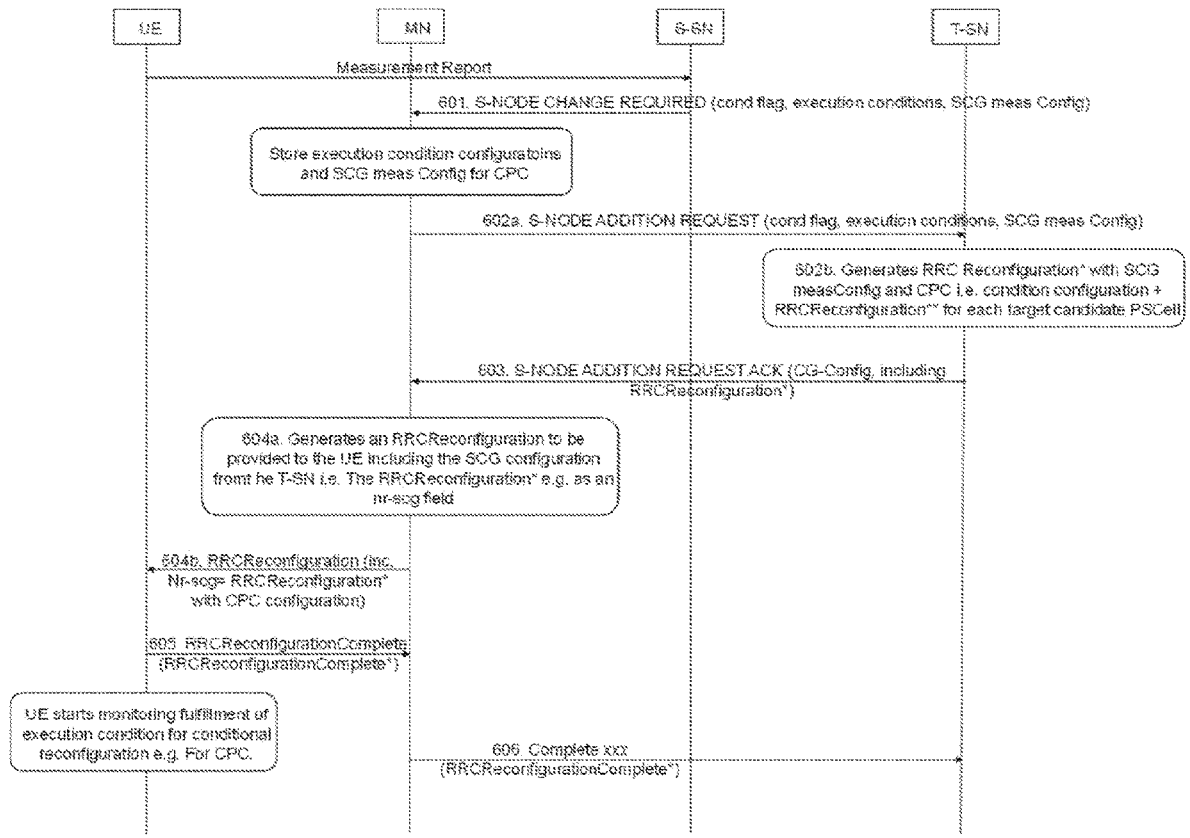
FIG. 10 shows an example preparation phase associated with an embodiment related to option 3, according to various aspects of the present disclosure.

Option 3: The target SN builds the final message. The conditions are transferred to the target SN via the MN. FIG. 10 shows an example preparation phase associated with an embodiment related to option 3, according to various aspects of the present disclosure.

(Step 1, 601) may be similar to Step 1 of Option 2.

(Step 2a, 602a) Upon the reception of the S-NODE CHANGE REQUIRED message (as in step 1), the node operating as Master Node (MN) sends an S-NODE ADDITION REQUEST message including a CPC indication to the target candidate SN (as indicated in the message from the S-SN via the candidate target SN ID information) and information enabling a T-SN to generate CPC configuration(s), such as at least one of the following of a combination of these (as received from the S-SN):

Configurations of execution conditions for CPC;
In one option, each execution condition corresponds one or multiple MeasID(s); Each execution condition is mapped to a target candidate PSCell for CPC (wherein the mapping is also provided in the message);

For example, the message could include information as follows:
Target candidate PSCell-13→measId(1)=1;
Target candidate PSCell-25→measId(1)=2;
Target candidate PSCell-4→measId(1)=3 AND measId(2)=4;
The MN can provide the mapping and the conditions only for the PSCell(s) associated to a given candidate T-SN; Inn other words, if the SN determines to configure CPC for multiple SN target candidates T-SN(s), the MN may provide different mappings and condition(s) for the different T-SN(s).
The configuration of the execution conditions may be provided as part of an XnAP and/or X2AP message i.e., in the format of an inter-node message instead of within an RRC container. The reasoning is that this cannot be provided to the UE as it is, as it needs to be included in another IE and associated to a target candidate PSCell reconfiguration;
SCG Measurement Configuration;
In one option this could be an RRCReconfiguration in SN format (e.g. an SCG RRCReconfiguration***) including a measConfig field of IE MeasConfig having the measurement identifiers list to be added, wherein the measurement identifiers to be added are associated to reporting configuration whose reportType is set to a conditional reconfiguration condition. The RRCReconfiguration in SN format could be applied to the UE before CPC is configured, as an SCG configuration;
As in option 2, in one alternative, the inclusion of these elements may work as an implicit indication that the S-NODE CHANGE REQUIRED message is for CPC, and not for legacy (wherein it would not make sense to include these information).

The message to the target candidate SN may also include the latest UE's current SCG configuration so that the target candidate can generate an RRC Reconfiguration message for the SCG that is a delta signalling to be possibly applied on top of the UE's current SCG configuration (upon fulfilment of the condition).

(Step 2b, 602b) The T-SN candidate, upon the reception of the S-NODE ADDITION REQUEST message including CPC indication and/or CPC configuration (e.g., SCG MeasConfig, condition configurations like measId(s) and mapping to target candidate PSCell(s)), generates the final CPC configuration to be applied by the UE. This can be done by generating an RRCReconfiguration** for each target candidate PSCell e.g., associated to that T-SN receiving the message to create the CPC configurations that are included in an RRCReconfiguration* message (that is sent back to the MN as an SCG configuration to be applied by the UE).

The T-SN generates an RRCReconfiguration* message in the form of an SCG configuration to be provided to the UE, the message including CPC configurations (as an SN/SCG configuration), using the mapping the execution condition configuration to an RRCReconfiguration provided by the S-SN. The SCG measConfig is provided as an SCG configuration to be applied upon reception, i.e., it is provided in the same level as CPC (that is also to be applied, though the RRCReconfiguration is to be stored).

Taking as an example a single target candidate PSCell, the T-SN sets the condRRCReconfig to the generated RRCReconfiguration and sets the condExecutionCond to the values also received by the MN (e.g., received in the S-NODE ADDITION REQUEST message from the MN). For example, if RRCReconfiguration is associated to PSCell-4, the T-SN sets the condExecutionCond to MeasID(1)=3 and MeasID(2)=4, assuming that the T-SN received from the MN the following mapping between conditions and target candidate cells:

- Target candidate PSCell-13 → measId(1)=1;
- Target candidate PSCell-25 → measId(1)=2;
- Target candidate PSCell-4 → measId(1)=3 AND measId(2)=4;

CondReconfigToAddModList information element

```
-- ASN1START
-- TAG-CONDRECONFIGTOADDMODLIST-START
CondReconfigToAddModList-r16 ::=   SEQUENCE (SIZE (1.. maxNrofCondCells-r16)) OF
CondReconfigToAddMod-r16
CondReconfigToAddMod-r16 ::=         SEQUENCE {
    condReconfigId-r16               CondReconfigId-r16,
    condExecutionCond-r16            SEQUENCE (SIZE (1..2)) OF MeasId OPTIONAL,   -- Cond
condReconfigAdd
    condRRCReconfig-r16              OCTET STRING (CONTAINING RRCReconfiguration) OPTIONAL,   -- Cond
condReconfigAdd
    ...
}
-- TAG-CONDRECONFIGTOADDMODLIST-STOP
-- ASN1STOP
```

The CondReconfigToAddModList for one or various target candidate PSCell(s) is included within a ConditionalReconfiguration IE to be included in the RRCReconfiguration* message generated by the T-SN and to be sent to the UE.

ConditionalReconfiguration information element

```
-- ASN1START
-- TAG-CONDITIONALRECONFIGURATION-START
ConditionalReconfiguration-r16 ::=   SEQUENCE {
    attemptCondReconfig-r16          ENUMERATED {true}         OPTIONAL,   -- Cond PCell
    condReconfigToRemoveList-r16     CondReconfigToRemoveList-r16   OPTIONAL,   -- Need N
    condReconfigToAddModList-r16     CondReconfigToAddModList-r16   OPTIONAL,   -- Need N
    ...
}
CondReconfigToRemoveList-r16 ::=    SEQUENCE (SIZE (1.. maxNrofCondCells-r16)) OF CondReconfigId-
r16
-- TAG-CONDITIONALRECONFIGURATION-STOP
-- ASN1STOP
```

The T-SN also needs to provide to the UE the SCG measConfig containing the configuration for the measID(s) associated to the CPC execution conditions to be monitored e.g. measId(1)=3 AND measId(2)=4. In one option, the T-SN includes in that RRCReconfiguration* message the SCG measConfig also as an SCG configuration, which includes the configuration(s) e.g. measId(1)=3 AND measId(2)=4. In that case, both the CPC and the SCG measConfig for CPC are provided in the RRCReconfiguration* message generated by the T-SN.

(Step 3, 603) The node operating as candidate Target SN (candidate T-SN) sends to the MN an S-NODE ADDITION REQUEST ACKNOWLEDGE message, including an RRC Reconfiguration message (e.g., RRCReconfiguration* created by target candidate SN) including the CPC configuration (i.e., condition configuration+RRCReconfiguration** per target candidate PSCell) and possibly an SCG MeasConfig for CPC. That RRC Reconfiguration (RRCReconfiguration*) can be, e.g., included in the CG-Config.

Hence, according to this step, the field scg-CellGroupConfig of CG-Config (included in the S-NODE ADDITION REQUEST ACKNOWLEDGE message sent from the candidate T-SN to the MN) is set to the RRCReconfiguration* i.e., the reconfiguration of the target candidate SCG (to be stored upon reception at the UE, but only applied upon fulfilment of the execution condition).

(Step 4a, 604a) The MN, upon receiving an RRC Reconfiguration* from the T-SN in the S-NODE ADDITION REQUEST ACKNOWLEDGE message) generates an RRC Reconfiguration to be provided to the UE including as an SCG configuration the RRCReconfiguration*.

Within the RRCReconfiguration to be sent to the UE, the MN includes the RRCReconfiguration* as an mrdc-SecondaryCellGroupConfig of IE SetupRelease {MRDC-SecondaryCellGroupConfig}, whose nr-SCG is set to the RRCReconfiguration* i.e., the SCG configuration within the RRCReconfiguration contains the SCG measConfig that configures the details of the execution condition for CPC, and the CPC configurations.

Consideration(s) for multiple target candidate SN(s): in that case the MN would receive multiple messages including multiple RRCReconfiguration(s)*, each including CPC configuration. Thanks to the AddMod structure it is possible to provide these independently to the UE, even though some coordination of reconfiguration ID(s) needs to be performed by the S-SN or the MN. In one alternative, the S-SN already determines which target candidate PSCell is to have which conditional reconfiguration identifier. This is part of the mapping provided from the S-SN to the MN, and later forwarded to the T-SN U (that needs to build the message including the CPC configuration for the candidate PSCell(s) associated with it). In another alternative, it is the MN that determines which target candidate PSCell is to have which conditional reconfiguration identifier.

(Step 4b, 604b) After generating the RRC Reconfiguration message (RRCReconfiguration including an nr-SCG field set to the RRCReconfiguration* for the SCG's measConfig and the CPC configuration generated by the T-SN), the MN sends the RRC Reconfiguration message to the UE.

(Step 5, 605) Upon reception of the message(s), the UE applies the received RRCReconfiguration and applies the nr-SCG configuration (i.e., the RRCReconfiguration* including the conditional reconfiguration, e.g., for CPC, and the SCG measConfig). After applying the conditional reconfiguration fields/IEs the UE starts the monitoring of execution condition(s) and store the RRC Reconfiguration for each target candidate, e.g., RRCReconfiguration**.

After being configured, the UE generates two complete messages: a first associated to the SCG RRC Reconfiguration (e.g., a complete message RRCReconfigurationComplete* message in response to RRCReconfiguration* that had the SCG measConfig for CPC and CPC configuration) and acknowledging the reception of the SCG measConfig and CPC, to be included inside another RRCReconfigurationComplete in response to the RRC Reconfiguration from the MN.

(Step 6, 606) Upon reception of the RRCReconfigurationComplete including the SCG RRC Reconfiguration Complete (i.e., including nr-SCG-Response set to e.g., RRCReconfigurationComplete*), the MN sends the RRCReconfigurationComplete* to the Target candidate SN (which was the node that has generate the RRCReconfiguration* message i.e., the SCG configuration containing the SCG measConfig for CPC).

In one alternative, the MN also sends the RRCReconfigurationComplete* to the Source-SN, node that has initially requested CPC.

In one alternative, the MN sends to the S-SN an SgNB Modification Confirm message (or an SgNB Change Confirm message) including that RRC complete message.

Execution Phase

Figure 11:
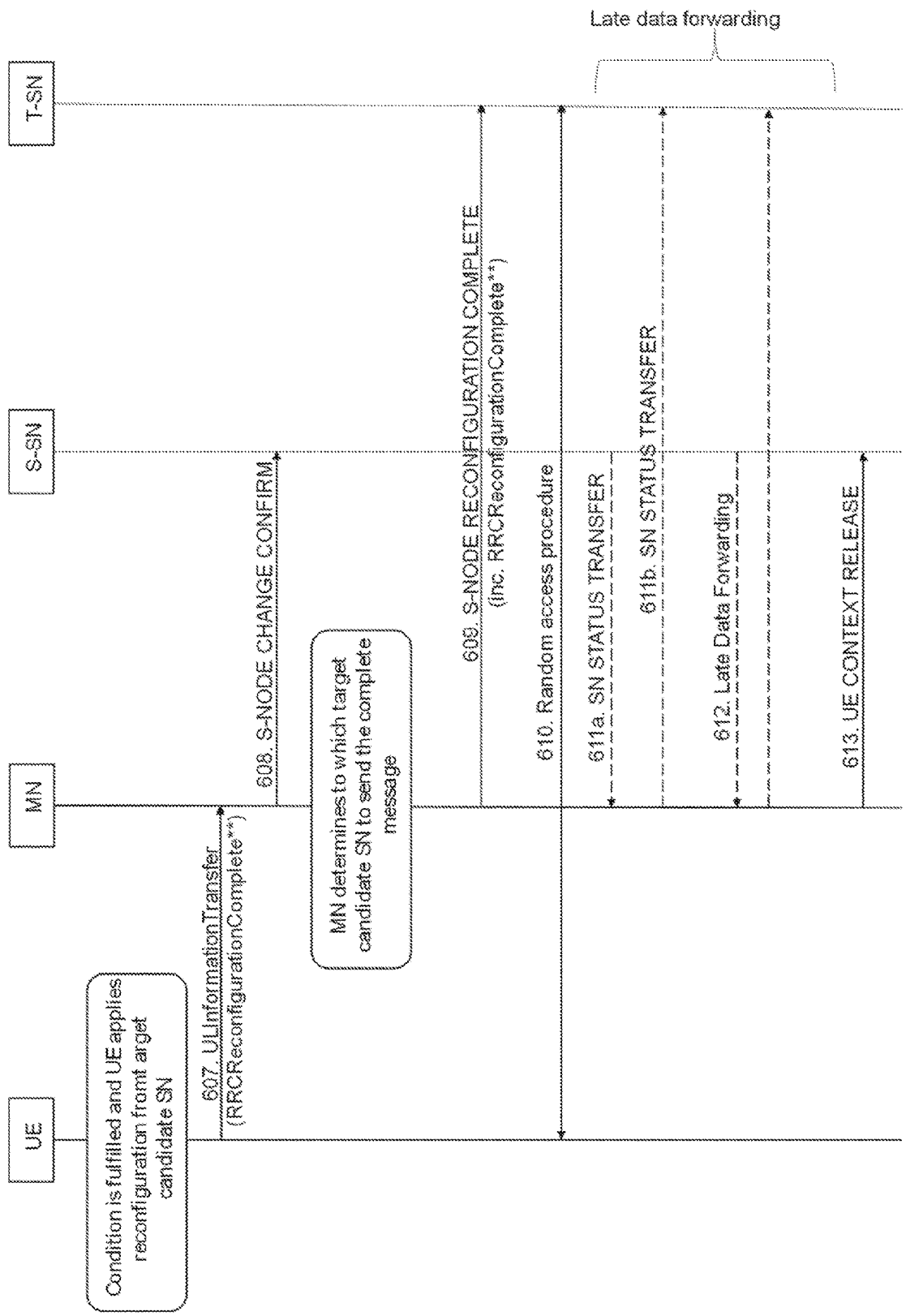
FIG. 11 shows an example execution phase associated with an embodiment related to option 3, according to various aspects of the present disclosure.

FIG. 11 shows an example execution phase associated with an embodiment related to option 3, according to various aspects of the present disclosure.

(Step 7, 607) Upon fulfilment of the condition, the UE applies the associated target candidate's RRC Reconfiguration (e.g., RRCReconfiguration). As part of that, the UE generates a complete message e.g., RRCReconfigurationComplete, to acknowledge the target candidate SN (T-SN) that the UE has successfully applied the target candidate's RRC Reconfiguration (e.g., RRCReconfiguration**). In one alternative that complete message is included in an UL Information Transfer message (e.g., ULInformationTransferMRDC) and submitted to lower layers for transmission via the MN.

(Step 8, 608) may be similar to Step 10 of Option 1, see 5.2.1.2.

(Step 9, 609) may be similar to Step 11 of Option 1, see 5.2.1.2.

(Step 10, 610) may be similar to Step 12 of Option 1, see 5.2.1.2.

(Step 11, 611a-611b) may be similar to Step 13 of Option 1, see 5.2.1.2.

(Step 12, 612) may be similar to Step 14 of Option 1, see 5.2.1.2.

(Step 613) may be similar to, for example, Step 115 or Step 215 of Option 1, see 5.2.1.2. This step 613 may occur any number of steps (including zero (0)) after step 12.

Advantages of this Option

In this option the candidate T-SN is the network node generating the final CPC configuration, included as an SCG/SN configuration, together with the SCG measConfig in e.g., RRCReconfiguration*. In this alternative the S-SN sends to the MN the execution conditions (e.g., in the form of measId(s)) and the mappings to the target candidate PSCell(s), that are then provided to the T-SN in the S-NODE ADDITION REQUEST message (or equivalent message).

Main advantage is that the CPC preparation phase is faster preparation (1 RTT faster) compared to option 1 and requires more signalling. Compared to option 2, one advantage is that the burden to prepare CPC is on the T-SN, which might be more beneficial in the case where MN and SN are from different RATs e.g., if this is applied for a UE operating in EN-DC. In other words, the MN would not need to understand how to generate a message in SN's format. From the UE's perspective, another benefit is that CPC with or without SN change is configured in a similar manner i.e., as an SN/SG configuration.

One consequence is that the T-SN would need to build the CPC configuration, which is something that is typically done by a source node. In addition, SCG measConfig for CPC and configurations for the conditions and its related mappings needs to be carried across different nodes (e.g., from S-SN to MN, to be later forwarded to T-SN, and then sent back within the RRCReconfiguration* to the MN).

Option 4: The source SN builds the final message. The source SN obtains the CG-Config from each target candidate directly and builds the final message.

Preparation Phase

Figure 12:
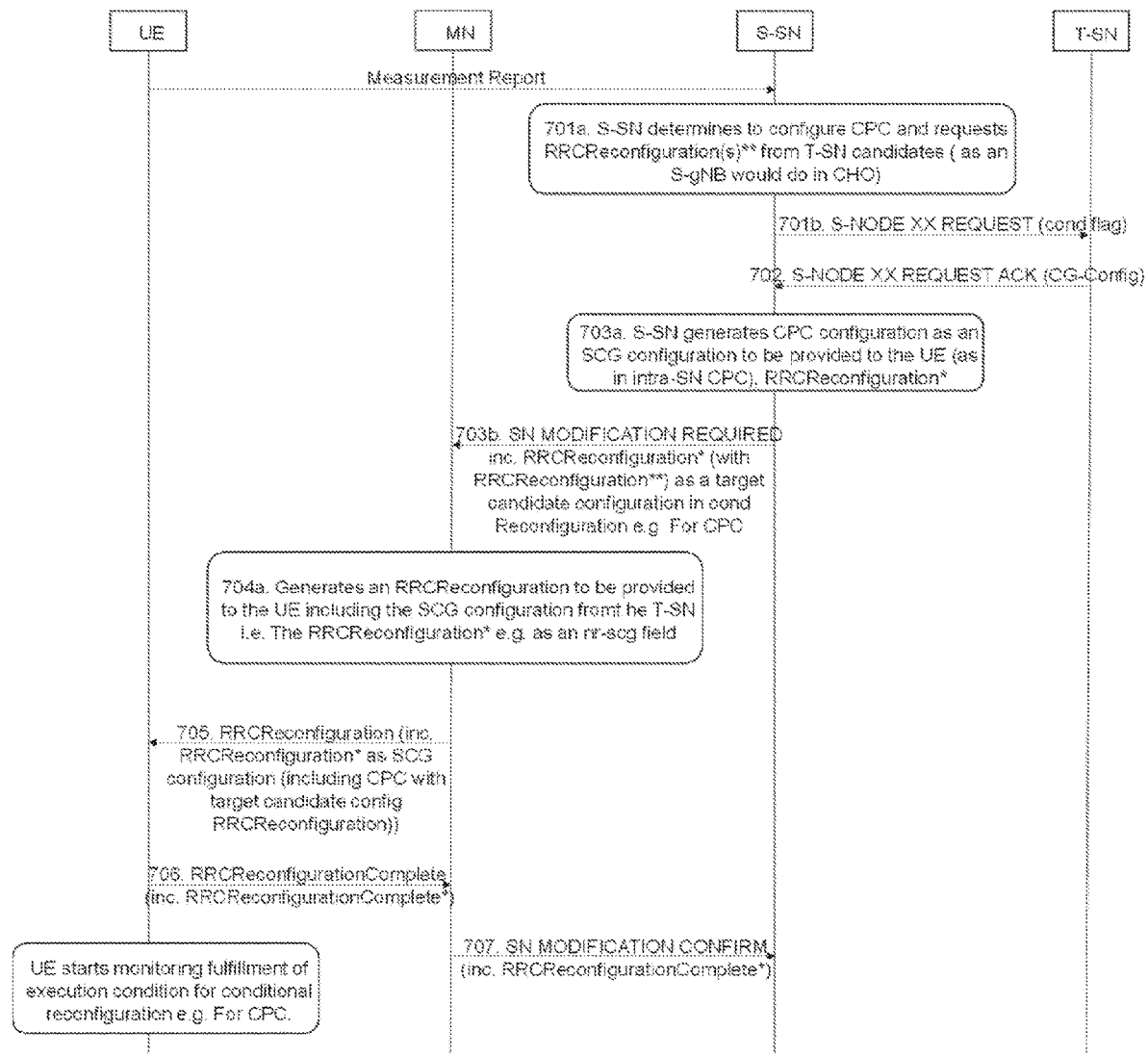
FIG. 12 shows an example preparation phase associated with an embodiment related to option 4, according to various aspects of the present disclosure.
Figure 13:
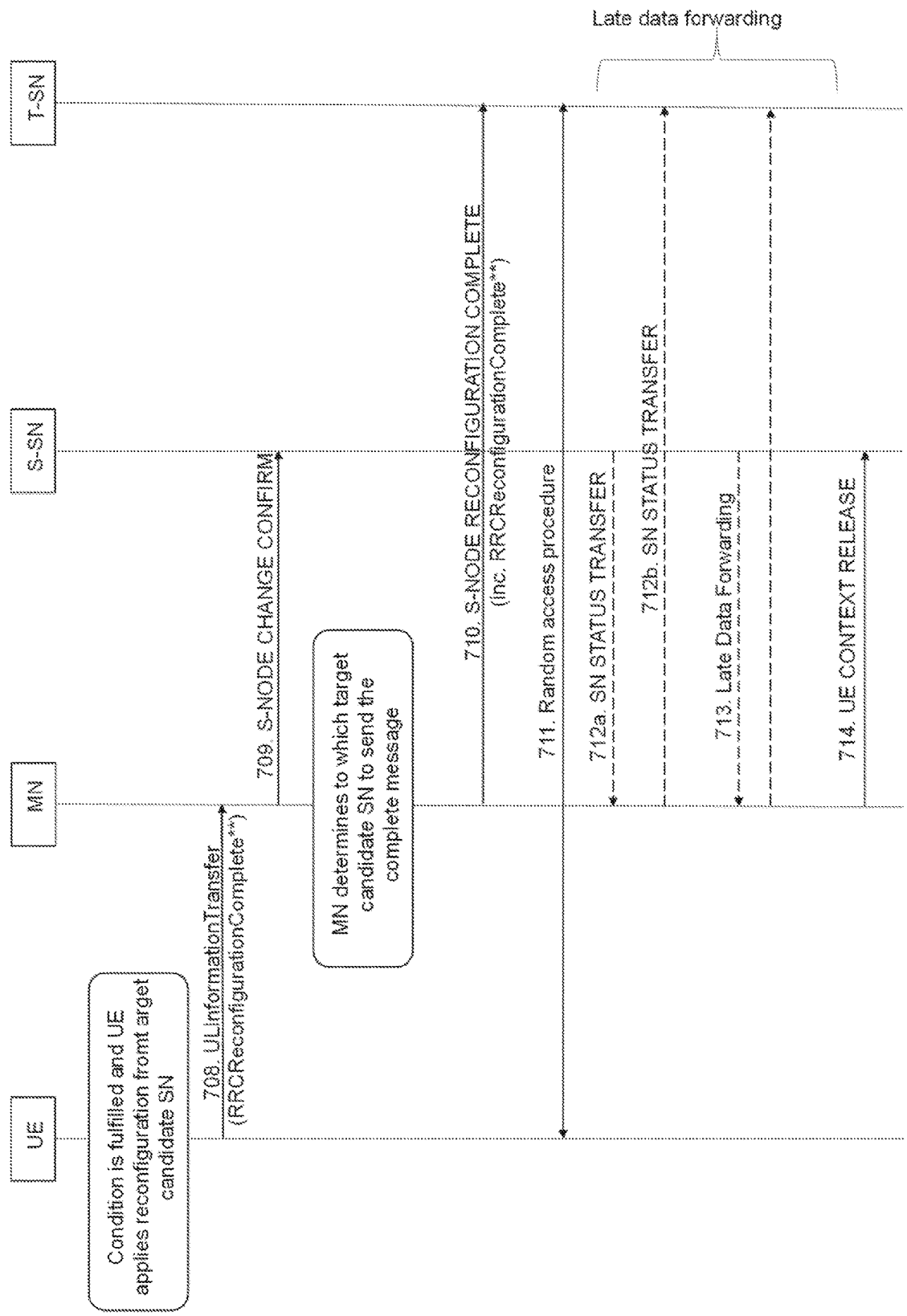
FIG. 13 shows an example execution phase associated with an embodiment related to option 4, according to various aspects of the present disclosure.

FIG. 12 shows an example preparation phase associated with an embodiment related to option 4, according to various aspects of the present disclosure.

(Step 1a, 701a) In one embodiment, the node operating as Source Secondary Node (S-SN) for a UE operating in MR-DC determines to configure Conditional PSCell Change (CPC) for the UE, for example, based on measurement reports received from the UE either via SRB3 or SRB1 (via MN).

(Step 1b, 701b) Upon determining to configure CPC, the S-SN sends to a Target Candidate SN (T-SN) a request message for CPC e.g., an SN Addition Request (i.e., it is not for a PSCell Change/Addition to be performed immediately as in legacy). In FIG. 12, the term "cond flag" has been used as the indication, but this should be seen as an example. The message may also contain the current UE's SCG configuration (to support delta configuration) and measurement results related to the target SN candidate. In addition, the message may contain information equivalent to the information in a Handover Request message (with conditional handover indication).

The Target Candidate Node (SN) receives from the S-SN the request message including an indication that the request is for CPC, possibly including current UE's SCG configuration (to support delta configuration) and measurement results related to the target SN candidate. The Target candidate SN may set the DC timer at a larger value to take into account that the reconfiguration may take more time than in legacy. If the message includes the latest UE's current SCG configuration, the target candidate SN determines to generate an RRC Reconfiguration message for the SCG that is a delta signalling to be possibly applied on top of the UE's current SCG configuration (upon fulfilment of the condition (s)). If the message includes measurements associated to frequencies that are candidates to be SCells of the SCG for that candidate target SN, the candidate T-SN determines to configure SCells in the SCG configuration to be provided to the UE e.g., SCells whose measurements are the strongest according to a quantity like RSRP and/or RSRQ and/or SINR.

(Step 2, 702) The node operating as candidate Target SN (candidate T-SN) sends to the S-SN a response message e.g., S-NODE XXX REQUEST ACKNOWLEDGE message, including an RRC Reconfiguration message (e.g., RRCReconfiguration created/generated by that target candidate SN) associated to at least one Secondary Cell Group, wherein the SpCell and SCells of the SCG are associated to the target candidate SN. That RRC Reconfiguration (RRCReconfiguration) can be, e.g., included in an RRC container like the CG-Config.

(Step 3a, 703a) The node operation as S-SN, upon reception of the response message from the T-SN containing the RRCReconfiguration** for CPC to be applied upon fulfillment of the condition, generates/provides CPC configuration as an SCG configuration to be provided to the UE (as in intra-SN CPC), e.g., an RRCReconfiguration* message including condition configurations associated to each target PSCell candidate configuration (RRCReconfiguration**).

The S-SN generates a new RRC Reconfiguration message (e.g., RRCReconfiguration* generated by the S-SN) to be provided to the UE (via the MN) as an SCG configuration, wherein that new RRC Reconfiguration message (RRCReconfiguration* created by the S-SN) contains at least a conditional reconfiguration (e.g., field conditionalReconfiguration and/or IE ConditionalReconfiguration for CPC). The conditional reconfiguration comprises at least one of the following:

The RRC Reconfiguration generated by the target candidate SN (e.g., RRCReconfiguration**), provided to the S-SN by the MN in the request message;

An execution condition associated to it e.g., pointing to one or multiple MeasId(s);

In addition, that new RRC Reconfiguration message (RRCReconfiguration* created by the S-SN) may contain a measurement configuration associated to the measId(s) for conditional reconfiguration i.e., having conditional reconfiguration as report Type.

When generating of the new RRC message to be an SCG configuration to be applied by the UE upon reception, the S-SN generates the field conditionalReconfiguration of IE ConditionalReconfiguration.

In one example, the S-SN sets the condRRCReconfig field (or equivalent) to be included in CondReconfigToAddModList (for the target candidate cell associated to the target SN candidate for CPC) to the RRCReconfiguration**, originally generated by the candidate T-SN. If there have been multiple target candidate cells (from the same or different SN(s)), that step is repeated for each candidate cell.

In one example, the S-SN sets the condExecutionCond (one or multiple MeasId(s)) based on an SCG measurement configuration is either already configured to the UE. Or, alternatively, that measurement configuration can be a measConfig field of IE MeasConfig included in the same SCG RRC Reconfiguration (e.g., RRCReconfiguration*) including the conditional reconfiguration e.g., for CPC. That measConfig contains the measId(s) later referred in the execution condition, which are associated to a measurement object (in the frequency of the target candidate SCG) and whose reportType in reportConfig of IE ReportConfigNR is set to condTriggerConfig of IE CondTriggerConfig.

(Step 3b, 703b) may be similar to Step 5 of Option 1.
(Step 4a, 704a) may be similar to Step 5 of Option 1.
(Step 5, 705) may be similar to Step 6 of Option 1.
(Step 6, 706) may be similar to Step 7 of Option 1.
(Step 7, 707) may be similar to Step 8 of Option 1.

Execution Phase (Step 8, 708) may be similar to Step 9 of Option 1.
(Step 9, 709) may be similar to Step 10 of Option 1.
(Step 10, 710) may be similar to Step 11 of Option 1.
(Step 11, 711) may be similar to Step 12 of Option 1.
(Step 12a/b, 712a-712b) may be similar to Step 13 of Option 1.
(Step 13, 713) may be similar to Step 14 of Option 1.
(Step 714) may be similar to, for example, Step 115 or Step 215 of Option 1. This step 714 may occur any number of steps (including zero (0)) after step 13 (713).

Advantages of this Option

In this option the S-SN is the network node generating the final CPC configuration (included in the SCG RRC Reconfiguration, e.g., RRCReconfiguration*) that is to be provided to the UE, as in Option 1 i.e., option 4 shares some of the advantages of Option 1. For example, one advantage is that from the UE's perspective, a CPC configuration with SN change and without SN change remains similar. Another advantage is that the MN does not need to understand the configurations created by the S-SN or T-SN candidate(s), which may be even more beneficial in the case MN and S-SN/T-SN candidates belong to different RATs, like in NE-DC and/or EN-DC.

In addition to these advantages, Option 4 requires less signalling than Option 1 e.g., during preparation phase. In addition, from the MN's perspective, a CPC implementation with or without SN change can benefit from each other i.e., CPC configuration is an SN Modification procedure. In order to make that possible, a consequence of option 4 is the need to define a new procedure and signalling between S-SN and T-SN. Although that is not usual, this could be interpreted as a special case since in a Handover with DC (or CHO with DC), the target MN may also contact a Target SN.

Option 5: The MN builds the final message. The source SN obtains the CG-Config from each target candidate directly, builds the conditionalReconfiguration and forwards to the MN.

Preparation Phase

Figure 14:
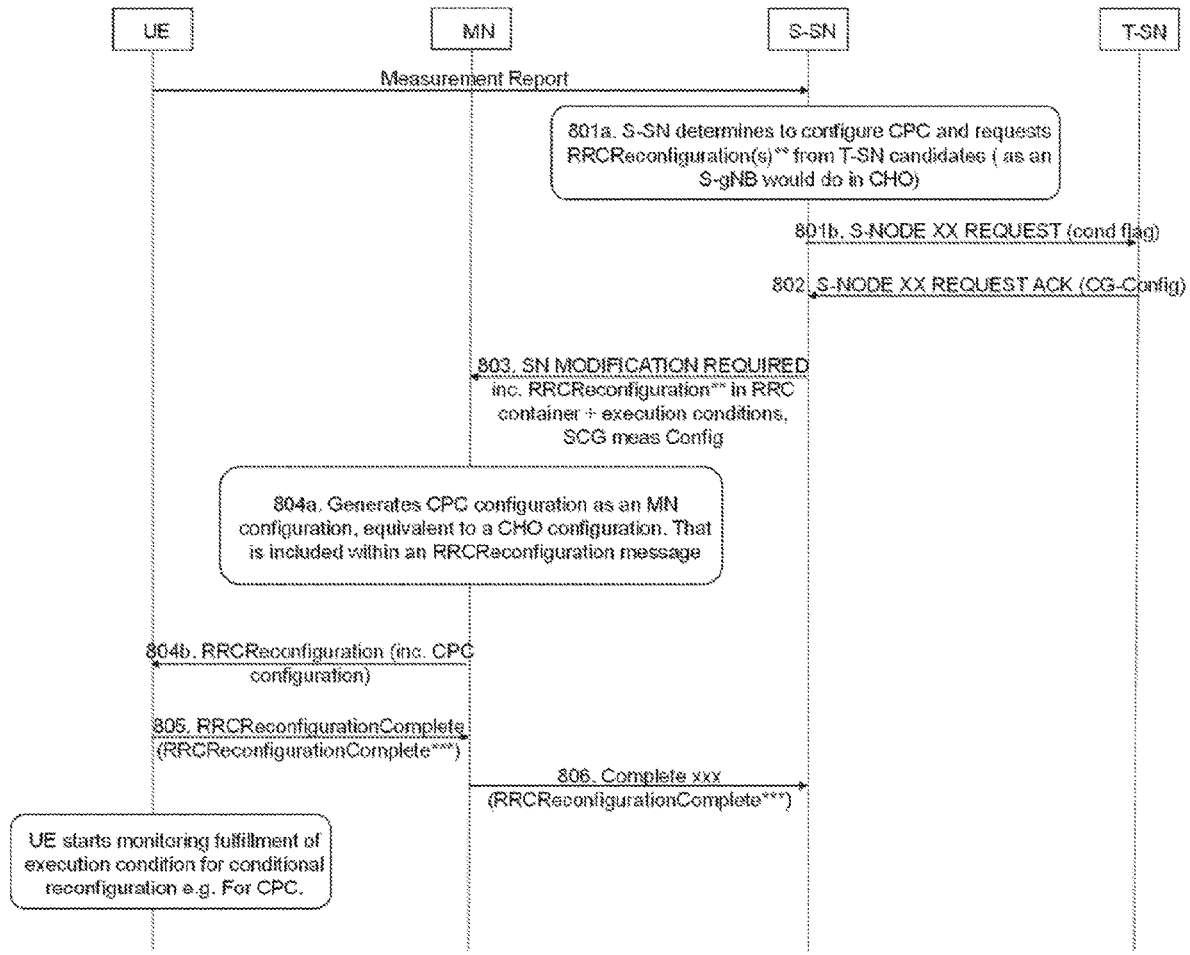
FIG. 14 shows an example preparation phase associated with an embodiment related to option 5, according to various aspects of the present disclosure.

FIG. 14 shows an example preparation phase associated with an embodiment related to option 5, according to various aspects of the present disclosure.

(Step 1a, 801a) may be similar to Step 1a of Option 4.
(Step 1b, 801b) may be similar to Step 1b of Option 4.
(Step 2, 802) may be similar to Step 2 of Option 4.
(Step 3, 803) The node operation as S-SN, upon reception of the response message from the T-SN containing the RRCReconfiguration** for CPC to be applied upon fulfillment of the condition sends that to the MN. In FIG. 14, the message "SN MODIFICATION REQUIRED" is shown as an example, but another message could be used.

In one alternative, it is the S-SN that determines the configurations of execution conditions (and associated measurement configuration for CPC) for the target candidate PSCell(s). In that case, the message may include SCG measConfig for CPC, configuration for the execution conditions (e.g., measId(s) and mapping between measId(s) and target candidate PSCell(s), so MN can generate the CPC configuration to be provided to the UE). The message may contain at least one of the following (or combination):

Configurations of execution conditions for CPC;

In one option, each execution condition corresponds one or multiple MeasID(s); Each execution condition is mapped to a target candidate PSCell for CPC (wherein the mapping is also provided in the message);

For example, the message could include information as follows:

Target candidate PSCell-13→measId(1)=1;
Target candidate PSCell-25→measId(1)=2;
Target candidate PSCell-4→measId(1)=3 AND measId (2)=4;

The configuration of the execution conditions may be provided as part of an XnAP and/or X2AP message i.e., in the format of an inter-node message instead of within an RRC container. The reasoning is that this cannot be provided to the UE as it is, as it needs to be included in another IE and associated to a target candidate PSCell reconfiguration;

SCG measurement configuration;

In one option this could be an RRCReconfiguration in SN format (e.g., an SCG RRCReconfiguration***) including a measConfig field of IE MeasConfig having the measurement identifiers list to be added, wherein the measurement identifiers to be added are associated to reporting configuration whose reportType is set to a conditional reconfiguration condition. The RRCReconfiguration in SN format could be applied to the UE before CPC is configured, as an SCG configuration.

If this alternative is used, there may be different ways to provide the SCG measConfig for CPC to the UE. For example, the S-SN may have provided that to the MN via a container e.g., an RRCReconfiguration***.

In another alternative, it is the MN that determines the configurations of execution conditions (and associated measurement configuration for CPC) for the target candidate PSCell(s). In that case, the message does not need to include SCG measConfig for CPC, configuration for the execution conditions (e.g., measId(s) and mapping between measId(s) and target candidate PSCell(s), so MN can generate the CPC configuration to be provided to the UE).

(Step 4a, 804a) The MN, upon receiving an RRC Reconfiguration for each target candidate PSCell from the S-SN generates an RRC Reconfiguration to be provided to the UE including a CPC configuration (as an MN configuration), mapping the stored execution condition configuration to an RRCReconfiguration.

The SCG measConfig is provided as an SCG configuration to be applied upon reception (e.g., if the alternative where the S-SN determines and/or generates the execution conditions and/or SCG measConfig for CPC).

Taking as an example a single target candidate PSCell, the MN sets the condRRCReconfig to the RRCReconfiguration (e.g., received from a target candidate SN in the S-NODE ADDITION REQUEST ACKNOWLEDGE message), and sets the condExecutionCond to the values received by the S-SN (which herein is the node determining the conditions). For example, if RRCReconfiguration is associated to PSCell-4, the MN set the condExecutionCond to MeasID(1)=3 and MeasID(2)=4, assuming that the MN received from the S-SN the following mapping between conditions and target candidate cells:

- Target candidate PSCell-13 → measId(1)=1;
- Target candidate PSCell-25 → measId(1)=2;
- Target candidate PSCell-4 → measId(1)=3 AND measId(2)=4;

```
CondReconfigToAddModList information element
-- ASN1START
-- TAG-CONDRECONFIGTOADDMODLIST-START
CondReconfigToAddModList-r16 ::=   SEQUENCE (SIZE (1.. maxNrofCondCells-r16)) OF
CondReconfigToAddMod-r16
CondReconfigToAddMod-r16 ::=             SEQUENCE {
    condReconfigId-r16                   CondReconfigId-r16,
    condExecutionCond-r16                SEQUENCE (SIZE (1..2)) OF MeasId OPTIONAL,   -- Cond
condReconfigAdd
    condRRCReconfig-r16                  OCTET STRING (CONTAINING RRCReconfiguration) OPTIONAL, -- Cond
condReconfigAdd
    ...
}
-- TAG-CONDRECONFIGTOADDMODLIST-STOP
-- ASN1STOP
            The CondReconfigToAddModList for one or various target candidate PSCell(s) is included within a
ConditionalReconfiguration IE to be included in the RRCReconfiguration message generated by the MN and to be
sent to the UE.
    ConditionalReconfiguration information element
-- ASN1START
-- TAG-CONDITIONALRECONFIGURATION-START
ConditionalReconfiguration-r16 ::=  SEQUENCE {
    attemptCondReconfig-r16           ENUMERATED {true}         OPTIONAL,  -- Cond PCell
    condReconfigToRemoveList-r16      CondReconfigToRemoveList-r16         OPTIONAL,  -- Need N
    condReconfigToAddModList-r16      CondReconfigToAddModList-r16         OPTIONAL,  -- Need N
    ...
}
CondReconfigToRemoveList-r16 ::=    SEQUENCE (SIZE (1.. maxNrofCondCells-r16)) OF CondReconfigId-
r16
-- TAG-CONDITIONALRECONFIGURATION-STOP
-- ASN1STOP
```

The MN also needs to transmit to the UE the SCG measConfig containing the configuration for the measID(s) associated to the CPC execution conditions to be monitored e.g. measId(1)=3 AND measId(2)=4.

In one option, the MN includes in that RRCReconfiguration message the SCG measConfig, which includes the configuration(s) e.g. measId(1)=3 AND measId(2)=4. That SCG measConfig may be coded as an SCG RRCReconfiguration* (e.g., possibly provided by the S-SN) that is included as an SCG configuration to be applied by the UE upon reception. The MN then includes in the RRCReconfiguration an mrdc-SecondaryCellGroupConfig of IE SetupRelease {MRDC-SecondaryCellGroupConfig}, whose nr-SCG is set to the RRCReconfiguration* i.e., the SCG configuration within the RRCReconfiguration contains the SCG measConfig that configures the details of the execution condition for CPC.

| RRCReconfiguration message |
|---|

```
-- ASN1START
-- TAG-RRCRECONFIGURATION-START
...
RRCReconfiguration-v1560-IEs ::=    SEQUENCE {
    mrdc-SecondaryCellGroupConfig       SetupRelease { MRDC-SecondaryCellGroupConfig }
OPTIONAL, -- Need M
    radioBearerConfig2                  OCTET STRING (CONTAINING RadioBearerConfig)
OPTIONAL, -- Need M
    sk-Counter                          SK-Counter                              OPTIONAL, -- Need N
    nonCriticalExtension                RRCReconfiguration-v16xy-IEs    OPTIONAL
}
MRDC-SecondaryCellGroupConfig ::=   SEQUENCE {
    mrdc-ReleaseAndAdd                  ENUMERATED {true}                       OPTIONAL, --
Need N
    mrdc-SecondaryCellGroup             CHOICE {
        nr-SCG                              OCTET STRING (CONTAINING RRCReconfiguration),
        eutra-SCG                           OCTET STRING
    }
}
-- TAG-RRCRECONFIGURATION-STOP
```

As in option 2, there may be different manners to provide to the UE the SCG measConfig, e.g., as an SCG configuration that is included in the RRC Reconfiguration message containing CPC configuration.

(Step 4b, 804b) After generating the RRC Reconfiguration message (RRCReconfiguration including CPC configuration generated by the MN with information provided by the SN), the MN sends the RRC Reconfiguration message to the UE. The SCG measConfig may be provided as an SCG configuration (e.g., using the field nr-SCG).

(Step 5, 805) Upon reception of the message(s), the UE applies the received RRCReconfiguration and, if included, applies the nr-SCG configuration (including the conditional reconfiguration, e.g., for CPC). After applying the conditional reconfiguration fields/IEs the UE starts the monitoring of execution condition(s) and store the RRC Reconfiguration for each target candidate, e.g., RRCReconfiguration**.

After being configured, if SCG measConfig has been configured as an nr-scg configuration, the UE generates two complete messages: a first associated to the SCG RRC Reconfiguration (e.g., a complete message RRCReconfigurationComplete* message in response to RRCReconfiguration* that had the SCG measConfig for CPC) and acknowledging the reception of the SCG measConfig, to be included inside another RRCReconfigurationComplete in response to the RRC Reconfiguration from the MN.

In other words, in this alternative, as in Option 2, the CPC configuration may be an MN configuration, while the SCG measConfig for CPC, can be provided as an SCG configuration (e.g., RRCReconfiguration***) e.g., in the message configuring the UE with CPC.

(Step 6, 806) Upon reception of the RRCReconfigurationComplete, possibly including the SCG RRC Reconfiguration Complete (i.e., including nr-SCG-Response set to e.g., RRCReconfigurationComplete*), the MN sends the RRCReconfigurationComplete* to the Source SN (which was the node that has generate the RRCReconfiguration*** message i.e., the SCG configuration containing the SCG measConfig for CPC).

Execution Phase

Figure 15:
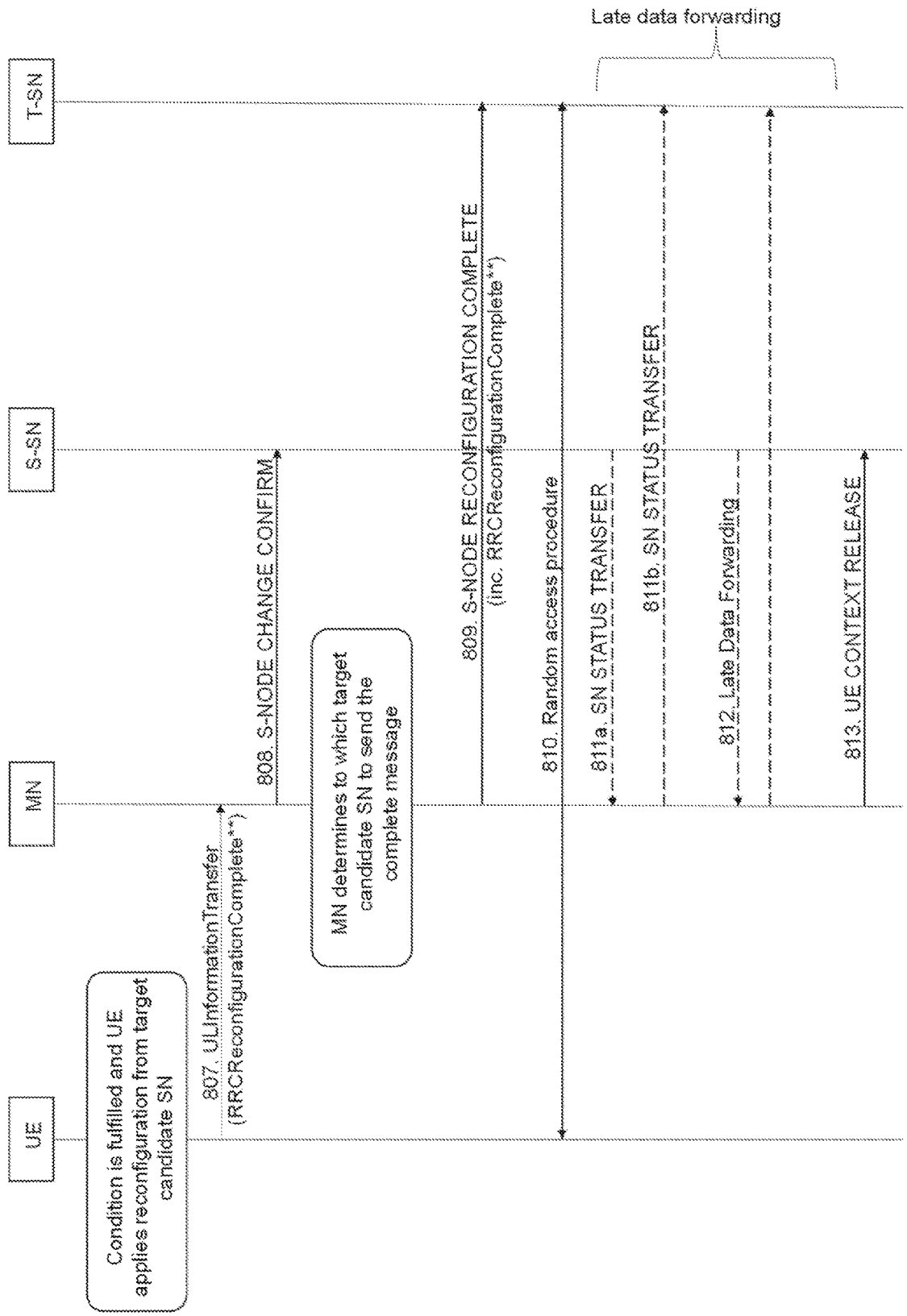
FIG. 15 shows an example execution phase associated with an embodiment related to option 5, according to various aspects of the present disclosure.

FIG. 15 shows an example execution phase associated with an embodiment related to option 5, according to various aspects of the present disclosure.

(Step 7, 807) Upon fulfilment of the condition, the UE applies the associated target candidate's RRC Reconfiguration (e.g., RRCReconfiguration). As part of that, the UE generates a complete message e.g., RRCReconfigurationComplete, to acknowledge the target candidate SN (T-SN) that the UE has successfully applied the target candidate's RRC Reconfiguration (e.g., RRCReconfiguration**). In one alternative that complete message is included in an UL Information Transfer message (e.g., ULInformationTransferMRDC) and submitted to lower layers for transmission via the MN.

(Step 8, 808) may be similar to Step 10 of Option 1.
(Step 9, 809) may be similar to Step 11 of Option 1.
(Step 10, 810) may be similar to Step 12 of Option 1.
(Step 11, 811a-811b) may be similar to Step 13 of Option 1.
(Step 12, 812) may be similar to Step 14 of Option 1.
(Step 813) may be similar to, for example, Step 115 or Step 215 of Option 1. This step X may occur any number of steps (including (0)) after step 12 (812).

Advantages of this Option

In this option, as in Option 4, the S-SN communicates with the T-SN to obtain the configuration(s) of target candidate PSCell(s) e.g., RRCReconfiguration*. However, differently from Option 4, the S-SN provides these target candidate PSCell(s) e.g., RRCReconfiguration* to the MN, together with conditional configuration(s) and SCG related measConfig for CPC, so the MN generates the final CPC configuration to be included in an RRCReconfiguration* (and possibly includes the SCG measConfig as an SCG configuration). As the generation of the CPC message is done by the MN, from that perspective Option 5 is similar to Option 3 (where the message in step 1 from the S-SN to the MN includes condition configurations and SCG measConfig for CPC).

Main advantage is that the CPC preparation phase is faster (1 RTT faster) compared to option 1 and requires less signaling. Compared to Option 4, Option 5 requires the MN to generate the CPC configuration, which may be an advantage from the S-SN's perspective (S-SN requires simpler implementation).

Figure 16:
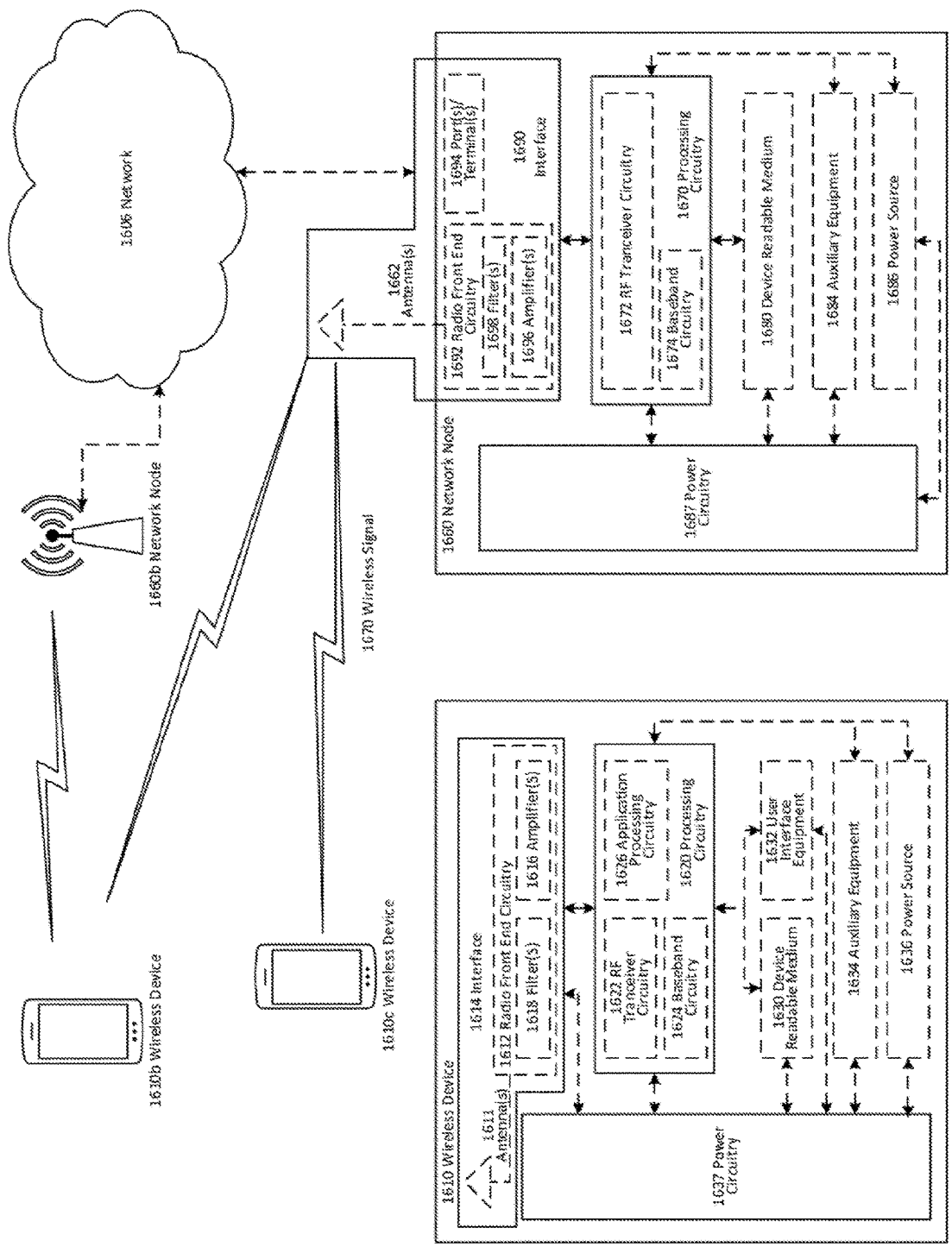
FIG. 16 shows an example wireless network, according to various aspects of the present disclosure.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1692 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1612 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
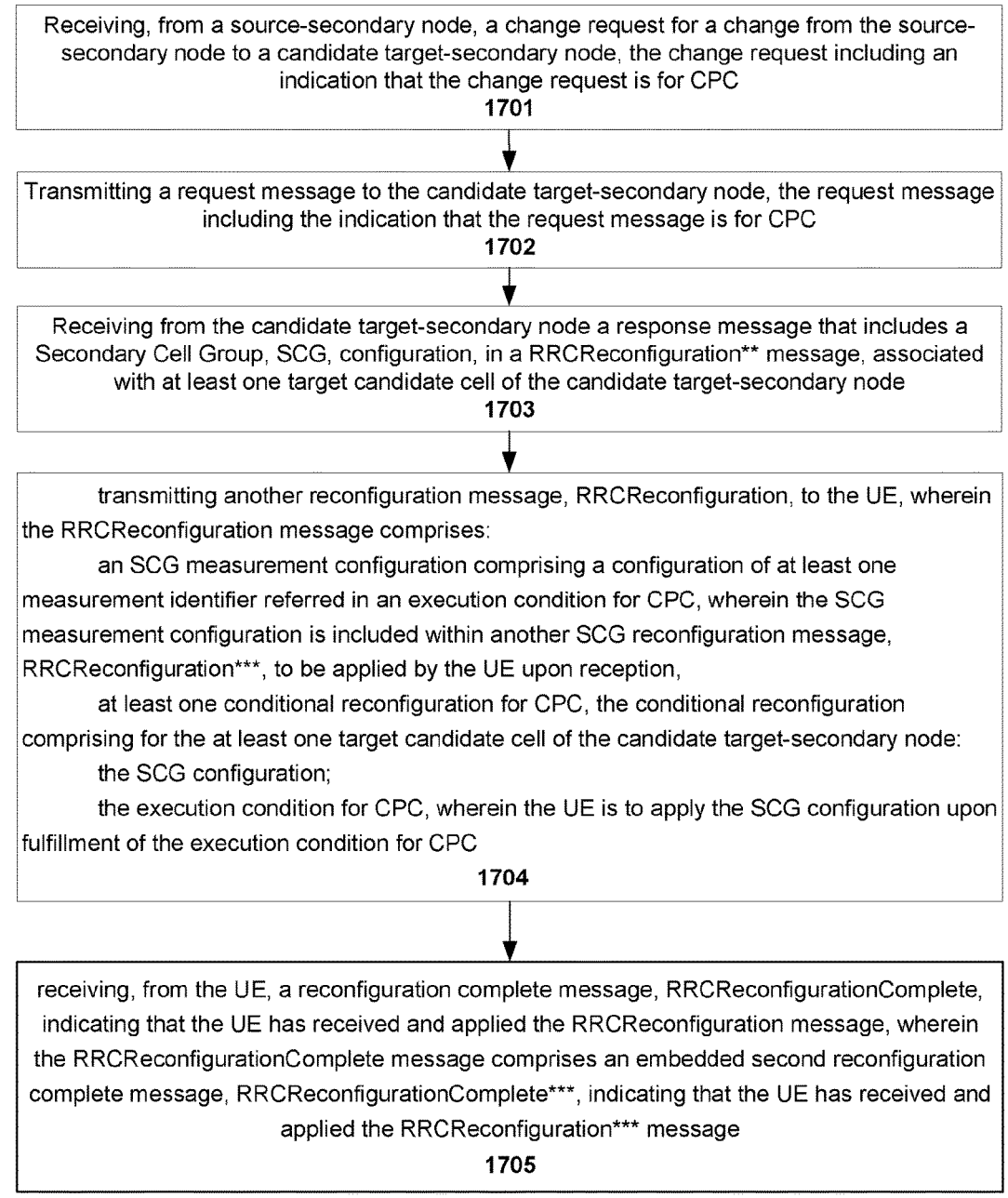
FIG. 17 shows an example process according to various aspects of the present disclosure.

FIG. 17 shows an example process 1700, according to various aspects of the present disclosure. In some aspects, process 1700 may be associated with facilitating a conditional primary secondary cell, PSCell, change, CPC, for a user equipment, UE. At step 1701, a base station operating as a master node receives, from a source-secondary node, a change request for a change from the source-secondary node to a candidate target-secondary node, the change request including an indication that the change request is for CPC. At step 1702, the base station transmits a request message to the candidate target-secondary node, the request message including the indication that the request message is for CPC. At step 1703, the base station receives, from the candidate target-secondary node, a response message that includes a Secondary Cell Group, SCG, configuration, in an RRC reconfiguration message, RRCReconfiguration, associated with at least one target candidate cell of the candidate target-secondary node. At step 1704, the base station transmits another RRC reconfiguration message, RRCReconfiguration, to the UE, wherein the RRCReconfiguration message comprises: an SCG measurement configuration comprising a configuration of at least one measurement identifier referred in an execution condition for CPC, wherein the SCG measurement configuration is included within another RRC reconfiguration message, RRCReconfiguration*, to be applied by the UE upon reception; and at least one conditional reconfiguration for CPC, the conditional reconfiguration comprising for the at least one target candidate cell of the candidate target-secondary node: the SCG configuration; and the execution condition for CPC, wherein the UE is to apply the SCG configuration upon fulfillment of the execution condition for CPC. At step 1705, the base station receives, from the UE, a reconfiguration complete message, RRCReconfigurationComplete, indicating that the UE has received and applied the RRCReconfiguration message, wherein the RRCReconfigurationComplete message comprises an embedded second reconfiguration complete message, RRCReconfigurationComplete*, indicating that the UE has received and applied the RRCReconfiguration* message.

Figure 18:
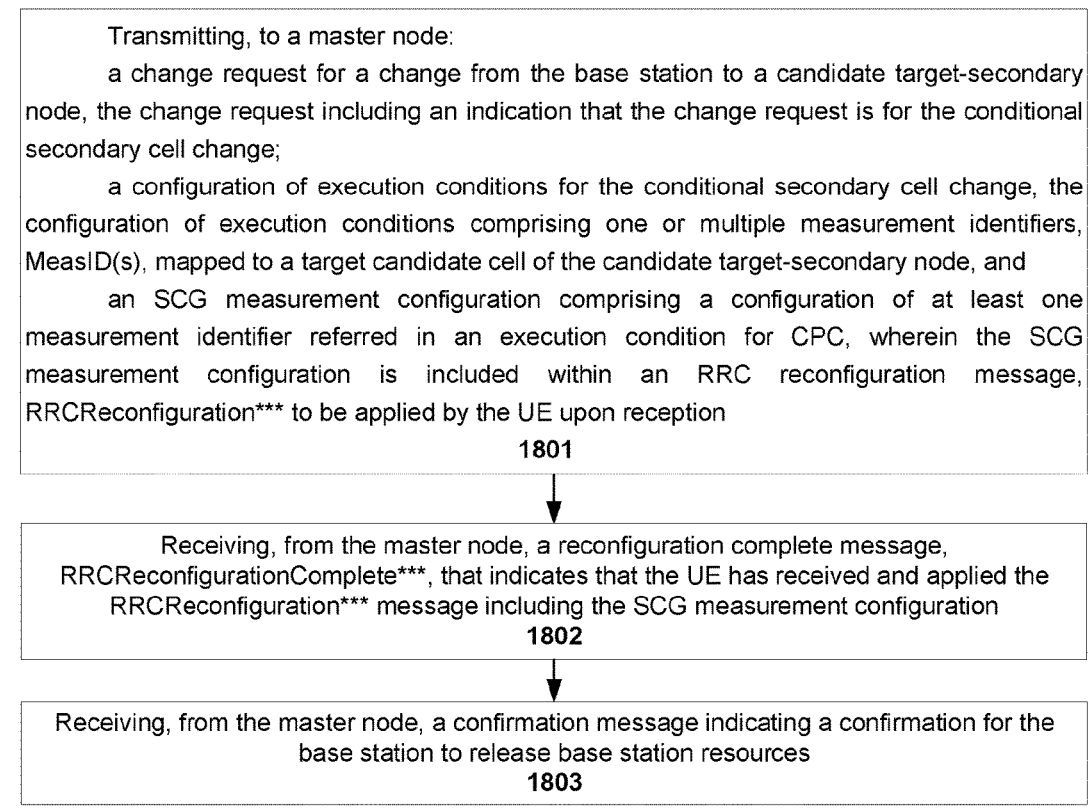
FIG. 18 shows an example process according to various aspects of the present disclosure.

FIG. 18 shows an example process 1800, according to various aspects of the present disclosure. In some aspects, process 1800 may be associated with facilitating a conditional secondary cell change. At step 1801, a base station operating as a source secondary node (SN) transmits, to a master node, a change request, wherein the change is from the base station to a candidate target-secondary node, the change request including an indication that the change request is for the conditional secondary cell change; a configuration of execution conditions for the conditional secondary cell change, the configuration of execution conditions comprising one or multiple measurement identifiers, MeasID(s), mapped to a target candidate cell of the candidate target-secondary node, and an SCG measurement configuration comprising a configuration of at least one measurement identifier referred in an execution condition for CPC, wherein the SCG measurement configuration is included within an RRC reconfiguration message, RRCReconfiguration* to be applied by the UE upon reception. At step 1802, the base station receives from the master node, a reconfiguration complete message, RRCReconfigurationComplete*, that indicates that the UE has received and applied the RRCReconfiguration*** message including the SCG measurement configuration. At step 1803, the base station receives from the master node, a confirmation message indicating a confirmation for the base station to release base station resources.

FIG. 19 shows an example process 1900, according to various aspects of the present disclosure. In some aspects, process 1900 may be associated with facilitating a conditional secondary cell change. At step 1901, a base station operating as a candidate target-secondary node for a user equipment, UE, receives, from a master node, a request message including conditional flag information to facilitate the conditional secondary cell change. At step 1902, the base station transmits, based at least in part on receiving the request message, a response message to the master node, the response message including a cell group configuration associated with the base station. At step 1903, the base station receives, from the master node, a reconfiguration complete message, RRCReconfiguration**, indicating fulfillment of a condition required for the conditional secondary cell change and indicating that the UE has applied a Secondary Cell Group, SCG, reconfiguration.

FIG. 20 shows an example process 2000, according to various aspects of the present disclosure. At step 2001, a user equipment receives an RRC reconfiguration message, RRCReconfiguration, from a master node, wherein the RRCReconfiguration message comprises: a secondary cell group, SCG, measurement configuration comprising a configuration of at least one measurement identifier referred in an execution condition for a conditional primary secondary cell, PSCell, change, CPC, wherein the SCG measurement configuration is included within another RRC reconfiguration message, RRCReconfiguration*, to be applied by the UE upon reception; and at least one conditional reconfiguration for CPC, the conditional reconfiguration comprising for a target candidate cell of a candidate target-secondary node: the SCG configuration; and the execution condition for CPC, wherein the UE is to apply the SCG configuration upon fulfillment of the execution condition for CPC. At step 2002, the UE applies the reconfiguration message and the SCG measurement configuration, within the RRCReconfiguration* message. At step 2003, the UE stores an SCG configuration. At step 2004, the UE monitors the fulfillment of the execution conditions for the target candidate cell. At step 2005, the UE transmits to the master node, a reconfiguration complete message, RRCReconfigurationComplete, indicating that the UE has received and applied the RRCReconfiguration message, wherein the RRCReconfigurationComplete message comprises an embedded second reconfiguration complete message, RRCReconfigurationComplete*, indicating that the UE has received and applied the RRCReconfiguration* message.

Example Embodiments

Option 1

A method performed by a base station (e.g., master node) for facilitating a conditional secondary node change, the method comprising: receiving an initial message requesting a change from a source-secondary node to a target-secondary node, the initial message including information to facilitate the conditional secondary node change (step 1); transmitting a request message to the target-secondary node, the request message including the information to facilitate the conditional secondary node change (step 2); receiving from the target-secondary node a response message associated with a cell group of the target-secondary node (step 3); transmitting a configuration message to the source-secondary node, the configuration message including information included in the response message (step 4); receiving a reconfiguration message from the source-secondary node and to be provided to a UE, the reconfiguration message being based on the information included in the response message (step 5); providing the reconfiguration message to the UE (step 6); receiving a reconfiguration complete message from the UE that is to be provided to the source-secondary node, the reconfiguration complete message indicating that the UE is monitoring fulfilment of a condition required for the conditional secondary node change (step 7); providing the reconfiguration complete message to the source-secondary node (step 8); receiving an uplink message from the UE indicating fulfillment of the condition required for the conditional secondary node change has been fulfilled (step 9); transmitting a confirmation message to the source-secondary node to facilitate the conditional secondary node change (step 10); and providing the uplink message to the target secondary-node to facilitate the conditional secondary node change (step 11).

The above method, wherein the initial message is an S-Node change required message.

The above method, wherein the request message is an S-Node addition request message.

The above method, wherein the response message is an S-Node addition request acknowledgment message.

The above method, wherein the reconfiguration message is an RRC reconfiguration message.

The above method, wherein the uplink message is an uplink information transfer message.

The above method, wherein the confirmation message is an S-Node change confirmation message.

The above method, wherein the initial message includes identifications of a plurality of candidate target-secondary nodes.

The above methods, wherein receiving an initial message includes receiving multiple initial messages, each initial message including an identification of a respective target-secondary node.

The above methods, wherein the response message includes information about preparations by the target-secondary node in accordance with the information to facilitate the conditional secondary node change.

Option 2

A method performed by a base station (e.g., master node) for facilitating a conditional secondary node change, the method comprising: receiving an initial message requesting a change from a source-secondary node to a target-secondary node, the initial message including information to facilitate the conditional secondary node change (step 1); transmitting a request message to the target-secondary node, the request message including the information to facilitate the conditional secondary node change (step 2); receiving from the target-secondary node a response message associated with a cell group of the target-secondary node (step 3); providing a reconfiguration message to a UE, the reconfiguration message being based on the information included in the response message (step 4a-4b); receiving a reconfiguration complete message from the UE that is to be provided to the source-secondary node, the reconfiguration complete message indicating that the UE is monitoring fulfilment of a condition required for the conditional secondary node change (step 5); providing the reconfiguration complete message to the source-secondary node (step 6); receiving an uplink message from the UE indicating fulfillment of the condition required for the conditional secondary node change (step 7); transmitting a confirmation message to the source-secondary node to facilitate the conditional secondary node change (step 8); and providing the uplink message to the target secondary-node to facilitate the conditional secondary node change (step 9).

The above method, wherein the initial message is an S-Node change required message.

The above method, wherein the request message is an S-Node addition request message.

The above method, wherein the response message is an S-Node addition request acknowledgment message.

The above method, wherein the reconfiguration message is an RRC reconfiguration message.

The above method, wherein the confirmation message is an S-Node change confirmation message.

The above method, wherein the uplink message is an uplink information transfer message.

The above method, wherein the initial message includes identifications of a plurality of candidate target-secondary nodes.

The above methods, wherein receiving an initial message includes receiving multiple initial messages, each initial message including an identification of a respective target-secondary node.

The above methods, wherein the response message includes information about preparations by the target-secondary node in accordance with the information to facilitate the conditional secondary node change The above methods comprising steps for all the previous methods.

Option 3

A method performed by a base station (e.g., master node) for facilitating a conditional secondary node change, the method comprising: receiving an initial message requesting a change from a source-secondary node to a target-secondary node, the initial message including information to facilitate the conditional secondary node change (step 1); transmitting a request message to the target-secondary node, the request message including the information to facilitate the conditional secondary node change (step 2a); receiving from the target-secondary node a reconfiguration message to be provided to a UE, the reconfiguration message being based on the information to facilitate a conditional source-initiated source node change (step 3); providing the reconfiguration message to the UE (step 4a-4b); receiving a reconfiguration complete message from the UE indicating that the UE is monitoring fulfilment of a condition required for the conditional secondary node change (step 5); and providing the reconfiguration complete message to the target-secondary node to facilitate the source node change (step 6); receiving an uplink message from the UE indicating fulfillment of the condition required for the conditional secondary node change (step 7); and transmitting a confirmation message to the source-secondary node to facilitate the conditional secondary node change (step 8); and providing the uplink message to the target secondary-node to facilitate the conditional secondary node change (step 9).

The above method, wherein the initial message is an S-Node change required message.

The above method, wherein the request message is an S-Node addition request message.

The above method, wherein the response message is an S-Node addition request acknowledgment message.

The above method, wherein the reconfiguration message is an RRC reconfiguration message.

The above method, wherein the confirmation message is an S-Node change confirmation message.

The above method, wherein the uplink message is an uplink information transfer message.

The above method, wherein the initial message includes identifications of a plurality of candidate target-secondary nodes.

The above methods, wherein receiving an initial message includes receiving multiple initial messages, each initial message including an identification of a respective target-secondary node.

The above methods, wherein the response message includes information about preparations by the target-secondary node in accordance with the information to facilitate the conditional secondary node change The above methods comprising steps for all the previous methods.

Option 4

A method performed by a base station (e.g., source-secondary node) for facilitating a conditional secondary node change, the method comprising: determining the conditional secondary node change for a user equipment (UE) (step 1a); transmitting a request message to at least one target-secondary node, the request message including information to facilitate the conditional secondary node change (step 1b); receiving from the target-secondary node a response message associated with a cell group of the target-secondary node (step 2); transmitting a modification message to a master node, the modification message including reconfiguration information to facilitate the conditional secondary node change (steps 3a-3b); receiving a reconfiguration complete message indicating that the UE is monitoring fulfilment of a condition required for the conditional secondary node change (step 7); receiving a confirmation message indicating fulfillment of the condition required for the conditional secondary node change (step 9); and releasing resources allocated to the UE (step X).

The above method, wherein the initial message is an S-Node request message.

The above method, wherein the request message is an S-Node addition request message.

The above method, wherein the response message is an S-Node addition request acknowledgment message.

The above method, wherein the reconfiguration message is an RRC reconfiguration message.

The above method, wherein the confirmation message is an S-Node change confirmation message.

The above methods comprising steps for all the previous methods.

Option 5

A method performed by a base station (e.g., master node) for facilitating a conditional secondary node change, the method comprising: receiving a modification message from a source-secondary node, the modification message including reconfiguration information collected from at least one target-secondary node (step 3); providing a reconfiguration message to a user equipment (UE), the reconfiguration message including the reconfiguration information collected from at least one target-secondary node (steps 4a-b); receiving a reconfiguration complete message indicating that the UE is monitoring fulfillment of a condition required for the conditional secondary node change (step 5); providing information included in the reconfiguration complete message to the source-secondary node to facilitate the source node change (step 6); receiving an uplink message from the UE indicating fulfillment of the condition required for the conditional secondary node change (step 7); and transmitting a confirmation message to the source-secondary node to facilitate the conditional secondary node change (step 8); and providing the uplink message to the target secondary-node to facilitate the conditional secondary node change (step 9).

The above method, wherein the modification message is an S-Node modification required message.

The above method, wherein the reconfiguration message is an RRC reconfiguration message The above method, wherein the reconfiguration complete message is an RRC reconfiguration complete message.

The above method, wherein the uplink message is an uplink information transfer message.

The above method, wherein the confirmation message is an S-Node change confirmation message.

The above method comprising steps for all the previous methods.

A base station, comprising: processing circuitry configured to perform any of the steps of any of the above embodiments; and power supply circuitry configured to supply power to the base station.

A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the above embodiments.

The communication system of the previous embodiment further including the base station.

The communication system of the previous 2 embodiments, further including the UE, wherein the UE is configured to communicate with the base station.

The communication system of the previous 3 embodiments, wherein: the processing circuitry of the host computer is configured to execute a host application, thereby providing the user data; and the UE comprises processing circuitry configured to execute a client application associated with the host application.

A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the above embodiments.

The method of the previous embodiment, further comprising, at the base station, transmitting the user data.

The method of the previous embodiments, wherein the user data is provided at the host computer by executing a host application, the method further comprising, at the UE, executing a client application associated with the host application.

A user equipment (UE) configured to communicate with a base station, the UE comprising a radio interface and processing circuitry configured to performs the steps of the previous embodiments.

A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the above embodiments.

The communication system of the previous embodiment further including the base station.

The communication system of the previous 2 embodiments, further including the UE, wherein the UE is configured to communicate with the base station.

The communication system of the previous 3 embodiments, wherein:

the processing circuitry of the host computer is configured to execute a host application; the UE is configured to execute a client application associated with the host application, thereby providing the user data to be received by the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors ("DSPs"), special-purpose digital logic, and the like. The processing circuitry may be configured to execute program code stored in memory, which may include one or several types of memory such as read-only memory ("ROM"), random-access memory ("RAM"), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present the present disclosure, it is to be understood that the terminology used herein is for the purpose of describing particular embodiments only and is not intended to be limiting of present the present disclosure. Unless otherwise defined, all terms (including technical and scientific terms) used herein have the same meaning as commonly understood by one of ordinary skill in the art to which present the present disclosure belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present the present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.,", which derives from the Latin phrase "exempli gratia," may be used to introduce or specify a general example or examples of a previously mentioned item, and is not intended to be limiting of such item. The common abbreviation "i.e.,", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present the present disclosure may be embodied in hardware and/or in software (including firmware, resident software, microcode, etc.) that runs on a processor such as a digital signal processor, which may collectively be referred to as "circuitry," "a module," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the present disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present the present disclosure. All such variations and modifications are intended to be included herein within the scope of present the present disclosure. Accordingly, the above disclosed subject matter is to be considered illustrative, and not restrictive, and the examples of embodiments are intended to cover all such modifications, enhancements, and other embodiments, which fall within the spirit and scope of present the present disclosure. Thus, to the maximum extent allowed by law, the scope of present the present disclosure are to be determined by the broadest permissible interpretation of the present disclosure including the examples of embodiments and their equivalents, and shall not be restricted or limited by the foregoing detailed description.

What is claimed is:

1. A method by a base station operating as a Master Node (MN), for facilitating a conditional primary secondary cell, PSCell, change, CPC, for a user equipment, UE, the method comprising:
   receiving, from a source-secondary node, a change request for a change from the source-secondary node to a candidate target-secondary node, the change request including an indication that the change request is for CPC;
   transmitting a request message to the candidate target-secondary node, the request message including the indication that the request message is for CPC;
   receiving, from the candidate target-secondary node, a response message that includes a Secondary Cell Group, SCG, configuration, in an RRC reconfiguration message associated with at least one target candidate cell of the candidate target-secondary node;
   transmitting another RRC reconfiguration message, RRCReconfiguration, to the UE, wherein the RRCReconfiguration message comprises:
      an SCG measurement configuration comprising a configuration of at least one measurement identifier referred in an execution condition for CPC, wherein the SCG measurement configuration is included within another RRC reconfiguration message to be applied by the UE upon reception; and
      at least one conditional reconfiguration for CPC, the conditional reconfiguration comprising for the at least one target candidate cell of the candidate target-secondary node:
         the SCG configuration; and
         the execution condition for CPC, wherein the UE is to apply the SCG configuration upon fulfillment of the execution condition for CPC; and
   receiving, from the UE, a reconfiguration complete message, RRCReconfigurationComplete, indicating that the UE has received and applied the RRCReconfiguration message, wherein the RRCReconfigurationComplete message comprises an embedded second reconfiguration complete message indicating that the UE has received and applied the another RRC reconfiguration message.

2. The method of claim 1, wherein the change request includes the configuration of execution conditions for CPC, the configuration of execution condition comprising one or multiple measurement identifiers, MeasID(s), mapped to the target candidate cell of the candidate target-secondary node.

3. The method of claim 1, wherein the change request comprises an SCG measurement configuration for configuring measurements associated with the measurement identifiers set in the execution condition.

4. The method of claim 3, wherein the SCG measurement configuration is included in the another RRC reconfiguration message in SN format, including a measConfig field of IE MeasConfig having the measurement identifiers, and wherein the measurement identifiers are associated to a reporting configuration having a reportType that is set to a conditional reconfiguration condition.

5. The method of claim 1, further comprising:
   transmitting the embedded second reconfiguration complete message to the source-secondary node.

6. The method of claim 1, wherein the request change includes identifications of a plurality of candidate target-secondary nodes and configuration of execution conditions for CPC, and wherein each configuration of execution conditions comprises one or multiple measurement identifiers, MeasID(s), each measurement identifier mapped to each target candidate cell of each of the candidate target-secondary nodes.

7. The method of claim 1, wherein receiving the change request includes receiving multiple change requests, and wherein each change request including an identification of a respective target-secondary node or an identification of a respective target candidate cell of the candidate target-secondary node.

8. The method of claim 1, wherein:
   the change request comprises an S-Node change required message; or
   the request message comprises an S-Node addition request message; or
   the response message comprises an S-Node addition request acknowledgment message.

9. The method of claim 1, further comprising:
   receiving, from the UE, another reconfiguration complete message indicating that the UE has executed CPC and applied the SCG configuration associated with at least one target candidate cell of the candidate target-secondary node.

10. The method of claim 9, further comprising:
    transmitting the another reconfiguration complete message to the candidate target-secondary node.

11. The method of claim 10, wherein the another reconfiguration complete message comprises a cell identity for the target candidate cell for which CPC has been executed, or a conditional reconfiguration identity for which CPC has been executed.

12. The method of claim 11, wherein the base station maintains a mapping between the received cell identity or conditional reconfiguration identity and the candidate target-secondary node, and wherein the base station transmits the another reconfiguration complete message to the candidate target-secondary node based on the mapping.

13. A method by a base station operating as a source Secondary Node for a user equipment, UE, for facilitating a conditional secondary cell change, the method comprising:
transmitting, to a master node:
a change request for a change from the base station to a candidate target-secondary node, the change request including an indication that the change request is for the conditional secondary cell change;
a configuration of execution conditions for the conditional secondary cell change, the configuration of execution conditions comprising one or multiple measurement identifiers, MeasID(s), mapped to a target candidate cell of the candidate target-secondary node, and
a Secondary Cell Group, SCG, measurement configuration comprising a configuration of at least one measurement identifier referred in an execution condition for conditional primary secondary cell, PSCell, change, CPC, wherein the SCG measurement configuration is included within an RRC reconfiguration message to be applied by the UE upon reception,
receiving, from the master node, a reconfiguration complete message that indicates that the UE has received and applied the RRC reconfiguration message including the SCG measurement configuration; and
receiving, from the master node, a confirmation message indicating a confirmation for the base station to release base station resources.

14. The method of claim 13, wherein the change request includes one of the configuration of execution conditions for CPC and the SCG measurement configuration.

15. The method of claim 13, wherein the change request includes identifications of a plurality of candidate target-secondary nodes and a mapping between an identification of conditions required for the conditional secondary cell change condition and an identification of each target candidate secondary cell of a candidate target-secondary node.

16. The method of claim 13, wherein transmitting the change request includes transmitting multiple change requests, each change request including an identification of a respective target-secondary node.

17. A method by a base station operating as a candidate target-secondary node for a user equipment, UE, for facilitating a conditional secondary cell change, the method comprising:
receiving, from a master node, a request message including conditional flag information to facilitate the conditional secondary cell change;
transmitting, based at least in part on receiving the request message, a response message to the master node, the response message including a cell group configuration associated with the base station; and
receiving, from the master node, a reconfiguration complete message indicating fulfillment of a condition required for the conditional secondary cell change and indicating that the UE has applied a Secondary Cell Group, SCG, reconfiguration.

18. The method of claim 17, wherein:
the response message includes information about preparations by the base station in accordance with the conditional flag information; or
the request message is an S-Node addition request message; or
the response message is an S-Node addition request acknowledgement message; or
the reconfiguration complete message is an S-Node reconfiguration complete message.

19. A method by a user equipment, UE, the method comprising:
receiving an RRC reconfiguration message, RRCReconfiguration, from a master node, wherein the RRCReconfiguration message comprises:
a secondary cell group, SCG, measurement configuration comprising a configuration of at least one measurement identifier referred in an execution condition for a conditional primary secondary cell, PSCell, change, CPC, wherein the SCG measurement configuration is included within another RRC reconfiguration message to be applied by the UE upon reception; and
at least one conditional reconfiguration for CPC, the conditional reconfiguration comprising for a target candidate cell of a candidate target-secondary node:
the SCG configuration; and
the execution condition for CPC, wherein the UE is to apply the SCG configuration upon fulfillment of the execution condition for CPC;
applying the reconfiguration message and the SCG measurement configuration, within the another RRC reconfiguration message;
storing an SCG configuration;
monitoring the fulfillment of the execution conditions for the target candidate cell; and
transmitting, to the master node, a reconfiguration complete message, RRCReconfigurationComplete, indicating that the UE has received and applied the RRCReconfiguration message, wherein the RRCReconfigurationComplete message comprises an embedded second reconfiguration complete message indicating that the UE has received and applied the another RRC reconfiguration message.

20. The method according to claim 19, further comprising:
applying the SCG configuration upon the fulfillment of the execution condition for CPC, and
transmitting a reconfiguration complete message indicating that CPC has been executed.

21. The method according to claim 19, further comprising the UE transmitting with the reconfiguration complete message a cell identity for the target candidate cell for which CPC has been executed, or a conditional reconfiguration identity for which CPC has been executed.

* * * * *